United States Patent
Heo et al.

(10) Patent No.: US 10,021,336 B2
(45) Date of Patent: Jul. 10, 2018

(54) DISPLAY APPARATUS AND CONTROL METHOD THEREOF

(71) Applicant: SAMSUNG ELECTRONICS CO., LTD., Suwon-si (KR)

(72) Inventors: Do-Won Heo, Suwon-si (KR); Eun-young Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/191,693

(22) Filed: Jun. 24, 2016

(65) Prior Publication Data

US 2017/0013224 A1   Jan. 12, 2017

(30) Foreign Application Priority Data

Jul. 7, 2015   (KR) .................. 10-2015-0096520

(51) Int. Cl.
*H04N 5/44*    (2011.01)
*H04N 5/445*   (2011.01)
(Continued)

(52) U.S. Cl.
CPC ........... *H04N 5/4403* (2013.01); *G08C 17/02* (2013.01); *H04L 12/6418* (2013.01);
(Continued)

(58) Field of Classification Search
CPC ............ H04N 5/4403; H04N 5/44513; H04N 5/44543; H04N 5/45; H04N 5/50; H04N 2005/4426; H04N 2005/4433; G08C 17/02; H04W 4/008
See application file for complete search history.

(56) References Cited

U.S. PATENT DOCUMENTS

| | | | |
|---|---|---|---|
| 2006/0174281 A1* | 8/2006 | Park | H04N 5/44513 725/59 |
| 2009/0052667 A1* | 2/2009 | Iwamura | H04L 12/2809 380/200 |
| 2009/0132441 A1* | 5/2009 | Muller | H04N 7/163 706/11 |

(Continued)

FOREIGN PATENT DOCUMENTS

| | | |
|---|---|---|
| KR | 10-0649296 B1 | 11/2006 |
| KR | 10-1092442 B1 | 12/2011 |
| WO | 2009/026000 A1 | 2/2009 |

OTHER PUBLICATIONS

International Search Report, issued by International Searching Authority in corresponding International Application No. PCT/KR2016/005937, dated Aug. 24, 2016, (PCT/ISA/210).
(Continued)

*Primary Examiner* — Michael E Teitelbaum
*Assistant Examiner* — Sean N. Haiem
(74) *Attorney, Agent, or Firm* — Sughrue Mion, PLLC

(57) ABSTRACT

A display apparatus includes a signal receiver configured to receive a broadcast signal, a signal processor configured to process the received broadcast signal, a display configured to display an image based on the processed broadcast signal, a user input receiver configured to receive a user input, a storage, and a controller. The controller is configured to control the storage to store information about an external device being mapped to a channel among a plurality of channels in accordance with the user input, display the information about the external device corresponding to the mapped channel, and control the external device via the mapped channel. Thus, a user may easily register the external device with a channel simply by placing an input device, such as a remote controller or the like, in proximity to the external device while viewing a broadcast.

20 Claims, 47 Drawing Sheets

(51) Int. Cl.
  *H04N 21/41*     (2011.01)
  *H04N 21/431*    (2011.01)
  *G08C 17/02*     (2006.01)
  *H04N 5/45*      (2011.01)
  *H04N 5/50*      (2006.01)
  *H04N 21/422*    (2011.01)
  *H04N 21/462*    (2011.01)
  *H04L 12/64*     (2006.01)
  *H04W 4/80*      (2018.01)
  *H04W 4/00*      (2018.01)

(52) U.S. Cl.
  CPC ..... *H04N 5/44513* (2013.01); *H04N 5/44543* (2013.01); *H04N 5/45* (2013.01); *H04N 5/50* (2013.01); *H04N 21/4126* (2013.01); *H04N 21/4131* (2013.01); *H04N 21/42221* (2013.01); *H04N 21/4316* (2013.01); *H04N 21/4622* (2013.01); *H04N 2005/4426* (2013.01); *H04N 2005/4433* (2013.01); *H04N 2005/44521* (2013.01); *H04W 4/008* (2013.01); *H04W 4/80* (2018.02)

(56) References Cited

U.S. PATENT DOCUMENTS

| | | | | |
|---|---|---|---|---|
| 2009/0172741 | A1* | 7/2009 | Miyazaki | H04N 5/765 725/56 |
| 2011/0088066 | A1* | 4/2011 | Kim | H04N 5/44543 725/56 |
| 2011/0161814 | A1* | 6/2011 | Kim | H04N 5/44543 715/716 |
| 2012/0233552 | A1* | 9/2012 | Chee | H04L 12/281 715/745 |
| 2012/0291068 | A1* | 11/2012 | Khushoo | H04N 7/186 725/38 |
| 2013/0009746 | A1* | 1/2013 | Ryu | H04M 1/7253 340/4.3 |
| 2013/0051752 | A1 | 2/2013 | Allen et al. | |
| 2014/0298384 | A1 | 10/2014 | Kim | |
| 2015/0007233 | A1* | 1/2015 | Earle | H04N 21/4622 725/44 |
| 2015/0067521 | A1* | 3/2015 | Heo | G06F 3/1446 715/733 |
| 2015/0082169 | A1* | 3/2015 | Shmueli | H04W 4/06 715/716 |
| 2015/0201148 | A1* | 7/2015 | Kim | H04N 5/44591 725/43 |
| 2015/0262208 | A1* | 9/2015 | Bjontegard | G06Q 30/0205 705/7.31 |

OTHER PUBLICATIONS

Communication dated Sep. 27, 2016, from the European Patent Office in counterpart European Application No. 16172983.5.

\* cited by examiner

DISPLAY APPARATUS AND CONTROL METHOD THEREOF

CROSS-REFERENCE TO RELATED APPLICATION

This application claims priority from Korean Patent Application No. 10-2015-0096520 filed on Jul. 7, 2015 in the Korean Intellectual Property Office, the disclosure of which is incorporated herein by reference.

BACKGROUND

Field

Apparatuses and methods consistent with the exemplary embodiments relate to a display apparatus and a control method thereof, and more particularly to a display apparatus connecting with an external device and a control method thereof.

Description of the Related Art

To register an external device to a television (TV), a static internet protocol (IP) address of the external device has been generally used. When the TV controls the external device, the TV has to stop displaying a broadcast and search and execute an application capable of controlling the external device. Therefore, it is cumbersome for a user to control the external device since she has to go through multiple steps.

Further, there is a method of registering the external device to a specific TV channel. If the external device is connected to a video input terminal of the TV, it is possible to register the external device to a channel, to which a broadcast signal is not allocated. In this case, the external device has to be directly connected to the TV by a wire. Therefore, it is inconvenient for a user to register an external device located at a far distance from the TV. In addition, it is difficult to register or control the external device while viewing a broadcast because the external device is registerable to only those channels to which broadcast signals are not allocated.

SUMMARY

Accordingly, an aspect of one or more exemplary embodiments may provide a display apparatus and a control method thereof, in which an external device is registered to a channel to which a broadcast signal is assigned.

Another aspect may provide a display apparatus and a control method thereof, in which an operation for controlling the external device is performed while a broadcast is displayed.

In accordance with an aspect of an embodiment, there is provided a display apparatus including: a signal receiver configured to receive a broadcast signal; a signal processor configured to process the received broadcast signal; a display configured to display an image based on the processed broadcast signal; a user input receiver configured to receive a user input; a storage; and a controller configured to control the storage to store information about an external device being mapped to a channel among a plurality of channels in accordance with the user input, display the information about the external device corresponding to the mapped channel, and control the external device via the mapped channel.

According to various exemplary embodiments, a user may easily register the external device by simply placing an input device, such as a remote controller or the like, in proximity to the external device while viewing a broadcast. Because the external device is registered to a channel to which a broadcast signal is allocated, it is further convenient for the user to directly control the external device while viewing the broadcast.

The controller may control the display to display a user interface (UI) comprising at least one item for controlling the external device corresponding to the mapped channel. Thus, a user can directly control the external device through a graphic icon or the like for controlling the external device, which is displayed along with a broadcast image, without having to stop viewing the broadcast.

The controller may control the external device based on the user input received via the displayed UI. Thus, the graphic icon for controlling the external device, displayed together with the broadcast image, is selected by the remote controller or like input device, thereby directly performing the operations for controlling the external device.

The controller may control the display to display a user interface (UI) for controlling the plurality of external devices corresponding to the mapped channel. Thus, it is possible to register many external devices to a channel to which a broadcast signal is allocated, and the graphic icon for controlling the registered external device is provided together with a broadcast image, so that a user can easily control many external devices.

The display apparatus may further include a remote controller configured to receive a user input, and the user input receiver may receive the user input through the remote controller. Thus, a user, who is watching TV, can easily control the external device through the buttons or the like of the remote controller.

The remote controller may receive the information about the external device from the external device, and the controller may control the storage to store the information about the external device received by the remote controller. Thus, a user can easily register the external device to the TV through simple control using the remote controller.

The remote controller may receive the information about the external device from the external device through one or more communication methods such as near field communication (NFC), wireless fidelity (Wi-Fi) and Bluetooth. Thus, it is easy to register the external device by simply placing the remote controller in proximity to the external device or connecting the remote controller and the external device through Wi-Fi or Bluetooth.

The controller may send the remote controller a control signal for controlling the external device corresponding to the mapped channel based on a user's input, and the remote controller may output the control signal to the external device. Thus, if an icon or the like for controlling the external device is selected through a button of the remote controller, the TV provides the control signal to the remote controller, and the remote controller controls the external device by infrared communication or like method.

The controller may send the external device a control signal for controlling the external device corresponding to the mapped channel based on a user's input. Thus, if an icon or the like for controlling the external device is selected through a button of the remote controller, the TV directly provides a control signal to and thus controls the external device while the TV is connected to the external device by Wi-Fi, Bluetooth, or the like.

The controller may control the remote controller to generate a control signal for controlling the external device corresponding to the mapped channel based on a user's input, and the remote controller may output the generated control signal to the external device. Thus, if an icon or the like for controlling the external device is selected through a button of the remote controller, the remote controller generates a control signal by using the identification information of the selected external device, and thus directly controls the external device.

The display apparatus may further include an electronic device configured to receive a user input, and the user input receiver may receive the user input through the electronic device. Thus, a smart phone, a wearable device, or like electronic device is used for registering the external device to the channel of the TV.

The electronic device may receive the information about the external device from the external device through one or more wireless communication methods such as near field communication (NFC), wireless fidelity (Wi-Fi), Bluetooth, and transmission control protocol (TCP)/Internet protocol (IP). The controller may control the storage to store the information about the external device received by the electronic device. Thus, it allows a user to easily register the external device by simply placing the smart phone or the wearable device in proximity to the external device or connecting the smart phone to the external device by Wi-Fi, Bluetooth, or Internet.

The controller may control the display to display additional information for controlling the external device based on a user's input using the displayed UI. Thus, it is possible to provide a UI for presenting additional information for controlling the external device by selecting an icon for controlling the external device displayed together with a broadcast image.

The additional information for controlling the external device may be differently displayed in accordance with the types of external devices. Thus, the additional information presented on the UI for controlling the external device is differently displayed in accordance with the kinds of external devices, and it is thus possible to provide a user with the UI suitable for controlling each external device.

The controller may display a user interface (UI) for user settings to map the external device to an unallocated channel or an allocated channel, allocated to a broadcast signal, among the plurality of channels, and map the external device to the unallocated channel or the allocated channel in accordance with an additional user input via the displayed UI. Thus, when the external device is registered to the channel of the TV, a user is provided with a UI so that the external device can be registered not only to the channel allocated with the broadcast signal but also to an unoccupied channel.

The controller may map the external device to the corresponding channel based on characteristics of the channel and/or the external device. Thus, when the external device is registered to the channel of the TV, the external device that is related to the characteristic of the channel and the external device may be registered so that more efficient viewing environments can be provided to a user.

The characteristics of the channel may include a characteristic of content provided via the channel, user preference information associated with the channel, and a user's viewing history information associated with the channel. Thus, the external device highly related to the broadcast contents may be recommended, or the external device suitable for a user may be recommended based on the user's favorite channel or the user's viewing history, thereby providing the user with more efficient viewing environments.

The characteristics of the external device may include the type of external device, usage pattern associated with the external device, and a user's history of using the external device. Thus, when the external device is registered to the channel of the TV, a user is provided with recommended information so that the external device can be registered to a suitable channel based on the type and usage of external devices and the user's history of using the external device.

The information about the external device may include information about a user of the external device. Thus, when the external device is registered to the channel of the TV, it is also possible to communicate with a user of the external device based on her information corresponding to the external device in addition to the operations of controlling the external device.

The controller may display a user interface (UI) for communicating with a user of the external device corresponding to the mapped channel based on the information about the user of the external device corresponding to the mapped channel. Thus, the TV can display a graphic icon for communicating with the user of the external device alongside a broadcast image, so that the user of the television can directly contact the other parties of the external devices while watching TV.

In accordance with an aspect of an embodiment, there is provided a method of controlling a display apparatus. The method includes: receiving a broadcast signal; storing information about an external device being mapped to a channel among a plurality of channels in accordance with a user input; displaying the information about the external device corresponding to the mapped channel; and controlling the external device via the mapped channel.

According to various exemplary embodiments, a user may easily register the external device by simply placing an input device, such as a remote controller or the like, in proximity to the external device while viewing a broadcast. Because the external device is registered to a channel to which a broadcast signal is allocated, it is further convenient for a user to directly control the external device while viewing a broadcast.

Controlling the external device may include displaying a user interface (UI) that includes at least one item for controlling the external device corresponding to the mapped channel. Thus, a user can directly control the external device through a graphic icon or the like for controlling the external device. The graphic icon is provided along with a broadcast image so that the user will not need to stop viewing a broadcast.

Controlling the external device may include controlling the external device based on a user's input using the displayed UI. Thus, the graphic icon for controlling the external device, displayed together with the broadcast image, may be selected by the remote controller or the like input device, thereby causing the display apparatus to control the external device directly.

The method may further include displaying a user interface (UI) for controlling the plurality of external devices corresponding to the mapped channel. Thus, it is possible to register many external devices to a single channel to which a broadcast signal is allocated, and the graphic icon for controlling the registered external device is provided together with a broadcast image, so that a user can easily control many external devices.

Storing the information about the external device may include receiving a user's input through the remote controller. Thus, a user, who is watching TV, can easily control the external device through the buttons or the like of the remote controller.

The remote controller may receive the information about the external device from the external device, the information about the external device received by the remote controller may be stored. Thus, a user can easily register the external device to the TV through simple control using the remote controller.

The remote controller may receive the information about the external device from the external device through at least one communication method among near field communication (NFC), wireless fidelity (Wi-Fi), and Bluetooth. Thus, it is easy to register the external device by simply placing the remote controller in proximity to the external device or connecting the remote controller to the external device through Wi-Fi or Bluetooth.

Controlling the external device may include sending to the remote controller a control signal for controlling the external device corresponding to the mapped channel based on a user's input, and the remote controller may output the control signal to the external device. Thus, if an icon or the like for controlling the external device is selected through a button of the remote controller, the TV provides the control signal to the remote controller, and the remote controller controls the external device by infrared communication or like method.

Controlling the external device may include sending the external device a control signal for controlling the external device corresponding to the mapped channel based on a user's input. Thus, if an icon or the like for controlling the external device is selected through a button of the remote controller, the TV directly provides a control signal to and thus controls the external device while the TV is connected to the external device by Wi-Fi, Bluetooth, or the like.

Controlling the external device may include generating a control signal for controlling the external device corresponding to the mapped channel based on a user's input, and the remote controller may output the generated control signal to the external device. Thus, if an icon or the like for controlling the external device is selected through a button of the remote controller, the remote controller generates a control signal by itself using only the identification information of the selected external device, and thus directly controls the external device.

Storing the information about the external device may include receiving a user's input through the electronic device. Thus, the smart phone, the wearable device, or like electronic device is used for registering the external device to the channel of the TV.

The electronic device may receive the information about the external device from the external device through at least one wireless communication method among near field communication (NFC), wireless fidelity (Wi-Fi), Bluetooth, and transmission control protocol (TCP)/Internet protocol (IP), and storing the information about the external device may include storing the information about the external device received by the electronic device. Thus, it is easy to register the external device by simply placing the smart phone or the wearable device in proximity to the external device or connecting the smart phone to the external device by Wi-Fi, Bluetooth, or the Internet.

Display the UI may include additional information for controlling the external device based on a user's input using the displayed UI. Thus, it is possible to provide a UI of presenting the additional information for controlling the external device, by selecting an icon for controlling the external device displayed together with a broadcast image.

The additional information for controlling the external device may be differently displayed in accordance with the kinds of external devices. Thus, a UI for presenting the additional information for controlling the external device is differently displayed in accordance with the kinds of external devices, and it is thus possible to provide a user with the UI suitable for controlling each external device.

The method may further include: displaying a user interface (UI) for user settings to map the external device to an unallocated channel or an allocated channel, allocated to a broadcast signal, among the plurality of channels; and mapping the external device to the allocated or unallocated channel in accordance with a user's input using the displayed UI. Thus, when the external device is registered to the channel of the TV, a user is provided with a UI so that the external device can be registered to not only the channel allocated to the broadcast signal but also to an unallocated channel.

The method may further include mapping the external device to the corresponding channel based on characteristics of the channel and the external device. Thus, when the external device is registered to the channel of the TV, the external device related to the characteristic of the channel and external device are registered so that more efficient viewing environments can be provided to a user.

The characteristics of the channel may include at least one among a characteristic of content provided via the channel, a user preference information (e.g., favorite channels) with regard to the channel, and a user's viewing history information with regard to the channel. Thus, the external device related to the broadcast content is recommended, or the external device suitable for a user is recommended based on a user's favorite channel and a user's viewing history, thereby providing a user with more efficient viewing environments.

The characteristics of the external device may include at least one among the type of external device, usage pattern of the external device, and a user's history of using the external device. Thus, when the external device is registered to the channel of the TV, a user is provided with recommended information so that the external device can be registered to a suitable channel based on the type and use of external devices and a user's history of using the external device.

The information about the external device may include information about a user of the external device. Thus, when the external device is registered to the channel of the TV, it is also possible to communicate with the user of the external device based on her information corresponding to the external device in addition to the operations of controlling the external device.

The method may further comprise displaying a user interface (UI) for communication with a user of the external device corresponding to the mapped channel based on the information about the user of the external device corresponding to the mapped channel. Thus, the TV displays not only a broadcast image but also a graphic icon of providing a function for communication with a user of the external device, so that a user can directly contact the other parties of the external devices while watching TV.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The present disclosure may be achieved in various forms and not limited to the following embodiments. For convenience of description, parts not directly related to the present disclosure are omitted, and like numerals refer to like elements throughout.

Figure 1:
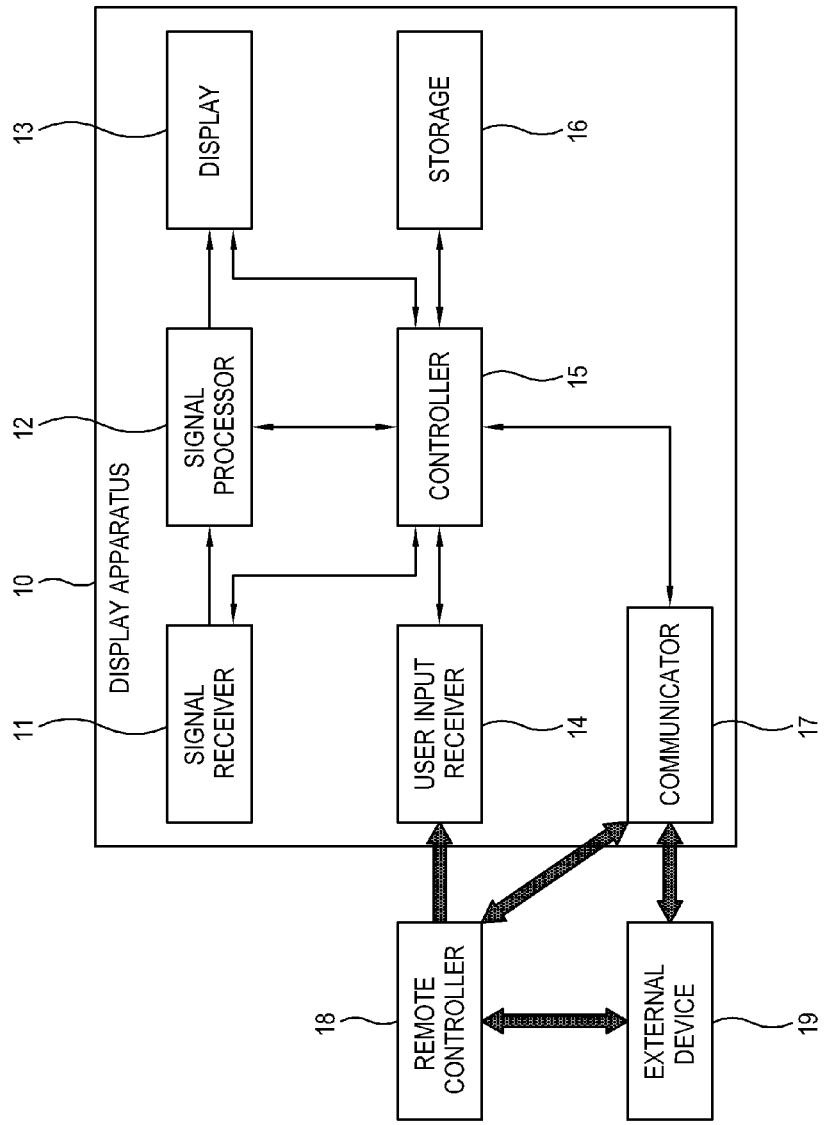
FIG. 1 is a block diagram of a display apparatus according to an aspect of an exemplary embodiment.

First, elements included in a display apparatus according to an aspect of an exemplary embodiment will be described in detail with reference to FIG. 1, and FIGS. 5 to 47 will be also referred to as necessary. FIG. 1 is a block diagram of a display apparatus according to an aspect of an exemplary embodiment. As shown in FIG. 1, a display apparatus 10 according to this exemplary embodiment may include a signal receiver 11, a signal processor 12, a display 13, a user input receiver 14, a controller 15, a storage 16, and a communicator 17, and may, for example, be implemented as a smart TV, a smart phone, a tablet computer, a personal computer (PC), a netbook computer, a notebook computer, etc. The display apparatus 10 is capable of communicating with a remote controller 18 and an external device 19 through wireless communication, e.g., infrared communication, Wi-Fi, Bluetooth, etc. Further, the external device 19 may be an electronic device including a wireless communication module. The display apparatus 10, according to this exemplary embodiment, may further include other additional elements without being limited to the elements according to the foregoing embodiment.

The display apparatus 10 may receive and process a broadcast signal. In response to a user's input, the display apparatus 10 may store information about the external device in the storage 16 so that the external device 19 may be mapped with one channel among the plurality of channels. The display apparatus 10 may display information about the external device 19 corresponding to the mapped channel, and perform operations for controlling the external device 19 corresponding to the mapped channel. According to an aspect of an exemplary embodiment, the display apparatus 10 may have an advantage of allowing a user to easily register an external device to a broadcast channel through an input device such as a remote controller. Further, the display apparatus 10 may offer a convenient way for a user to directly control an external device while viewing a broadcast because the external device may be registered to a channel to which a broadcast signal is allocated. A channel may be a physical or virtual channel over which media content such as a broadcast program may be delivered. For example, a channel may correspond to a specific frequency band over which a broadcast signal may be conveyed. In another example, a channel may be a virtual channel that serves to distinguish or demarcate one type of content from another type of content. Thus, a display apparatus such as a television set can have multiple channels, each of which may be allocated to a broadcast station, a media source (e.g., a digital versatile disc (DVD) player), an external device (e.g., a communicating device, an appliance), or like source.

The signal receiver 11 may receive a broadcast signal. The signal receiver 11 may be variously achieved in accordance with formats of the received broadcast signal and the types of the display apparatus 10. For example, the signal receiver 11 may be a tuner for receiving a radio frequency (RF) broadcast signal received from a broadcasting station or a satellite. Alternatively, the signal receiver 11 may receive an image signal from an external apparatus connected to the display apparatus 10, for example, a digital versatile disc (DVD) player or the like. In addition, the signal receiver 11 may be variously achieved to receive a broadcast signal without being limited to this exemplary embodiment.

The signal processor 12 may perform a plurality of signal processes with regard to the broadcast signals received by the signal receiver 11. The plurality of signal processes may include removing crosstalk from an image signal, performing forward error correction (FEC), changing a speed of automatic gain control (AGC) for an analog television (ATV)/digital television (DTV), changing an equalizer slope, changing a pilot size, changing a detection range for a symbol rate, phase tracking loop gain, changing a frequency, etc., but are not limited thereto.

The display 13 may display an image based on a broadcast signal processed by the signal processor 12. The display 13 may be achieved by various types. For example, the display 13 may be a plasma display panel (PDP), a liquid crystal display (LCD), an organic light emitting diode (OLED) display, a flexible display, etc.

The communicator 17 may connect with the remote controller 18 and/or the external device 19. The communicator 17 may communicate with the remote controller 18 by infrared, Wi-Fi, Bluetooth, or like communication method. Further, the communicator 17 may communicate with the external device 19 by Wi-Fi, Bluetooth, Transmission Control Protocol (TCP)/Internet protocol (IP), or like communication method. Accordingly, the communicator 17 may receive a user's input through the connection with the remote controller 18, or receive information from the external device 19 or transmit a control signal to the external device 19 through the connection with the external device 19.

The user input receiver 14 may receive a user's input. For example, the user input receiver 14 may be a keyboard, a mouse, etc., or may be an input panel provided on the outside of the display apparatus 10. According to an aspect of an exemplary embodiment, the user input receiver 14 may receive a user's input through the remote controller 18. The remote controller 18 may have buttons or direction keys, or may be a pointing remote controller.

The storage 16 may store information about channels and external devices. For example, the storage 16 may store identification information about the external devices 19 respectively mapped to the channels. Alternatively, the storage 16 may store information about users of the external devices respectively mapped to the channels.

Figure 6:
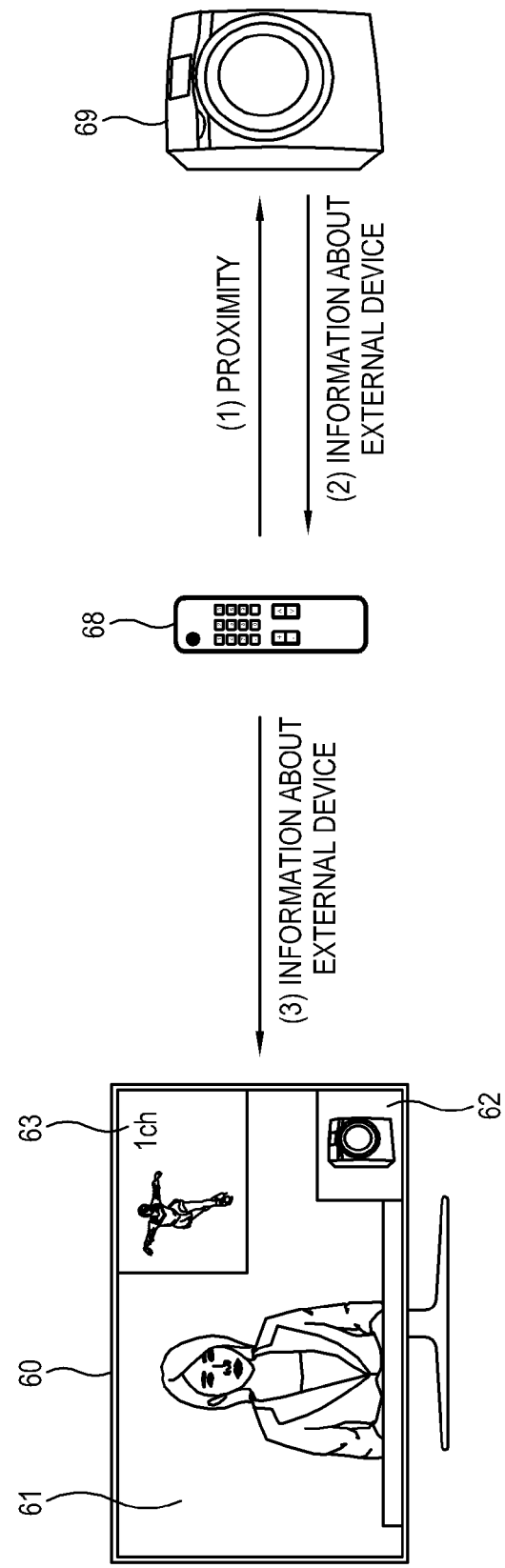
FIG. 6 illustrates an example of registering an external device to a viewing channel through a remote controller according to an aspect of an exemplary embodiment.

The controller 15 may control the storage 16 to store information about the external devices 19 so that at least one external device 19 may be mapped to one channel among the plurality of channels in response to the received user's input. According to an exemplary embodiment, the display apparatus 10 may further include a remote controller 18 for receiving a user's input, and the user input receiver 14 may receive a user's input through the remote controller 18. In this case, the remote controller 18 may receive information about the external device 19 from the external device 19, and the controller 15 may control the storage 16 to store the information about the external device 19 received in the remote controller 18. For instance, as shown in FIG. 6, by a method of placing the remote controller 68 in proximity to the washing machine 69, a display apparatus 60 may map the washing machine 69 to channel number 1 (63) while displaying an image corresponding to channel 1 (63). That is, the display apparatus 60 may receive the identification information and the like of the washing machine 69 from the washing machine 69 through the remote controller 68 and control the storage 15 to store the identification information to correspond to channel 1 (63), so that the washing machine can be matched to channel 1 (63).

Figure 17:
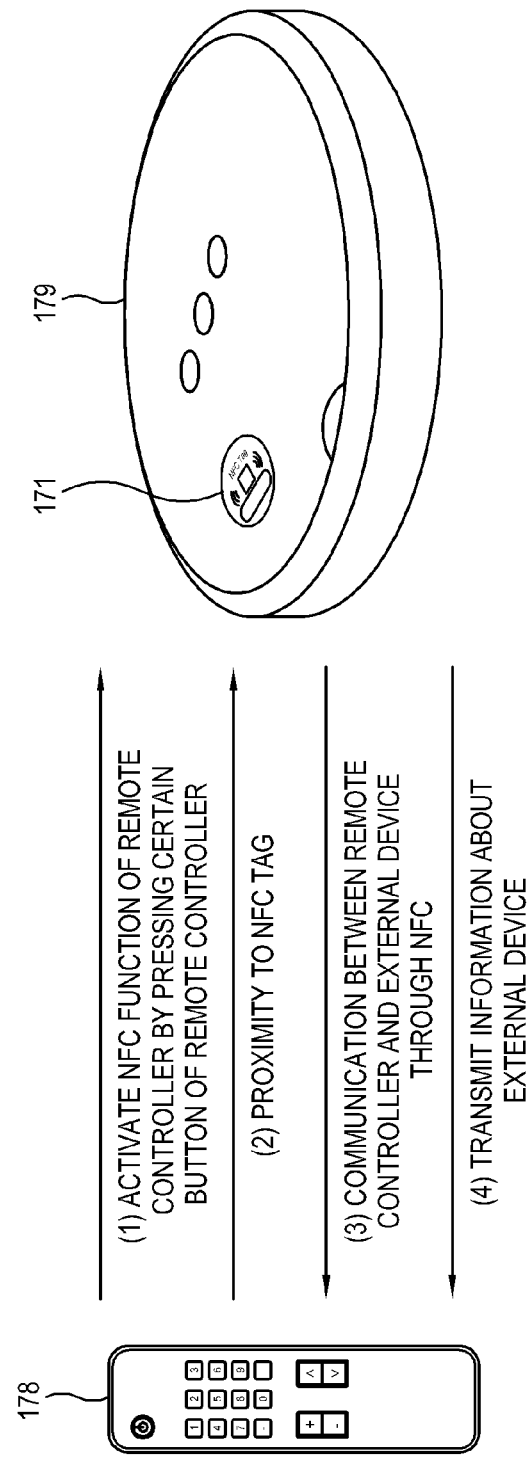
FIG. 17 illustrates an example of registering an external device equipped with an NFC tag to a channel according to an aspect of an exemplary embodiment.
Figure 19:
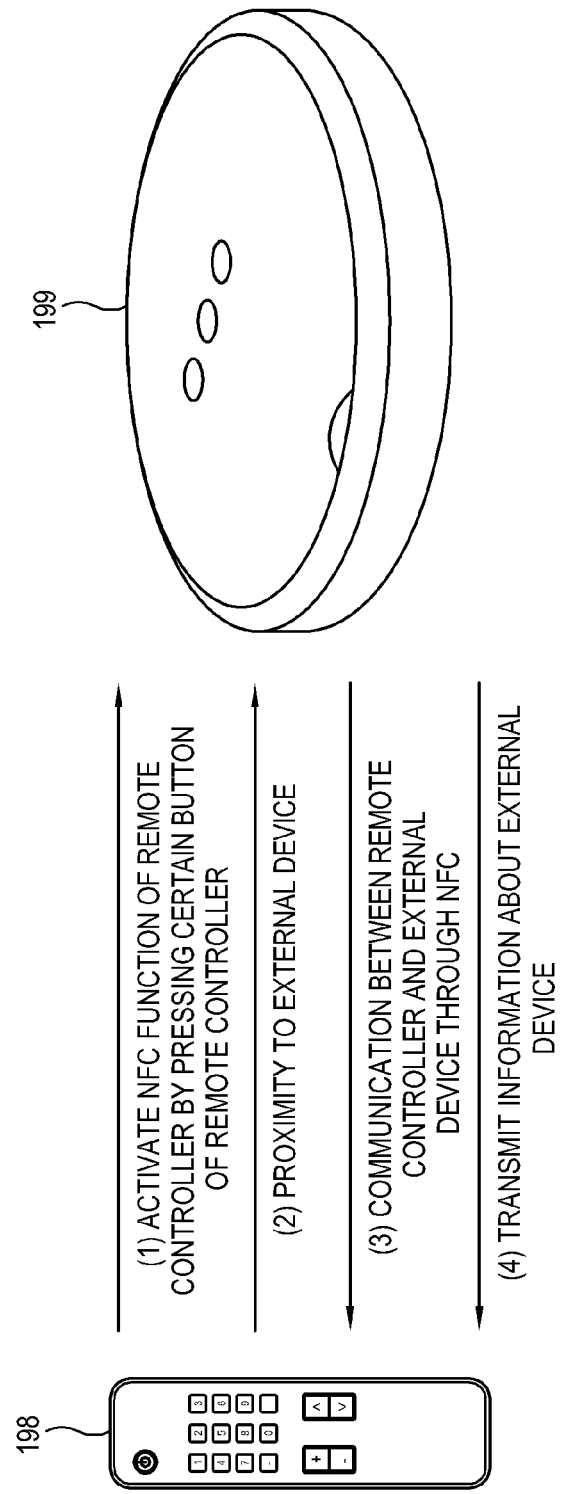
FIG. 19 illustrates an example of registering an external device with a built-in NFC module to a channel according to an aspect of an exemplary embodiment.

The remote controller 18 may receive the information about the external device 19 from the external device 19 through at least one of the communication methods such as NFC, Wi-Fi, and Bluetooth. For instance, as shown in FIG. 17, if a remote controller 178 supports NFC, near field communication between the remote controller 178 and a robot cleaner 179 tagged with an NFC tag sticker 171 may be enabled by placing the remote controller 178 in proximity to the robot cleaner 179. In this case, the remote controller 178 may communicate with the robot cleaner 179 through NFC, and thus obtain information about the robot cleaner 179 from the robot cleaner 179. Alternatively, as shown in FIG. 19, if the remote controller 198 supports NFC, information about the robot cleaner 199 having a built-in NFC module may be obtained by placing the remote controller 198 in proximity to the robot cleaner 199.

Figure 5:
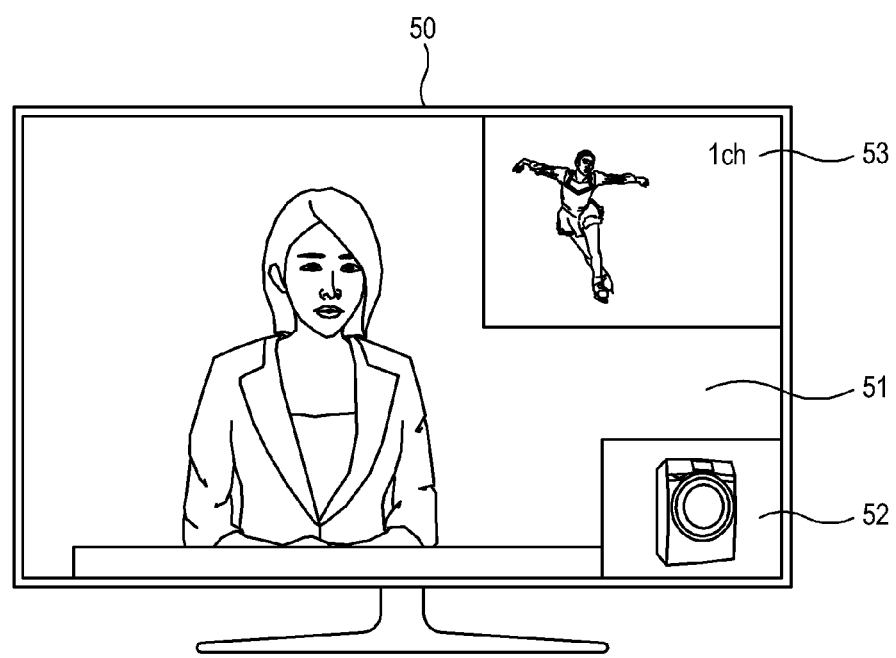
FIG. 5 illustrates an example of displaying a broadcast image and a user interface (UI) for controlling an external device according to an aspect of an exemplary embodiment.

The controller 15 may display the information about the external device 19 corresponding to the mapped channel, and control the external device 19 corresponding to the mapped channel. At this time, controlling the external device 19 corresponding to the mapped channel may be performed based on the information about the external device 19 stored in the storage 16. According to an aspect of an exemplary embodiment, the controller 15 may control the display 13 to display a user interface (UI) having at least one item for controlling the external device 19 corresponding to an image of the mapped channel. As shown in FIG. 5, a display apparatus 50 may display a washing machine mapped to channel 1 (53) in the form of a graphic icon 52 having a predetermined size at a predetermined area of the display 13, while displaying an image 51 of channel 1 (53). At this time, the graphic icon 52 displayed on the display 13 may be in the form of a picture-in-picture window or graphic plane, and may also be given in various forms without limitation.

The controller 15 may control an external device 19 based on a user's input using the UI. For instance, as shown in FIG. 5, if a washing machine icon 52 displayed together with an image 51 corresponding to channel 1 (53) is selected by the remote controller 18 or other input devices, the display apparatus 50 can directly control an external device such as the washing machine.

Figure 8:
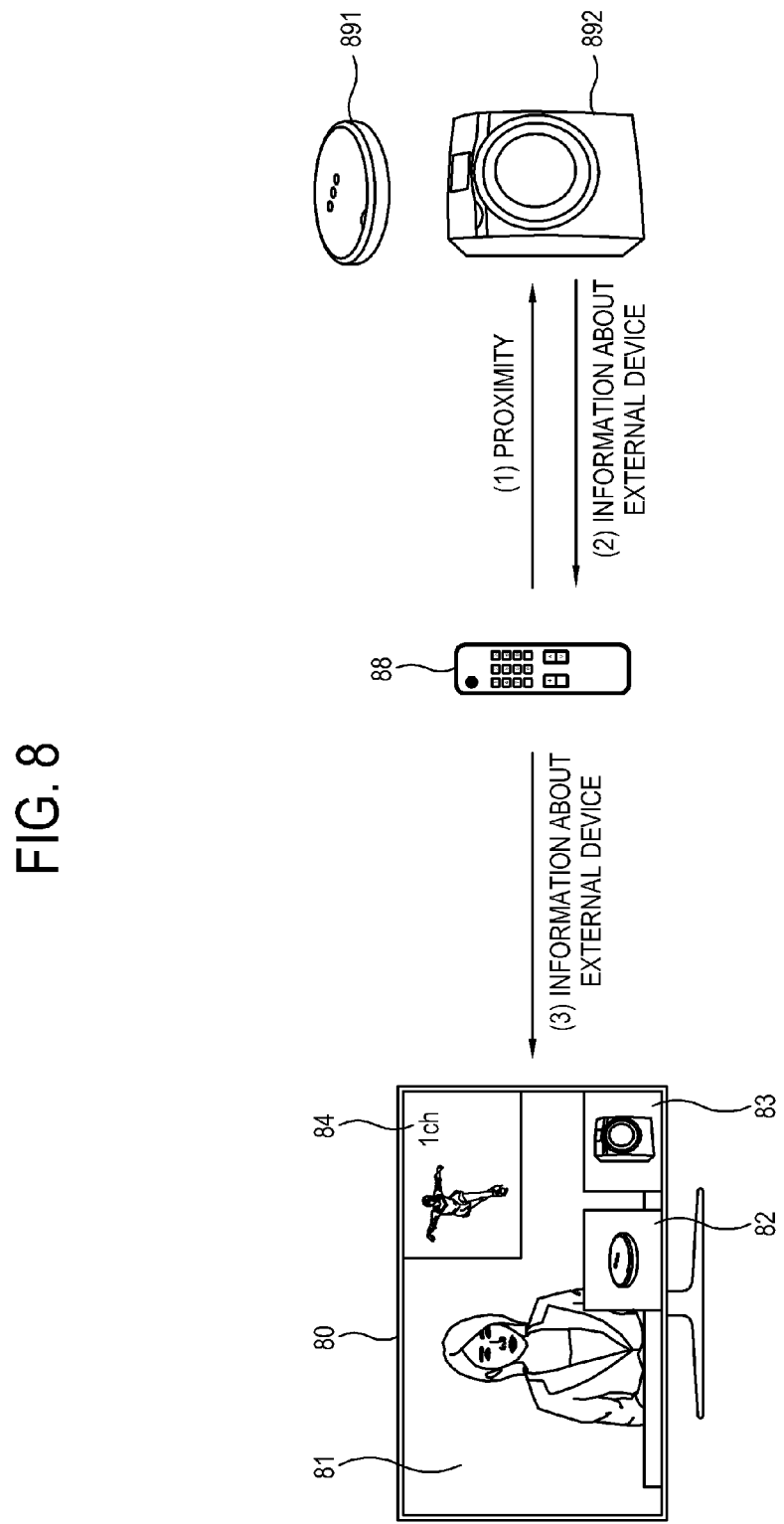
FIG. 8 illustrates an example of registering a plurality of external devices to a viewing channel through a remote controller according to an aspect of an exemplary embodiment.

According to an aspect of an exemplary embodiment, the controller 15 may control the display 13 to display a UI for controlling the plurality of external devices 19 corresponding to the mapped channels. As shown in FIG. 8, if a remote controller 88 is placed in proximity to each of a robot cleaner 891 and a washing machine 892, a display apparatus 80 may map both the robot cleaner 891 and the washing machine 892 to channel 1 (84) while displaying an image 81 of channel 1 (84). When the mapping is completed, the display apparatus 80 may display a robot cleaner icon 82 and a washing machine icon 83 together with the image 81 corresponding to channel 1 (84). Thus, it is possible for the user to control the robot cleaner 891 and the washing machine 892 through the robot cleaner icon 82 and the washing machine icon 83, respectively.

According to an aspect of an exemplary embodiment, the display apparatus 10 may transmit a control signal for controlling the external device corresponding to the mapped channel based on a user's input to the remote controller 18, and the remote controller 18 may output the control signal to the external device 19, thereby controlling the external device 19. In this case, the control of the external device 19 in the display apparatus 10 may be performed by the remote controller 18.

According to another aspect of an exemplary embodiment, the controller 15 may send the external device 19 the control signal for controlling the external device 19 corresponding to the mapped channel based on a user's input, so that the display apparatus 10 can control the external device 19. In this case, the remote controller 18 may receive a user's input, and the control of the external device 19 may be implemented by the display apparatus 10.

According to still another aspect of an exemplary embodiment, the controller 15 may control the remote controller 18 to generate a control signal for controlling the external device 19 corresponding to the mapped channel based on a user's input, so that the remote controller 18 may output the generated control signal to the external device 19. In this case, the remote controller 18 may directly control the external device 19, and the display apparatus 10 may display a UI for controlling the external device 19 mapped to the channel and display information about results from controlling the external device 19 received from the remote controller 18.

Such a method of controlling the external device 19 by the display apparatus 10 is not limited to the foregoing exemplary embodiments, and may be achieved variously in accordance with surrounding communication environments and the types of devices for receiving a user's input.

Figure 42:
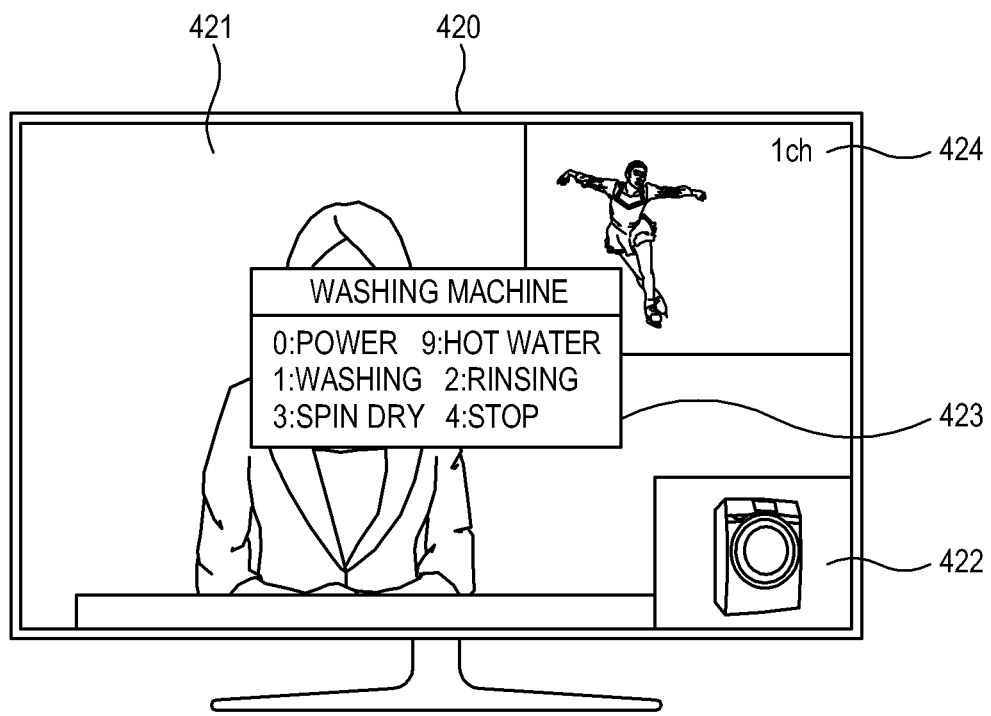
FIG. 42 illustrates an example of a UI having additional information for controlling an external device according to an aspect of an exemplary embodiment.

The controller 15 may control the display 13 to display additional information for controlling the external device 19, based on a user's input using the displayed UI. As shown in FIG. 42, a display apparatus 420 may display a washing machine icon 422 while displaying an image 421 corresponding to channel 1 (424), and display a UI 423 with a user guide for controlling the washing machine by selecting the washing machine icon 422 through the remote controller 18 or other input devices. At this time, it is possible to control operations of the washing machine through the displayed UI 423. To select the washing machine icon 422 and control the washing machine through the UI 423 including the user guide, a default button on the remote controller or a separate button for controlling the washing machine may be used.

Figure 43:
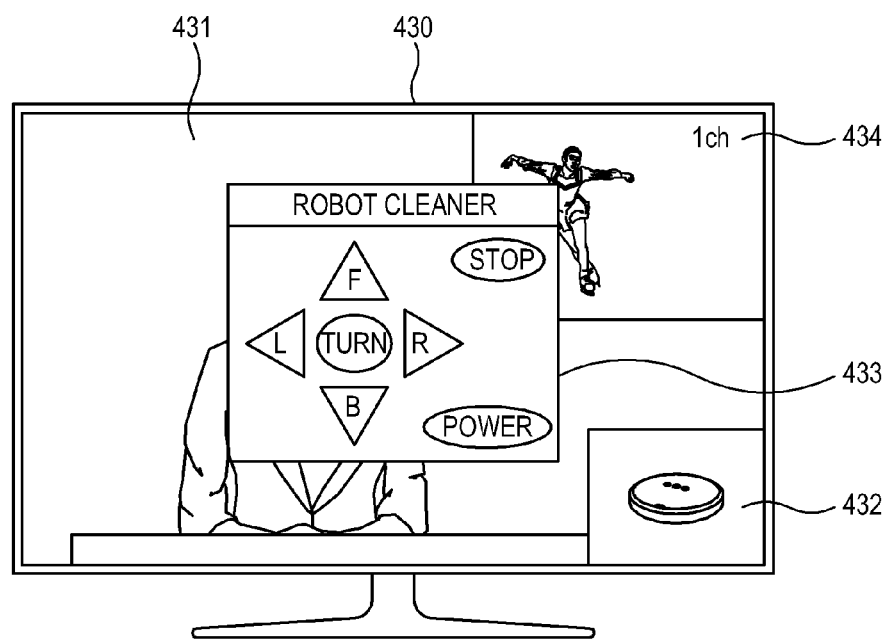
FIG. 43 illustrates an example of a UI having additional information for controlling an external device according to an aspect of an exemplary embodiment.

In addition, the additional information for controlling the external device 19 may be displayed differently in accordance with the type of external device 19. According to an exemplary embodiment, as shown in FIG. 43, in a case where the robot vacuum cleaner is mapped to channel 1 (434), a robot cleaner icon 432 may be displayed together with an image 431 corresponding to channel 1 (434), and a UI 433 including the user guide may be displayed for controlling the robot cleaner in response to selection of the robot cleaner icon 432. At this time, the UI 433 for controlling the robot cleaner may be displayed in a different form from the UI 423 for controlling the washing machine shown in FIG. 42. That is, the UI 423 for controlling the washing machine may include, for example, "power," "washing," "rinsing," "spin-dry," "stop," "hot water," "power," "washing," and the like buttons, while the UI 433 for controlling the robot cleaner may include, for example, "forward," "backward," "leftward," "rightward," "turn," "stop," "power," and the like buttons corresponding to the functions of the robot cleaner. Thus, the additional information for controlling the external device 19 may be displayed as a UI suitable for controlling the functions of the external device 19 in accordance with the device type of the external device 19.

According to an alternative embodiment, the additional information for controlling the external device 19 may be varied depending on user settings. That is, the additional information for controlling the external device 19 may be stored as a default in the display apparatus 10 or may include information received from the external device 19. Besides, the additional information for controlling the external device 19 may be directly configured in such a manner that a user selectively sets her desired functions among the plurality of functions supported in the external device 19.

Figure 39:
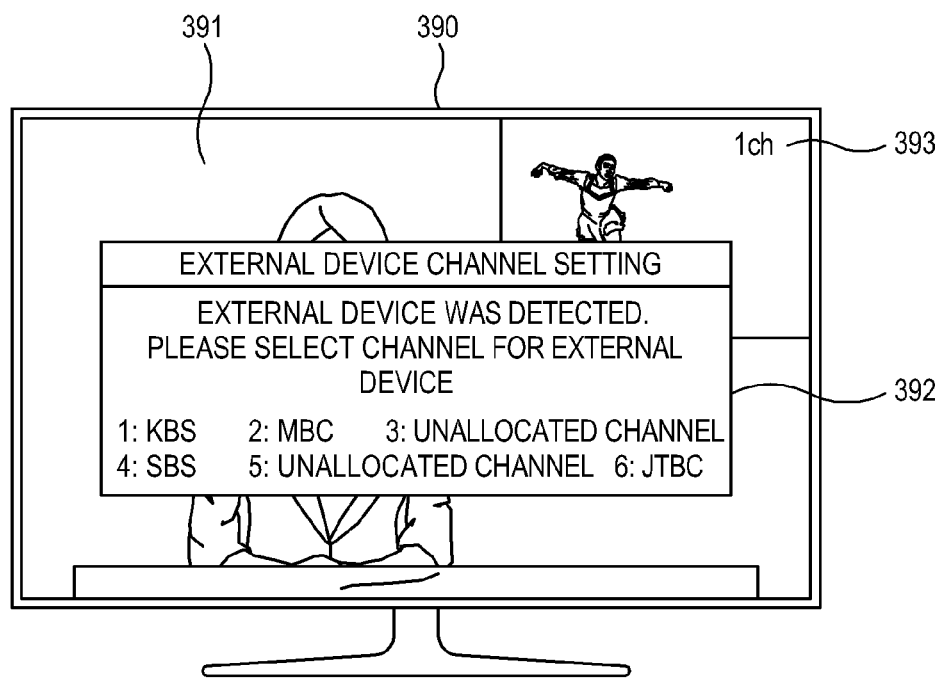
FIG. 39 illustrates an example of a user setting UI for registering an external device to a broadcast channel or unallocated channel according to an aspect of an exemplary embodiment.

The controller 15 may display a UI for user settings so that the external device 19 can be mapped to an unallocated (i.e., unoccupied, unmapped, unassigned) channel or a channel to which a broadcast signal is allocated among a plurality of channels, and map the external device 19 to the allocated or unallocated channel in response to a user's input to the displayed UI. As shown in FIG. 39, if the remote controller 18 is used to register the external device 19 to a channel, a UI 392 for selecting a channel for registration may be displayed in order to register the external device 19 sensed by the remote controller 18 through NFC, Wi-Fi or the like. The external device 19 may be registered to a desired channel selected among channels to which broadcast signals are allocated, such as "1:KBS," "2:MBC," "4:SBS," and "6:JTBC," or selected among unallocated channels such as "3:Unallocated" and "5:Unallocated," through the displayed UI 392.

Figure 33:
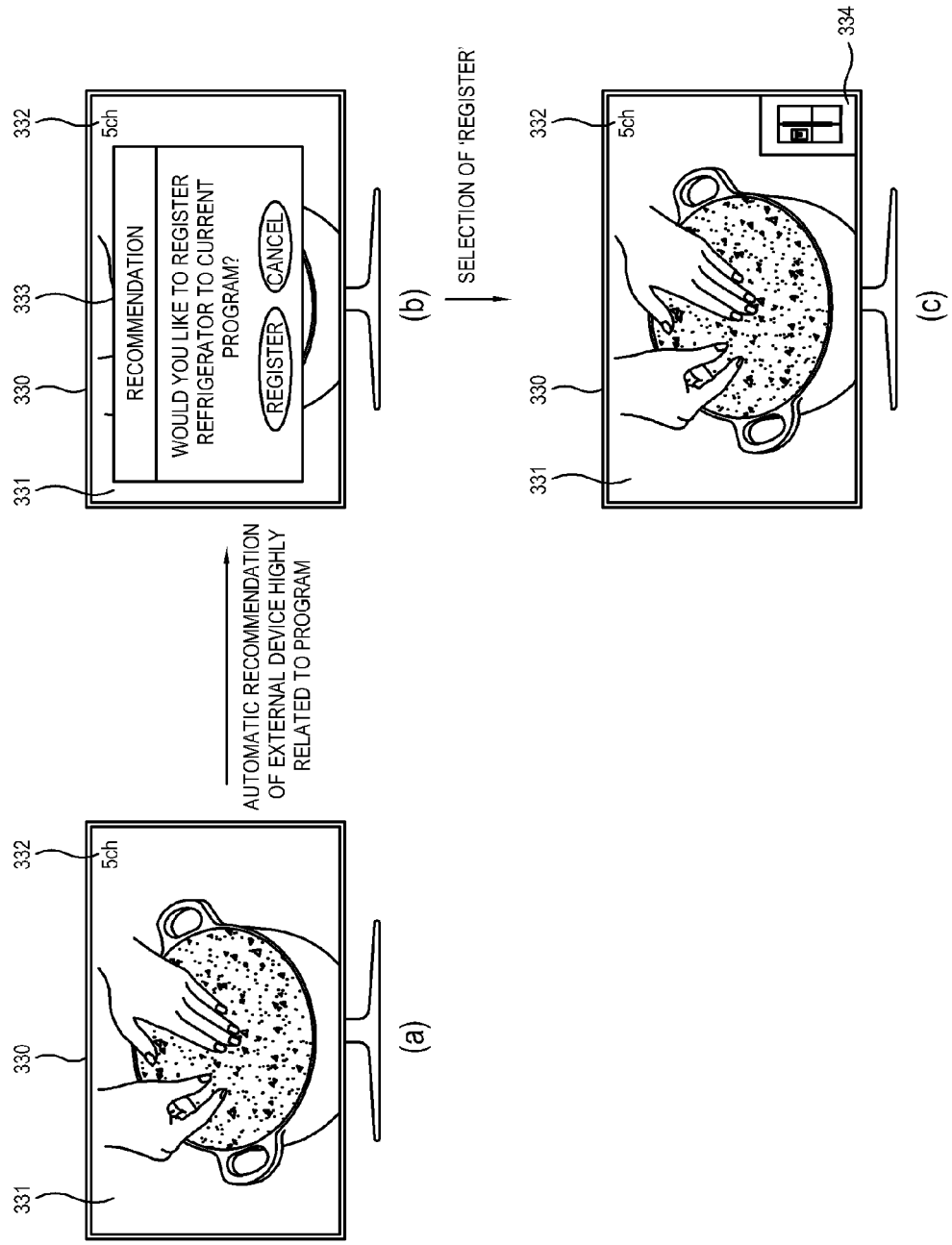
FIG. 33 illustrates an example of screens to register an external device automatically recommended in connection with a broadcast program to a channel according to an aspect of an exemplary embodiment.

The controller 15 may map the external device 19 to a corresponding channel by taking the characteristics of the channel and external device 19 into account. Here, the characteristics of the channel may include a characteristic of contents provided by a channel, a user's favorite information with regard to a channel, and a user's viewing history information with regard to a channel. As shown in FIG. 33, a display apparatus 330 may automatically search for the external device 19 that is related to, for example, the characteristic of channel 5 (332) through a local network, Wi-Fi or Bluetooth, and recommend the related external device to a user while displaying an image 331 of channel 5 (332). That is, if channel 5 (332) is characterized by content related to cooking, the display apparatus 330 may search for an external device 19 that is related to cooking, and a UI 333 may be displayed for recommending, for example, a refrigerator to be registered to channel 5 (332). In this case, if a user selects "Register" through the displayed UI 333, the refrigerator may be mapped to channel 5 (332) and thus a refrigerator icon 334 may be displayed, so that a user can control the refrigerator while viewing the image 331 corresponding to channel 5 (332). According to another aspect of an embodiment, if it is determined that a user frequently views channel 5 (332) and/or other channels related to cooking, the display apparatus 330 may recommend the refrigerator to be registered to some or all of those channels related to cooking among channels viewed by a user. According to still another embodiment, if it is determined that a user views channel 5 (332) for a time longer than a preset time, one or more external devices 19 frequently controlled by the user in the display apparatus 330 may be recommended for registration with channel 5 (332).

Further, the characteristics of the external device 19 may include the device type of external device 19, the use of the external device 19, and a user's history of using the external device 19. For instance, if the display apparatus 10 is set to recommend the external device 19 with respect to the viewing channel, the external device 19, which is used by a user for a time longer than a preset time, may be determined among the external devices 19 searched through a local network, Wi-Fi, Bluetooth, etc. and then be recommended for registration with the viewing channel. Alternatively, when the channel related to cooking is being viewed, an external device related to cooking such as a refrigerator, an electric oven, a microwave oven, an electric cooker, or a coffee maker may be recommended for registration with the corresponding channel among the searched external devices 19.

According to an exemplary embodiment, the information about the external device 19 may include information about a user of the external device 19. For example, if the external device 19 to be mapped to a channel is a smart phone, the remote controller 18 may receive not only the identification information from the smart phone but also information about a user of the smart phone, for example, a name, a username, a phone number, an E-mail address, a social network service (SNS) address, and the like information.

Figure 11:
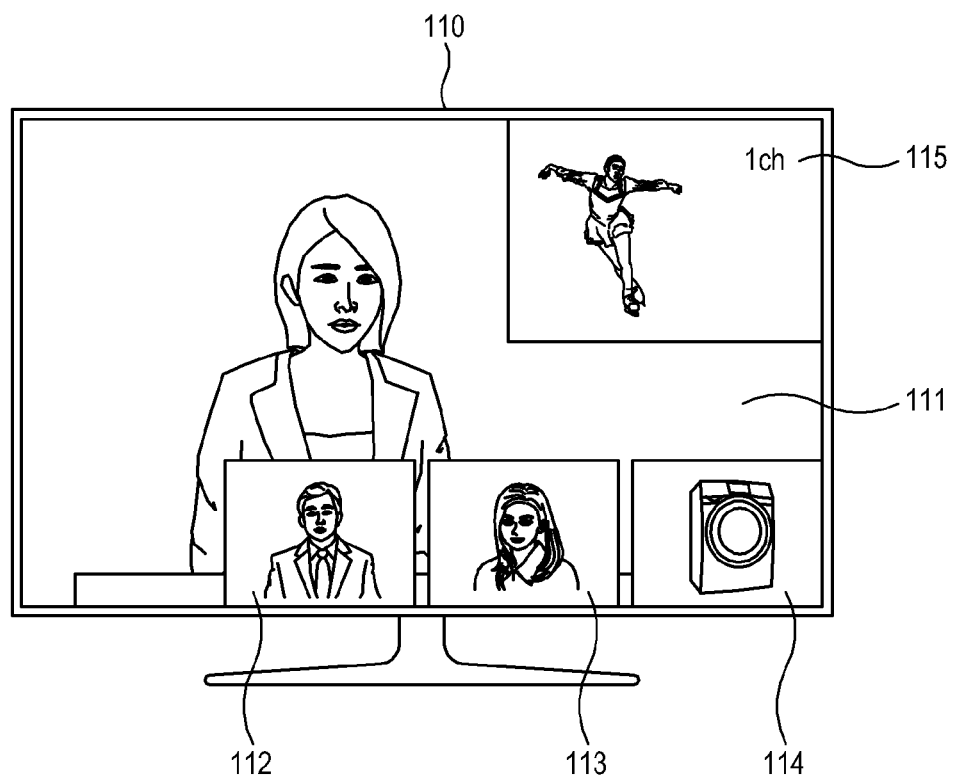
FIG. 11 illustrates an example of a UI for controlling an external device and communicating with a user of the external device while displaying a broadcast image according to an aspect of an exemplary embodiment.

The controller 15 may display a UI for communicating with users of the external devices 19 corresponding to the mapped channels based on information about the users of the external devices 19 corresponding to the mapped channels. As shown in FIG. 11, while an image 111 of channel 1 (115) is being displayed, a father icon 112, a mother icon 113 and a washing machine icon 114 may be displayed alongside the image 111. For example, the father icon 112, the mother icon 113, and the washing machine icon may be overlaid on top of the image 111. Here, the father icon 112 and the mother icon 113 may be registered using a father's smart phone and a mother's smart phone, and implemented as a UI including a function for controlling the smart phones and for communicating with users of the smart phones (i.e. the father and the mother). Alternatively, the father icon 112 and the mother icon 113 may only allow the user to communicate with the respective persons but not necessarily allow the user to control the respective smart phones. That is, the father icon 112 and the mother icon 113 may enable the user to have a voice call, a video call, message transmission, file transmission, E-mail transmission, etc. with regard to the father and the mother.

Figure 2:
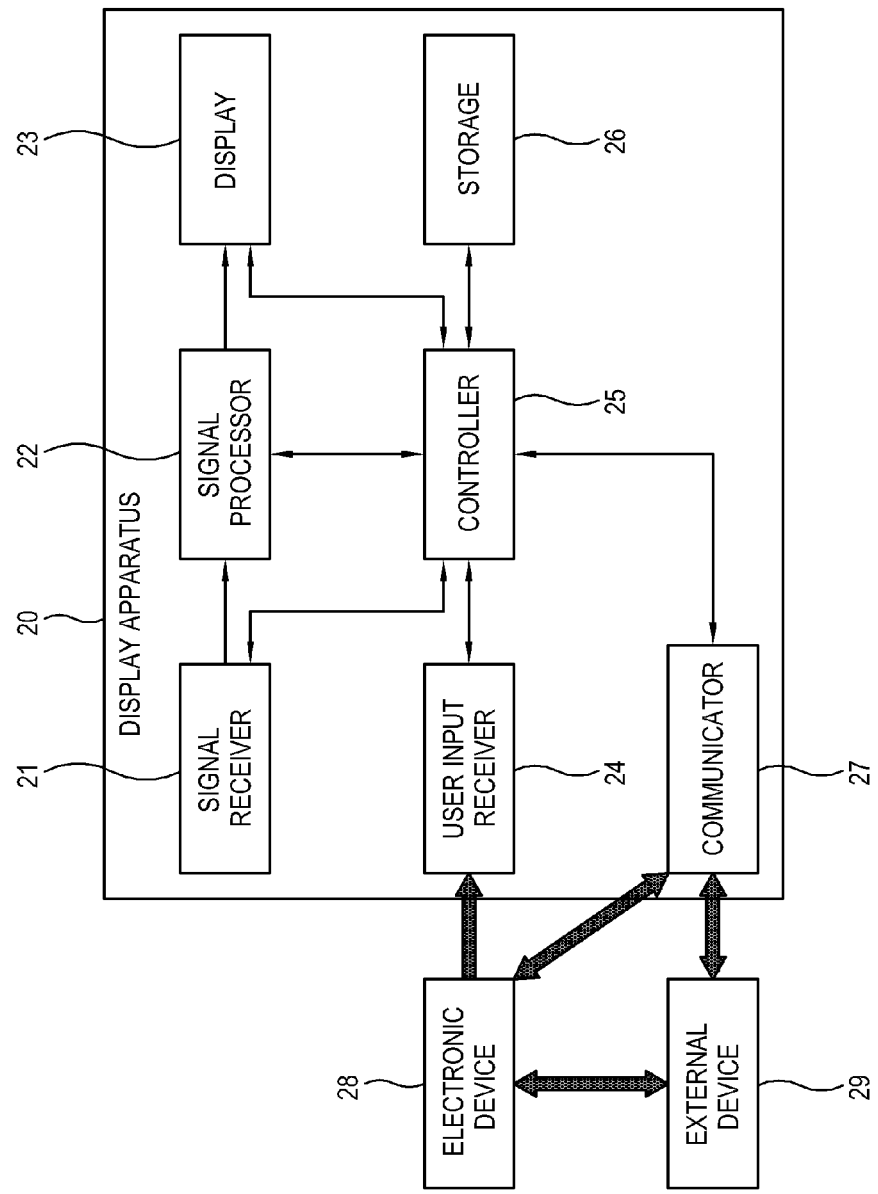
FIG. 2 is a block diagram of a display apparatus according to an aspect of an exemplary embodiment.

FIG. 2 is a block diagram of a display apparatus according to an aspect of an exemplary embodiment. As shown in FIG. 2, according to an aspect of an exemplary embodiment, the display apparatus 20 may include a signal receiver 21, a signal processor 22, a display 23, a user input receiver 24, a controller 25, a storage 26 and a communicator 27, and may, for example, be implemented as a smart TV, a smart phone, a tablet computer, a personal computer (PC), a netbook computer, a notebook computer, etc. The display apparatus 20 may be capable of communicating with an electronic device 28 and an external device 29 through wireless communication (e.g., Wi-Fi, Bluetooth, etc.). The electronic device 28 may be a wireless communication device such as a smart phone, a tablet computer, etc., or a wearable device such as a smart watch, etc. Further, the external device 29 may be an electronic device including a wireless communication module. Here, the electronic device 28 and the external device 29 are not limited to this exemplary embodiment but may be achieved by various devices as long as they can communicate with the display apparatus 20. Further, the elements and components included in the display apparatus 20 are not limited to those of this exemplary embodiment but may additionally include other elements or components.

Among the elements included in the display apparatus 20, the signal receiver 21, the signal processor 22, the display 23, the user input receiver 24, the controller 25, the storage 26, and the communicator 27 may be the same as those described with reference to FIG. 1, and thus repetitive descriptions will be omitted as necessary.

Figure 15:
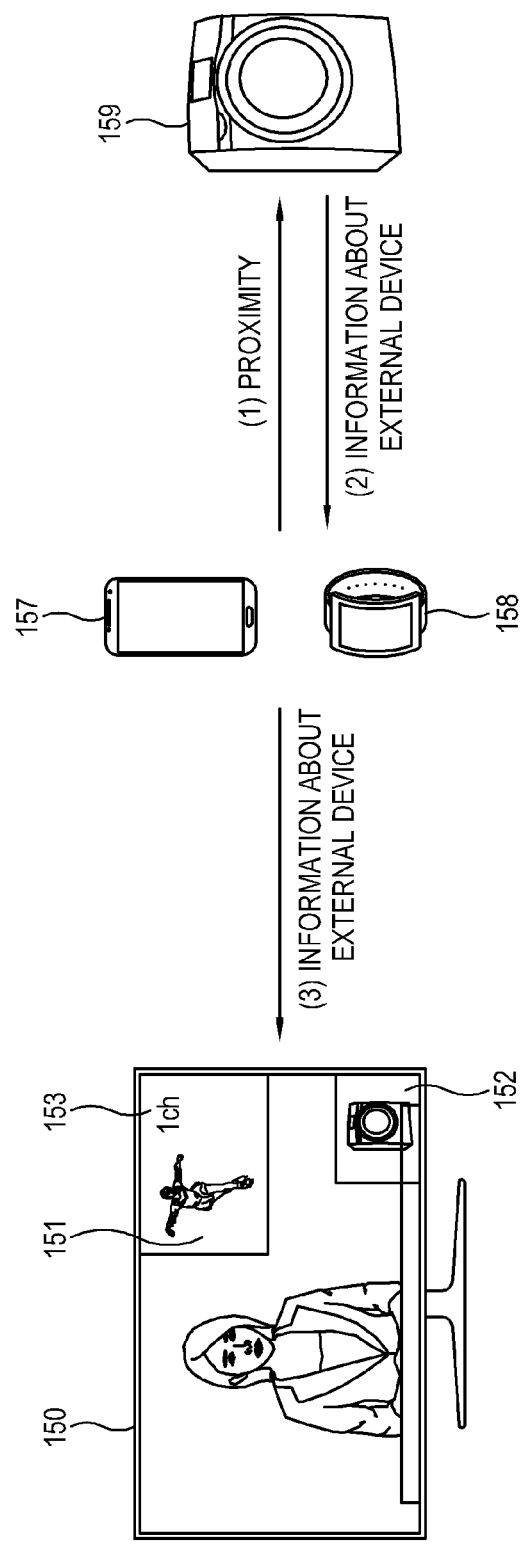
FIG. 15 illustrates an example of registering an external device to a viewing channel through an electronic device according to an aspect of an exemplary embodiment.

The user input receiver 24 may receive a user's input through the electronic device 28. In this case, the electronic device 28 may receive information about the external device 29 from the external device 29, and the controller 25 may control the storage 26 to store information about the external device 29 received by the electronic device 28. For instance, as shown in FIG. 15, by placing a smart phone 157 or a smart watch 158 in proximity to a washing machine 159, a display apparatus 150 may map the washing machine 159 to channel 1 (153) while displaying an image 151 corresponding to channel 1 (153). That is, the display apparatus 150 may receive the identification information and the like of the washing machine 159 from the washing machine 159 through the smart phone 157 or the smart watch 158 and control the storage 15 to store the received information to correspond to channel 1 (153), so that the washing machine can be matched to channel 1 (153).

Figure 20:
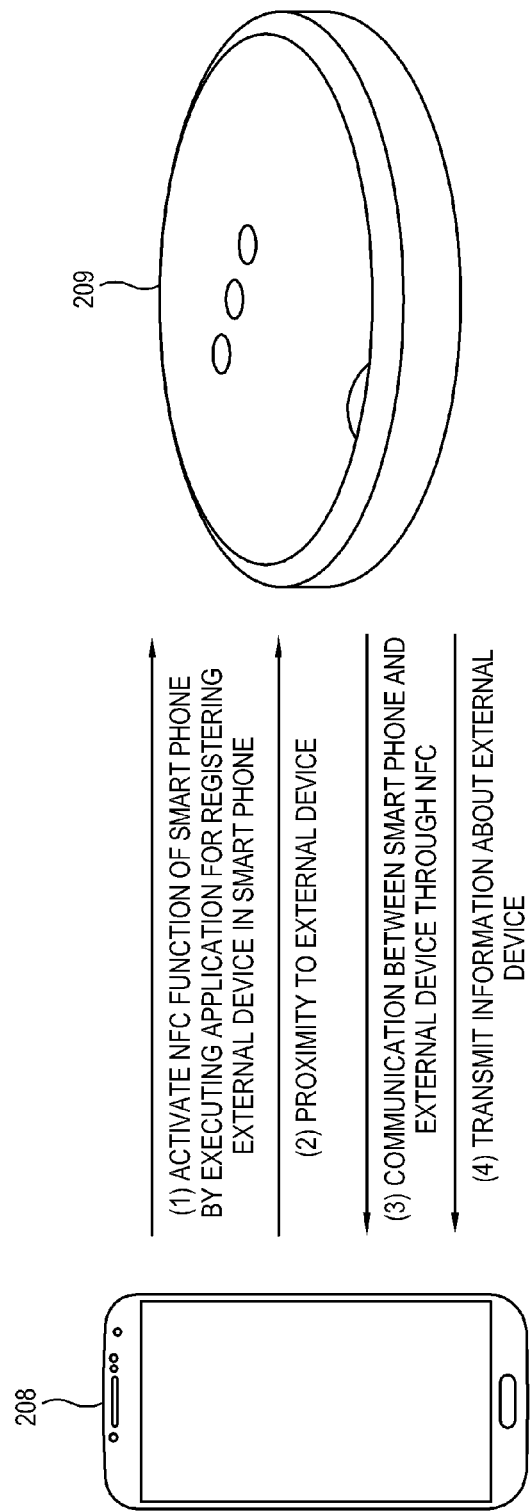
FIG. 20 illustrates an example of registering an external device with a built-in NFC module to a channel according to an aspect of an exemplary embodiment.
Figure 22:
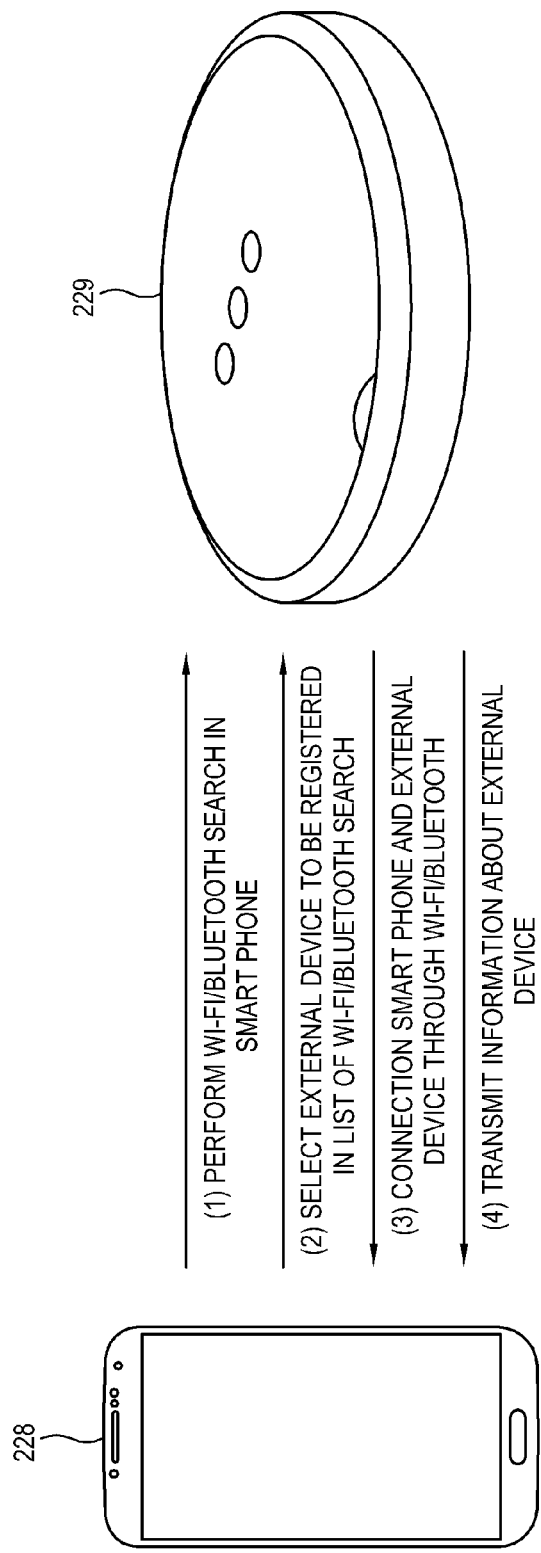
FIG. 22 illustrates an example of registering an external device with a built-in wireless communication module to a channel according to an aspect of an exemplary embodiment.

The electronic device 28 may receive the information about the external device 29 from the external device 29 through communication methods such as NFC, Wi-Fi, Bluetooth, and/or TCP/IP. For instance, as shown in FIG. 20, if a smart phone 208 activates its own NFC function by executing an application for registering an external device, and is then placed in proximity to a robot cleaner 209 having a built-in NFC module, the smart phone 208 may thereby obtain the identification information or the like of the robot cleaner 209 from the robot cleaner 209. Alternatively, as shown in FIG. 22, if a robot cleaner 229 includes a Wi-Fi or Bluetooth module, a smart phone 228 may directly connect with the robot cleaner 229 through Wi-Fi or Bluetooth settings in the smart phone 228. In this case, the smart phone 228 may obtain the identification information about the robot cleaner 229 from the robot cleaner 229 through Wi-Fi or Bluetooth communication.

Figure 3:
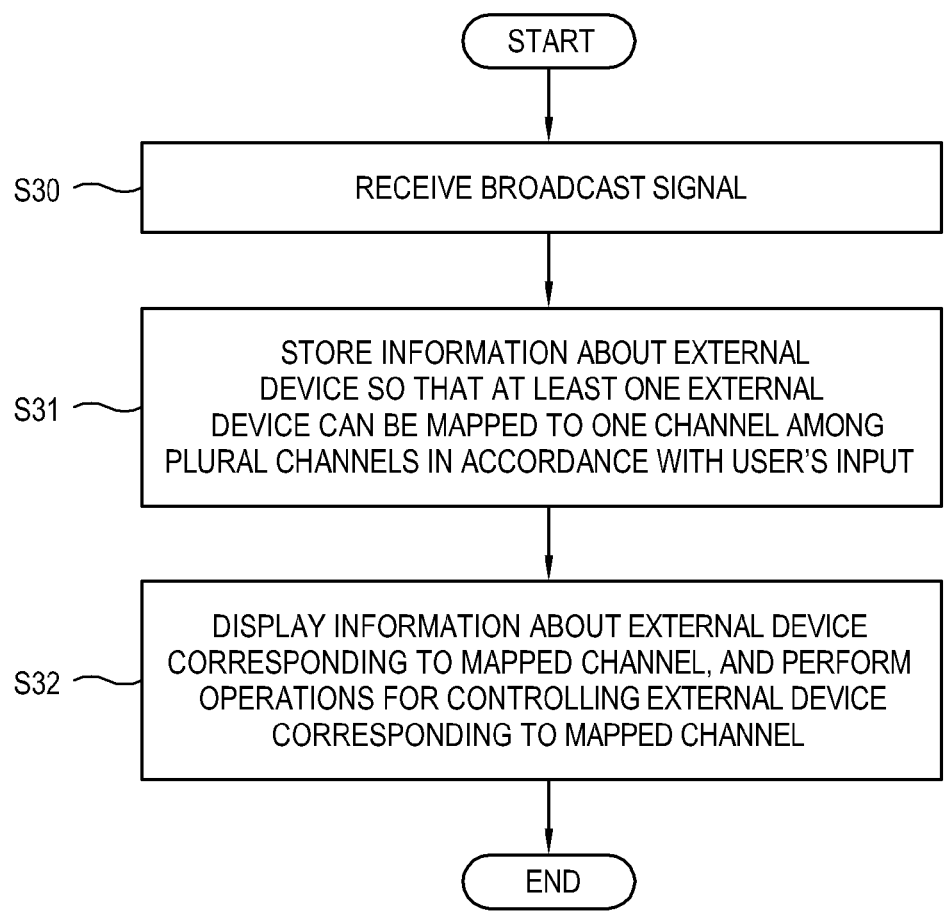
FIG. 3 is a flowchart showing a method of controlling a display apparatus according to an aspect of an exemplary embodiment.

FIG. 3 is a flowchart showing a method of controlling a display apparatus according to an aspect of an exemplary embodiment. As shown in FIG. 3, at operation S30, a broadcast signal is received. Next, at operation S31, information about an external device is stored so that at least one external device can be mapped to one channel among the plurality of channels in response to a user's input. According to an aspect of an exemplary embodiment, the operation S31 of storing the information about the external device may include an operation of receiving a user's input through the remote controller. The remote controller may receive the information about the external device from the external device, and the operation S31 of storing the information about the external device may include an operation of storing the information about the external device received by the remote controller. Further, the remote controller may receive the information about the external device from the external device through at least one communication method among NFC, Wi-Fi and Bluetooth.

According to an alternative embodiment, the operation S31 of storing the information about the external device may include an operation of receiving a user's input through the electronic device. The electronic device may receive the information about the external device from the external device, the operation S31 of storing the information about the external device may include an operation of storing the information about the external device received from the electronic device. Further, the electronic device may receive the information about the external device from the external device through at least one communication method among NFC, Wi-Fi, Bluetooth and TCP/IP.

Lastly, at operation S32, the information about the external device corresponding to the mapped channel is displayed, and operations for controlling the external device corresponding to the mapped channel is performed. According to an aspect of an exemplary embodiment, the operation 32 of performing the operations for controlling the external device may include an operation of sending the remote controller a control signal for controlling the external device corresponding to the mapped channel based on a user's input. At this time, the remote controller may output a control signal to the external device.

According to another embodiment, the operation 32 of performing the operations for controlling the external device may include an operation of sending the external device the control signal for controlling the external device corresponding to the mapped channel based on a user's input. According to still another embodiment, the operation 32 of performing the operations for controlling the external device may include an operation of controlling the remote controller to generate the control signal for controlling the external device corresponding to the mapped channel based on a user's input. At this time, the remote controller may output the generated control signal to the external device.

According to an aspect of an exemplary embodiment, there may be further provided an operation of displaying a UI for user settings so that the external device can be mapped to an unallocated channel or a channel to which a broadcast signal is allocated among a plurality of channels, and an operation of mapping the external device to the unallocated or allocated channel in response to a user's input to the displayed UI.

There may be further provided an operation of mapping the external device to a corresponding channel by taking the characteristics of the channel and external device into account. Here, the characteristics of the channel may include a characteristic of content provided by the channel, a user's favorite information with regard to the channel, and a user's viewing history information with regard to the channel. Further, the characteristics of the external device may include the device type of the external device, the use (e.g., usage pattern) of the external device, and a user's history of using the external device.

The information about the external device may include information about a user of the external device. Here, there may be provided an operation of displaying a UI for communicating with users of the external devices corresponding to the mapped channels based on information about the users of the external devices as an image of the mapped channels is displayed.

Figure 4:
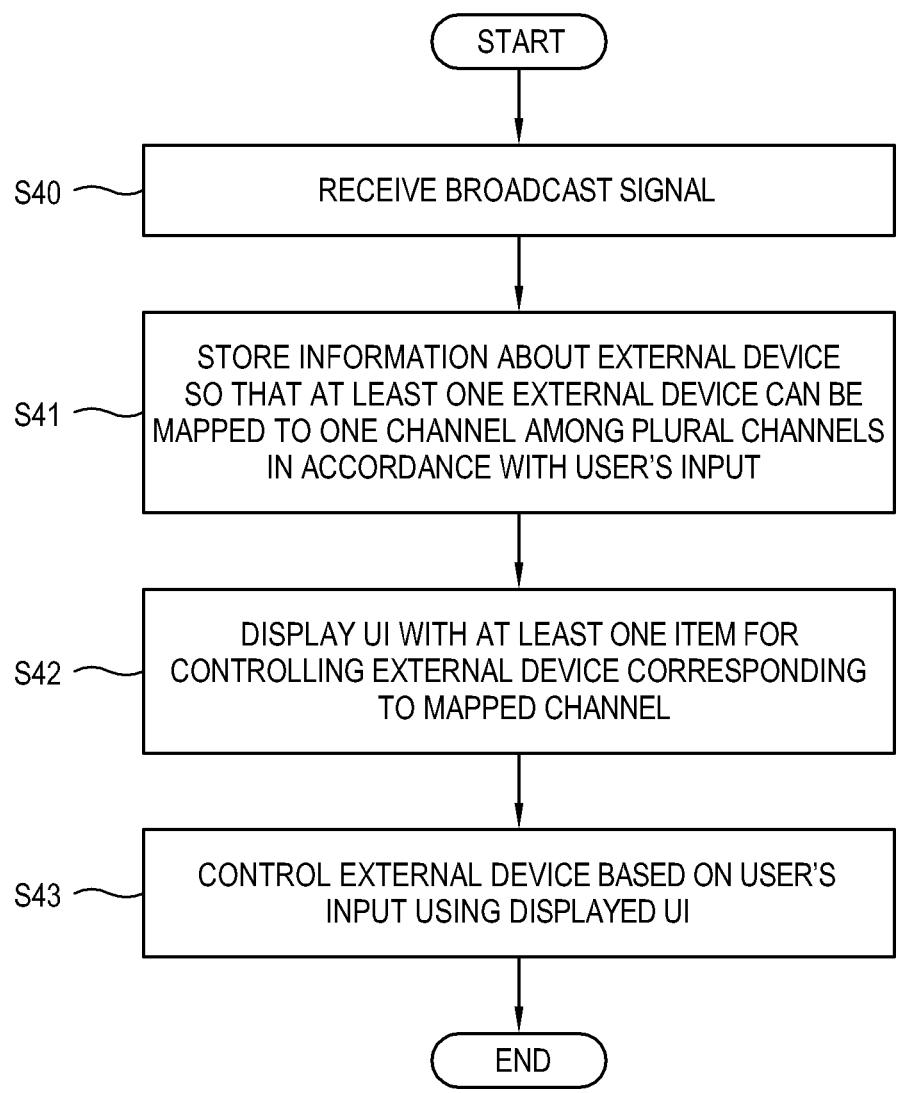
FIG. 4 is a flowchart showing a method of controlling a display apparatus according to an aspect of an exemplary embodiment.

FIG. 4 is a flowchart showing a method of controlling a display apparatus according to an aspect of an exemplary embodiment. As shown in FIG. 4, at operation S40, a broadcast signal is received. Next, at operation S41, information about an external device is stored so that at least one external device can be mapped to one channel among the plurality of channels in response to a user's input. Next, at operation S42, a user interface (UI) having at least one item for controlling the external device 19 corresponding to the mapped channel is displayed. Here, the operation S42 of displaying the UI may include an operation of displaying additional information for controlling the external device, based on a user's input using the displayed UI. At this time, the additional information for controlling the external device may be differently displayed in accordance with the type of external device. Lastly, at operation S43, the external device is controlled based on a user's input using the displayed UI.

To more specify the embodiments shown in FIG. 3 and FIG. 4, details thereof will be described with reference to FIGS. 5 to 47.

FIG. 5 illustrates an example of displaying a broadcast image and a UI for controlling an external device according to an aspect of an exemplary embodiment. As shown in FIG. 5, the display apparatus 50 may display a washing machine icon 52 for controlling the washing machine mapped to, for example, channel 1 (53) while displaying the image 51 corresponding to channel 53 (1). The washing machine icon 52 may be displayed in the form of a sub window (i.e., picture-in-picture or inset) or graphic plane at a predetermined area of a screen. If the washing machine icon 52 displayed together with the image 51 of channel 1 (53) is selected by the remote controller, the smart phone or like input device, the display apparatus 50 can directly control an external device such as the washing machine.

FIG. 6 illustrates an example of registering an external device to a viewing channel through a remote controller according to an aspect of an exemplary embodiment. As shown in FIG. 6, the display apparatus 60 may map the washing machine 69 to channel 1 (63) while displaying an image 61 of channel 1 (63) by a user placing the remote controller in proximity to the washing machine 69. That is, if the remote controller 68, while its NFC function is activated, is placed in proximity to the washing machine 69 equipped with an NFC tag sticker or having a built-in NFC module, NFC communication may be enabled between the remote controller 68 and the washing machine 69. Further, the remote controller 68 may receive the identification information of the washing machine 69 from the washing machine 69 through NFC, and transmit the received identification information of the washing machine 69 to the display apparatus 60, so that the washing machine 69 can be mapped to channel 1 (63) currently being viewed by the user.

Figure 7:
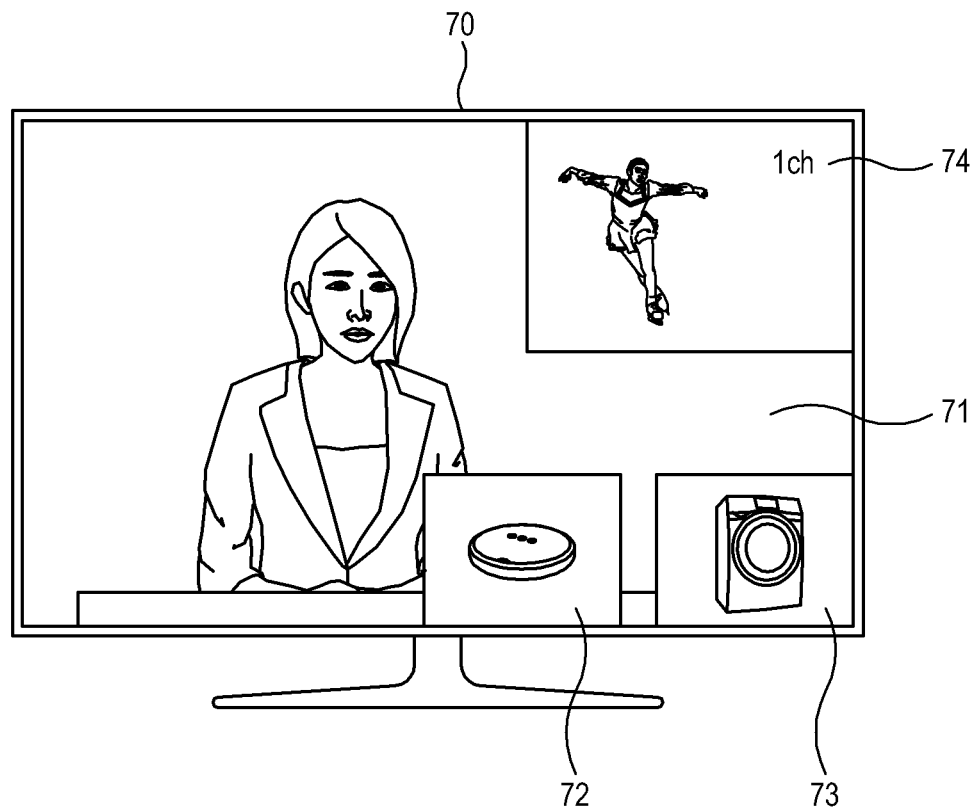
FIG. 7 illustrates an example of displaying a broadcast image and a UI for controlling a plurality of external devices according to an aspect of an exemplary embodiment.

FIG. 7 illustrates an example of displaying a broadcast image and a UI for controlling a plurality of external devices according to an aspect of an exemplary embodiment. As shown in FIG. 7, the display apparatus 70 may display a robot cleaner icon 72 and a washing machine icon 52 for respectively controlling the robot cleaner and the washing machine mapped to channel 1 (74) while displaying the image 71 corresponding to channel 1 (74). The robot cleaner icon 72 and the washing machine icon 52 may be displayed in the form of a sub window or graphic plane at a predetermined area of a screen. If the robot cleaner icon 72 and the washing machine icon 52 displayed together with the image 71 of channel 1 (74) are selected by the remote controller, the smart phone, or like input device, the display apparatus 70 can directly control an external device such as the washing machine. In this manner, the display apparatus according to an aspect of an exemplary embodiment may provide a UI for controlling a plurality of external devices with respect to one broadcast channel, and it is therefore convenient for a user to select an external device for direct control from the display apparatus and issue a control command to the selected external device without the need to interrupt the viewing experience of a TV broadcast or switch to a new channel.

FIG. 8 illustrates an example of registering a plurality of external devices to a viewing channel through a remote controller according to an aspect of an exemplary embodiment. As shown in FIG. 8, a display apparatus 80 may map a robot cleaner 891 and a washing machine 892 to channel 1 (84) while displaying an image 81 of channel 1 (84) by a user placing the remote controller 88 in proximity to the robot cleaner 891 and the washing machine 892. If the robot cleaner 891 and the washing machine 892 are tagged or equipped with NFC tags (e.g., NFC stickers) or have built-in NFC modules, NFC communication may be enabled between the remote controller 88 and the robot cleaner 891 and between the remote controller 88 and the washing machine 892 as triggered by the placement of the remote controller 68, while its NFC function is activated, in proximity to the robot cleaner 891 and the washing machine 892. When the remote controller 88 is connected to each of the robot cleaner 891 and the washing machine 892 by NFC, the remote controller 88 may receive information about each of the robot cleaner 891 and the washing machine 892 from each of the robot cleaner 891 and the washing machine 892, and transmit the received information to the display apparatus 80 so that the robot cleaner 891 and the washing machine 892 may be mapped to the viewing channel 1 (84).

At this time, the information received from the robot cleaner 891 and the washing machine 892 by the remote controller 88 may include the identification information about the devices and information for controlling the devices, and may further include information about the functions (i.e., feature set) of the devices, information about a communication state, user interface information about the devices, etc. However, the information received from the external device by the display apparatus according to an aspect of an exemplary embodiment is not limited to the foregoing exemplary embodiments, and may include various pieces of information needed for controlling the external devices.

Figure 9:
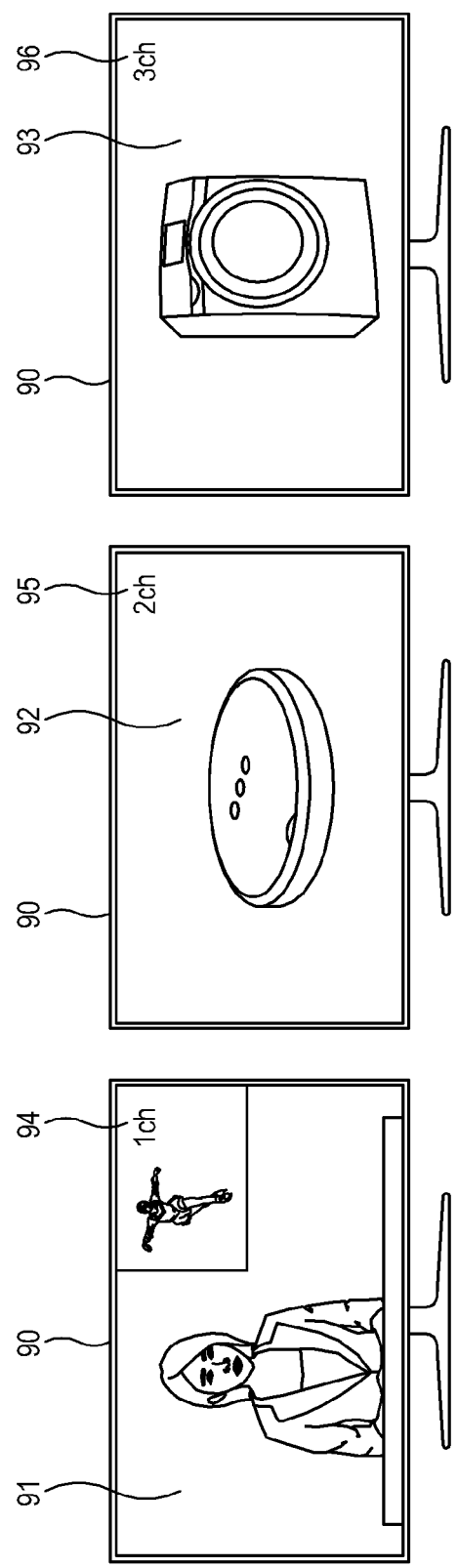
FIG. 9 illustrates an example of displaying a broadcast image or a UI for controlling an external device corresponding to channels according to an aspect of an exemplary embodiment.

FIG. 9 illustrates an example of displaying a broadcast image or a UI for controlling an external device corresponding to channels according to an aspect of an exemplary embodiment. As shown in FIG. 9, a display apparatus may display a robot cleaner icon 92 as an image corresponding to channel 2 (95) in full screen if a viewing channel is changed to channel 2 (95) in response to a user's channel switching command issued while displaying a broadcast image 91 of channel 1 (94). Further, if the viewing channel is switched to channel 3 (96), the washing machine icon 93 may be displayed as an image corresponding to channel 3 (96) in full screen. Thus, a user can select a channel displaying the icon of the desired external device for control by navigating through channels up and down while viewing a TV broadcast, thereby directly controlling the external device. That is, if the robot cleaner is currently allocated to channel 2 (95) and the washing machine is allocated to channel 3 (96), then a user may control the robot cleaner by selecting the robot cleaner icon 92 displayed on the screen corresponding to channel 2 (95), or control the washing machine by selecting the washing machine icon 93 displayed on the screen corresponding channel 3 (96).

Figure 10:
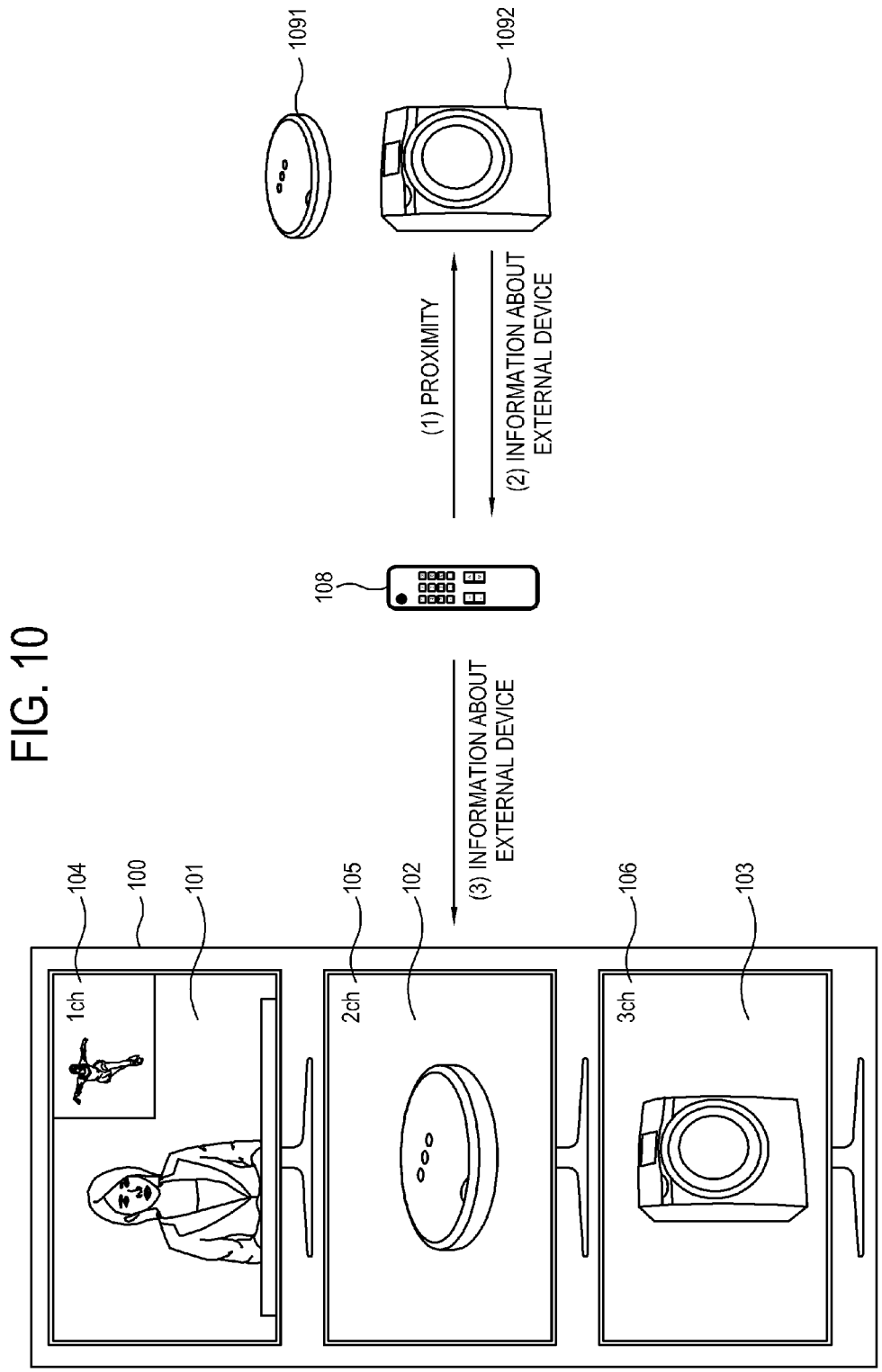
FIG. 10 illustrates an example of registering an external device to a channel, to which a broadcast signal is not allocated, through a remote controller according to an aspect of an exemplary embodiment.

FIG. 10 illustrates an example of registering an external device to a channel, to which a broadcast signal is not allocated, through a remote controller according to an aspect of an exemplary embodiment. As shown in FIG. 10, the display apparatus 100 may switch from channel of 1 (104) displaying a broadcast image 101 to channel 2 (105) or to channel 3 (106), to which a broadcast signal is not allocated, in order to register an external device. If the current channel is changed to channel 2 (105), the remote controller 108 may be placed in proximity to a robot cleaner 1091, thereby mapping the robot cleaner 1091 to channel 2 (105). Further, if the current channel is changed to channel of 3 (106, the remote controller 108 may be placed in proximity to a washing machine 1092, thereby mapping the washing machine 1092 to channel 3 (106). At this time, the robot cleaner 1091 and the washing machine 1092 may each be equipped with NFC tag stickers or built-in NFC modules, and NFC communication may be enabled when the remote controller 108, whose NFC function is activated, is placed in proximity to the robot cleaner 1091 or the washing machine 1092. Though NFC, the remote controller 108 may receive information about the robot cleaner 1091 or the washing machine 1092, and transmit the received information to the display apparatus 100 so that the robot cleaner 1091 and the washing machine 1092 may be respectively mapped to channel 2 (105) and channel 3 (106) to which the broadcast signals are not allocated.

FIG. 11 illustrates an example of a UI for controlling an external device and communicating with a user of the external device while displaying a broadcast image according to an aspect of an exemplary embodiment. As shown in FIG. 11, the display apparatus 110 may display a father icon 112, a mother icon 113, and a washing machine icon 114 mapped to channel 1 (115) while displaying an image 111 corresponding to channel 1 (115). The father icon 112 and the mother icon 113 may be UIs for communicating with other parties previously registered by a user, and the washing machine icon 114 may be a UI for controlling the washing machine. Thus, a user can communicate in various ways with the other parties, such as a father or a mother, without stopping watching TV, by selecting the father icon 112 or the mother icon 113 while viewing the image 111 corresponding to channel 1 (115). Further, a user can control an external device such as the washing machine while watching TV, by selecting the washing machine icon 114 while viewing the image 111 corresponding to channel 1 (115).

According to an aspect of an exemplary embodiment, to start communication through the father icon 112 and the mother icon 113, the user may first map a father's smart phone and a mother's tablet computer to channel 1 (115). Further, various pieces of information (e.g., names, phone numbers, E-mail addresses, SNS addresses, pictures, etc.) obtained from the father's smart phone and the mother's tablet computer may be used in a voice call, a video call, E-mail transmission, SNS posting, and the like communications with the other parties such as a father and a mother.

Figure 12:
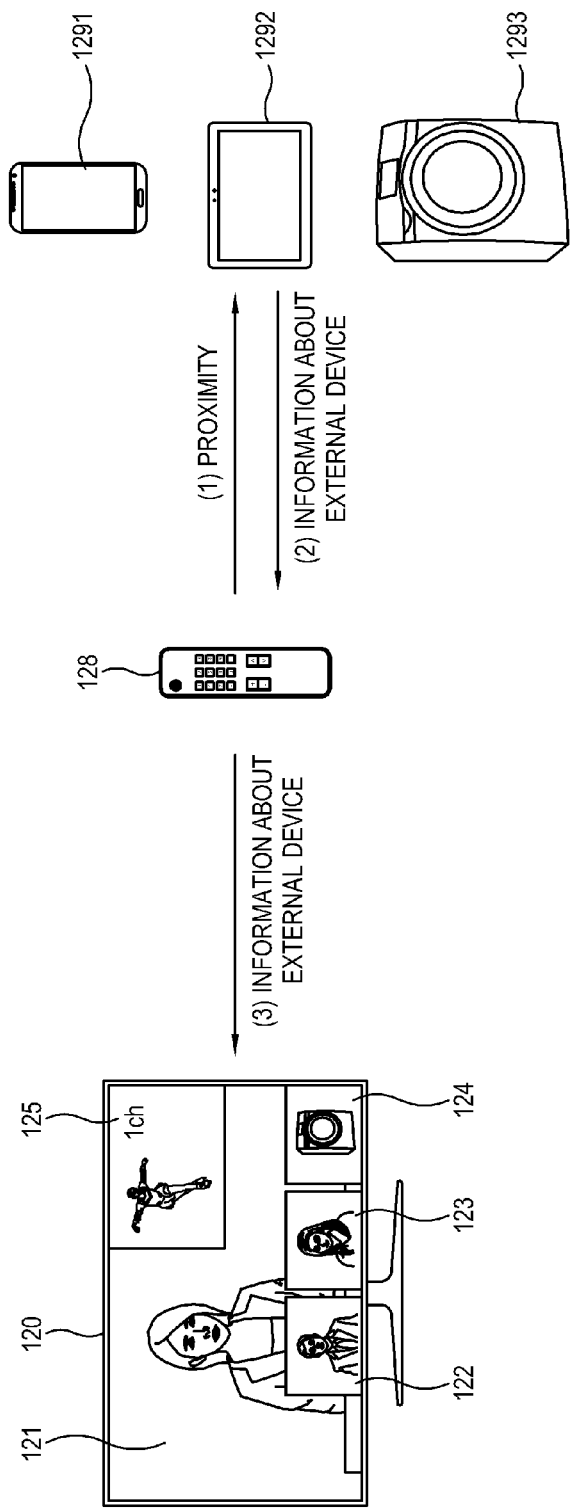
FIG. 12 illustrates an example of registering a plurality of external device to a viewing channel through a remote controller according to an aspect of an exemplary embodiment.

FIG. 12 illustrates an example of registering a plurality of external device to a viewing channel through a remote controller according to an aspect of an exemplary embodiment. As shown in FIG. 12, a display apparatus 120 may map a father's smart phone 1291, a mother's tablet computer 1292, and a washing machine 1293 to channel 1 (125) while displaying an image 121 of channel 1 (125) when the user places a remote controller 128 in proximity to the father's smart phone 1291, the mother's tablet computer 1292, and the washing machine 1293. In this case, the remote controller 128 may receive information about the respective devices from the father's smart phone 1291, the mother's tablet computer 1292, and the washing machine 1293, for example, through NFC, and transmit the received information to the display apparatus 120, thereby mapping the father's smart phone 1291, the mother's tablet computer 1292, and the washing machine 1293 to the viewing channel 1 (125). At this time, the information received from the washing machine 1293 by the remote controller 128 may include identification information and information for controlling the devices. In addition, the information received from a father's smart phone 1291 and a mother's tablet computer 1292 by the remote controller 128 may include the identification information about the respective devices and information about a user (e.g., his/her name, E-mail address, SNS address, picture, etc.).

As a result of the mapping, the father icon 122, the mother icon 123 and the washing machine 124 may be displayed together with the image 121 of channel 1 (125). The father icon 122 and the mother icon 123 may respectively correspond to a father's smart phone 1291 and a mother's tablet computer 1292, and may serve as the UIs not necessarily for directly controlling the father's smart phone 1291 and the mother's tablet computer 1292, although this may be also possible, but for communicating with the father and the mother in various forms based on the information about the father's smart phone 1291 and the mother's tablet computer 1292. Thus, if the father icon 122 or the mother icon 123 is selected by the remote controller 128 while the image 121 corresponding to channel 1 (125) is being displayed, communication with the father or the mother may be enabled via, for example, a voice call, a video call, E-mail transmission, SNS posting, etc., based on the information about the users obtained from the father's smart phone 1291 and the mother's tablet computer 1292.

Figure 13:
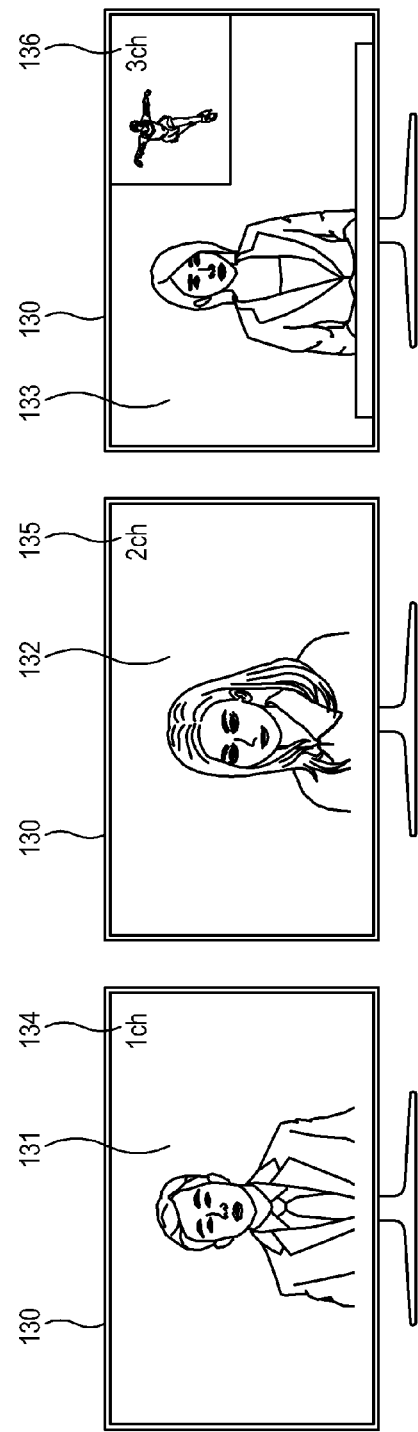
FIG. 13 illustrates an example of displaying a broadcast image or a UI for communicating with a user of the external device corresponding to channels according to an aspect of an exemplary embodiment.

FIG. 13 illustrates an example of displaying a broadcast image or a UI for communicating with a user of the external device corresponding to channels according to an aspect of an exemplary embodiment. As shown in FIG. 13, a display apparatus 130 may display a broadcast image 133 corresponding to channel 3 (136), and may display a father icon 131 and a mother icon 132 respectively corresponding to channel 1 (134) and channel 2 (135) in full screen thereof. Thus, a user of the display apparatus 130 can communicate with the other parties by changing the channel up or down from the currently viewed TV channel and selecting a channel where an icon of the other party desired for communication is displayed. For instance, a user may initiate a video call with her father by selecting the father icon 131 displayed on a screen corresponding to channel 1 (134), or write a comment on her mother's SNS by selecting the mother icon 132 displayed on a screen corresponding to channel 2 (135).

Figure 14:
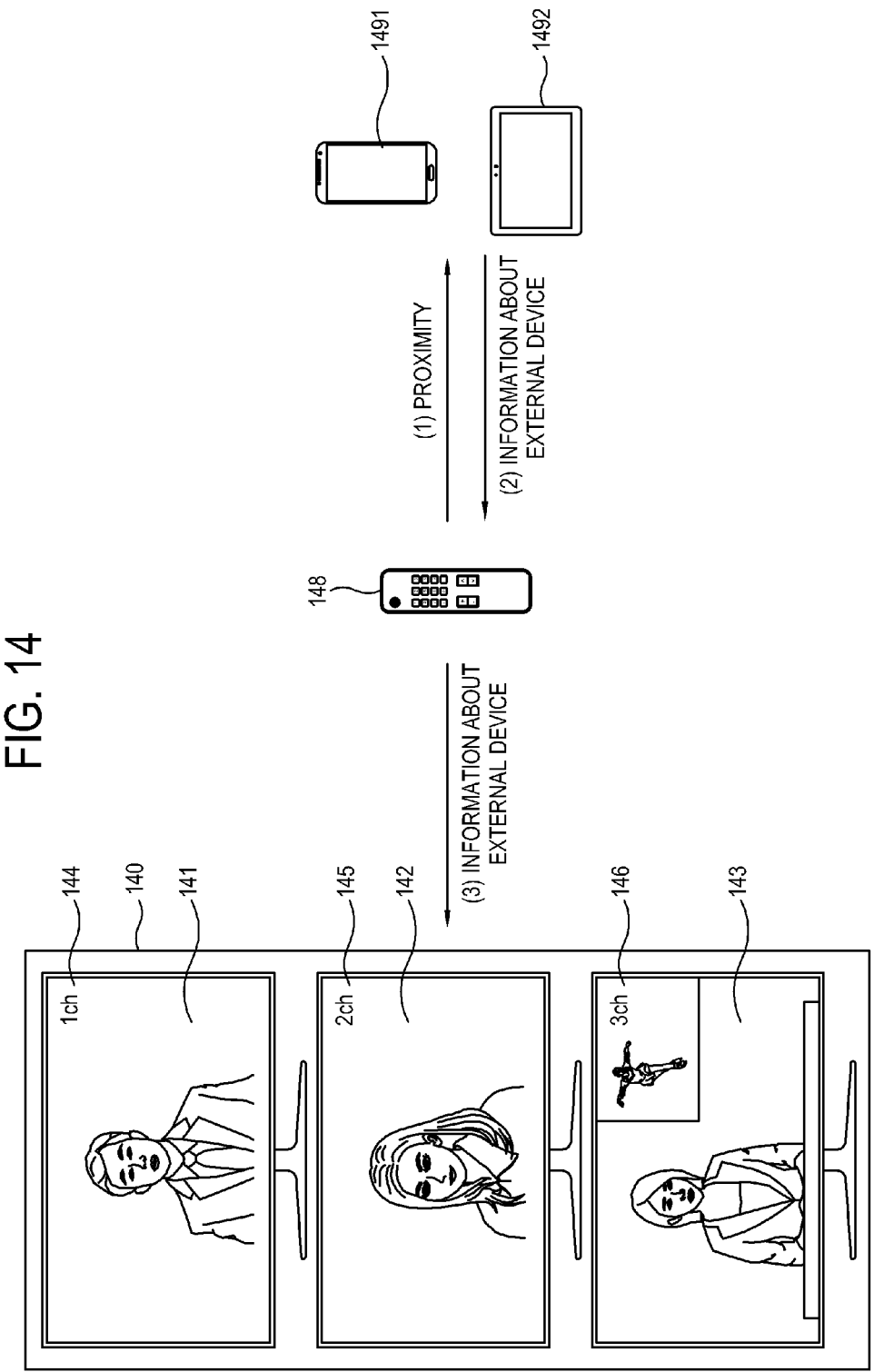
FIG. 14 illustrates an example of registering an external device to a channel, to which a broadcast signal is not allocated, through a remote controller according to an aspect of an exemplary embodiment.

FIG. 14 illustrates an example of registering an external device to a channel, to which a broadcast signal is not allocated, through a remote controller according to an aspect of an exemplary embodiment. As shown in FIG. 14, a display apparatus 140 may map a father's smart phone 1491 to channel 1 (144) when a remote controller 148 is placed in proximity to the father's smart phone 1491 while the display apparatus 140 is displaying channel 1 (144) to which a broadcast signal is not allocated. Further, the display apparatus 140 may map a mother's tablet computer 1492 to channel 2 (145) when the remote controller 148 is placed in proximity to the mother's tablet computer 1492 while the display apparatus 140 is displaying channel 2 (144) to which a broadcast signal is not allocated. In this case, the remote controller 148 may receive information about each of the father's smart phone 1491 and the mother's tablet computer 1492 through NFC, and transmit the received information to the display apparatus 140, thereby causing the display apparatus 140 to respectively map the father's smart phone 1491 and the mother's tablet computer 1492 to channel 1 (144) and channel 2 (145) to which broadcast signals are not allocated. At this time, the information received from the father's smart phone 1491 and the mother's tablet computer 1492 by the remote controller 148 may include the identification information of the devices, and information about users of the devices (e.g. names, phone numbers, E-mail addresses, SNS addresses, pictures, etc.).

As a result of the mapping, the father icon 141 may be displayed in full screen corresponding to channel 1 (144), and the mother icon 142 may be displayed in full screen corresponding to channel 2 (145). The father icon 141 and the mother icon 142 may respectively correspond to the father's smart phone 1491 and the mother's tablet computer 1492, and serve as the UIs, not necessarily for controlling the father's smart phone 1491 and the mother's tablet computer 1492, but for communicating with the father or the mother in various forms based on the information about the father's smart phone 1491 and the mother's tablet computer 1492. Thus, the father icon 122 corresponding to channel 1 (144) or the mother icon 123 corresponding to channel 2 (145) may be used to communicate with the father or the mother via, for example, a voice call, a video call, E-mail transmission, SNS comment writing, etc. That is, a user may communicate with other parties previously registered to the display apparatus as channels by simply selecting the appropriate channel while watching TV.

FIG. 15 illustrates an example of registering an external device to a viewing channel through an electronic device according to an aspect of an exemplary embodiment. As shown in FIG. 15, a display apparatus 150 may map a washing machine 159 to channel 1 (153) when an electronic device, such as a smart phone 157 or a smart watch 158, is placed in proximity to the washing machine 159 while an image 151 corresponding to channel 1 (153) is being displayed. At this time, the smart phone 157 or the smart watch 158, of which the NFC function is activated, may be placed in proximity to the washing machine 159 equipped with the NFC tag sticker or having a built-in NFC module, thereby initiating NFC communication. By the NFC, the smart phone 157 or the smart watch 158 may receive the identification information of the washing machine 159 and information about controlling the washing machine 159 from the washing machine 159, and transmit the received information to the display apparatus 150, thereby causing the display apparatus 150 to map the washing machine 159 to the viewing channel 1 (153).

According to an alternative embodiment, the smart phone 157 or the smart watch 158 may search for the washing machine 159 connected by Wi-Fi or Bluetooth, and receive information about the washing machine 159 from the washing machine 159, thereby causing the washing machine 159 to be mapped to channel 1 (153). That is, settings about Wi-Fi or Bluetooth may be enough to map the washing machine 159 to channel 1 (153) without the need to engage in NFC communication that involves placing the smart phone 157 or the smart watch 158 in proximity to the washing machine 159.

Figure 16:
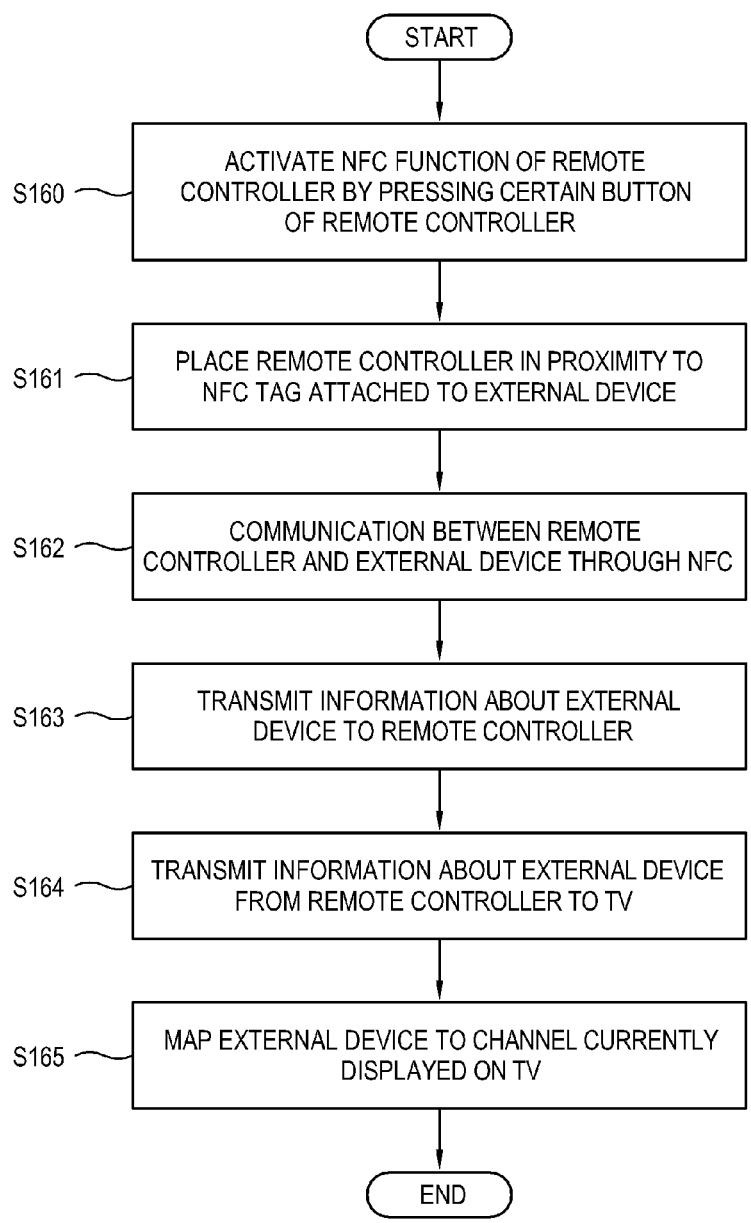
FIG. 16 is a flowchart of registering an external device equipped with a near field communication (NFC) tag to a channel according to an aspect of an exemplary embodiment.

FIG. 16 is a flowchart of registering an external device equipped with a near field communication (NFC) tag to a channel according to an aspect of an exemplary embodiment. As shown in FIG. 16, at operation S160, a certain button of the remote controller is pressed to activate the NFC function of the remote controller. Next, at operation S161, the remote controller is placed in proximity to the NFC tag attached to the external device.

Here, NFC is a type of radio frequency identification (RFID) and is achieved by a contactless short-range wireless communication module using a predetermined frequency band. NFC allows terminals to exchange data within a predetermined distance. The NFC tag may be provided in the form of a sticker to provide NFC and data transmission capabilities to devices that may be otherwise not NFC-compatible. If the NFC tag sticker where NFC settings are completed is attached to a first device requiring the NFC, a second device can obtain information about the first device when the second device of which an NFC function is activated comes near the first device.

Next, at operation S162, the remote controller and the external device communicate with each other through NFC, and at operation S163, the information about the external device is transmitted to the remote controller. Next, at operation S164, the remote controller transmits the received information about the external device to a TV. Lastly, at operation S165, the external device is mapped to a channel currently displayed on the TV. Thus, the remote controller according to various exemplary embodiments may allow a user to easily register an external device equipped with an NFC tag to a channel of the TV via NFC.

FIG. 17 illustrates an example of registering an external device equipped with an NFC tag to a channel according to an aspect of an exemplary embodiment. As shown in FIG. 17, a certain button of the remote controller 178 supporting the NFC function may be pressed to activate the NFC function of the remote controller 178. Next, the remote controller 178 may be placed in proximity to an NFC tag 171 attached to the robot cleaner 179, so that the remote controller 178 and the robot cleaner 179 may communicate with each other through NFC. If the remote controller 178 and the robot cleaner 179 are connected via NFC, the remote controller 178 may receive information about the robot cleaner 179 from the robot cleaner 179. Thus, the remote controller according to exemplary embodiments may use NFC to make it easy to register an external device to a channel of the TV.

Figure 18:
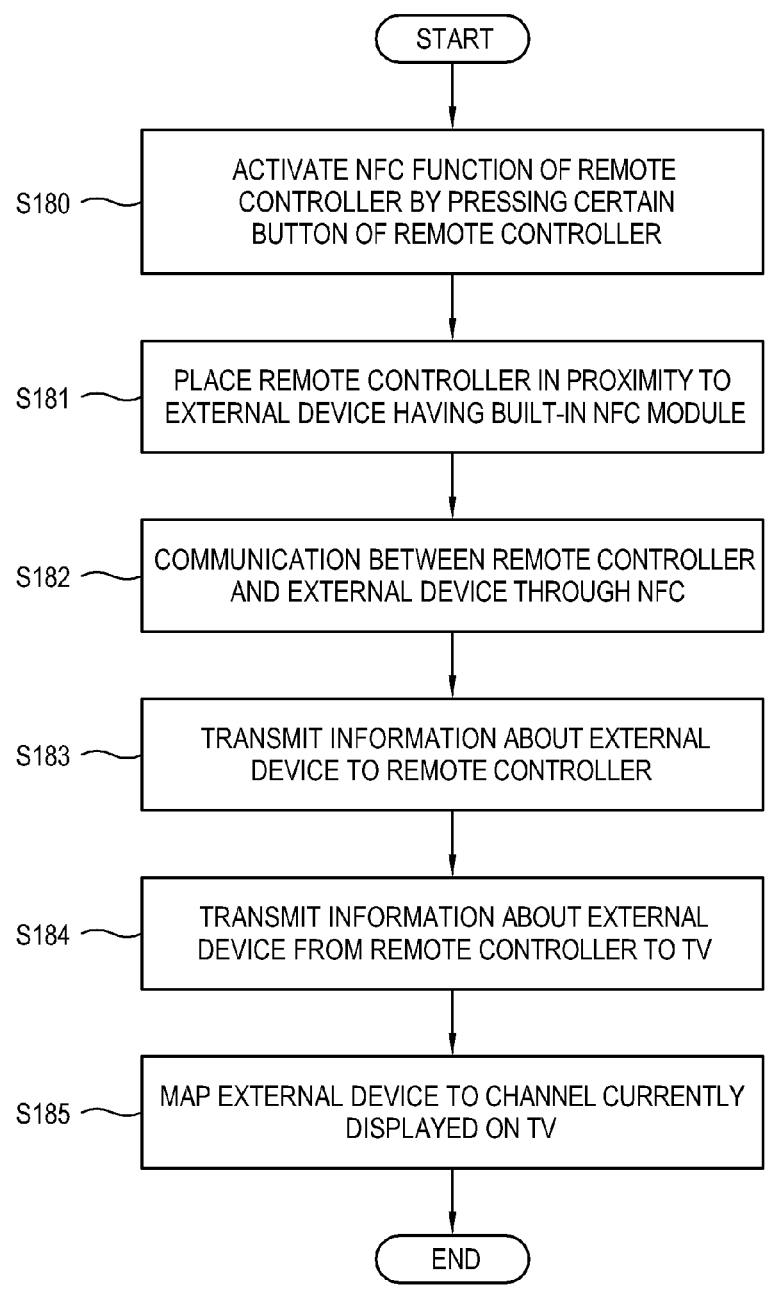
FIG. 18 is a flowchart of registering an external device with a built-in NFC module to a channel according to an aspect of an exemplary embodiment.

FIG. 18 is a flowchart of registering an external device with a built-in NFC module to a channel according to an aspect of an exemplary embodiment. As shown in FIG. 18, at operation S180, a certain button of the remote controller is pressed to activate the NFC function of the remote controller. Next, at operation S181, the remote controller is placed in proximity to the external device having the built-in NFC module. At operation S182, the remote controller and the external device communicate with each other through the NFC. Next, at operation S183, the information about the external device is transmitted to the remote controller. At operation S184, the remote controller transmits the received information about the external device to the TV. Lastly, at operation S185, the external device is mapped to the channel currently displayed on the TV. Thus, the remote controller according to exemplary embodiments may use NFC so that a user can easily register the external device having the built-in NFC module to the channel of the TV.

FIG. 19 illustrates an example of registering an external device with a built-in NFC module to a channel according to an aspect of an exemplary embodiment. As shown in FIG. 19, a certain button of a remote controller 198 supporting NFC may be pressed so that NFC function of the remote controller 198 can be activated. Next, the remote controller 198 may be placed in proximity to a robot cleaner 199 having a built-in NFC module so that the remote controller 198 and the robot cleaner 199 can communicate with each other through NFC. If the remote controller 198 and the robot cleaner 199 are connected to each other through NFC, the remote controller 198 may receive information about the robot cleaner 199 from the robot cleaner 199. Thus, the remote controller according to exemplary embodiments may allow the external device to be registered with ease to a channel of the TV by using NFC.

FIG. 20 illustrates an example of registering an external device with a built-in NFC module to a channel according to an aspect of an exemplary embodiment. As shown in FIG. 20, a certain application for registering an external device may be executed in a smart phone 208 that supports NFC so as to activate the NFC function of the smart phone 208. According to an aspect of an exemplary embodiment, the NFC function of the smart phone 208 may be activated by an NFC setting application that may be from the application for registering the external device. Next, the smart phone 208 may be placed in proximity to the robot cleaner 209 having a built-in NFC module, so that the smart phone 208 and the robot cleaner 209 can communicate with each other through NFC. If the smart phone 208 and the robot cleaner 209 are connected by NFC, the smart phone 208 may receive information about the robot cleaner 209 from the robot cleaner 209. The information received by the smart phone 208 may include the identification information of the robot cleaner 209 or information for controlling the robot cleaner 209. Thus, the smart phone according to exemplary embodiments makes it easy to register the external device to the channel of the TV through NFC. According to an alternative embodiment, the smart watch and like wearable devices may be used to register the external device to the channel of the TV. In such a case, the wearable device may also activate its own NFC function and make it easy to register the external device to the channel of the TV.

Figure 21:
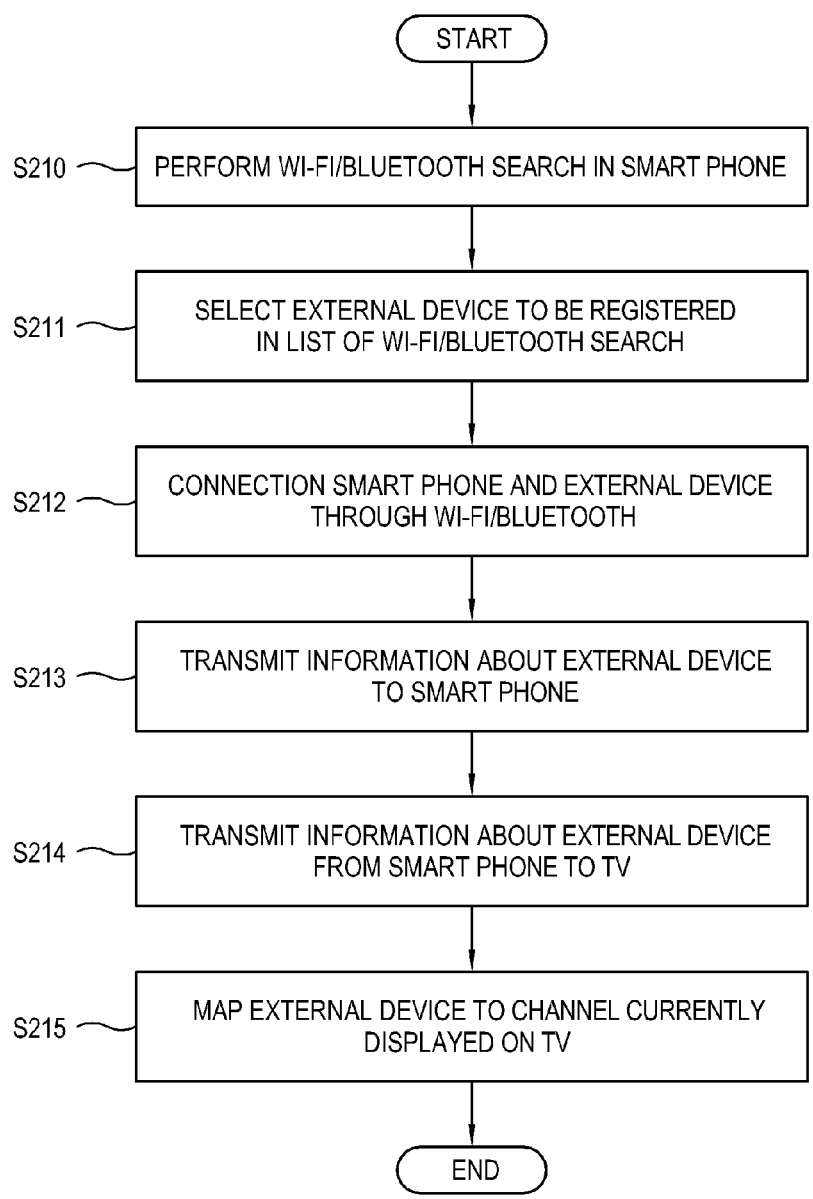
FIG. 21 is a flowchart of registering an external device with a built-in wireless communication module to a channel according to an aspect of an exemplary embodiment.

FIG. 21 is a flowchart of registering an external device with a built-in wireless communication module to a channel according to an aspect of an exemplary embodiment. As shown in FIG. 21, at operation S210, the smart phone performs Wi-Fi or Bluetooth search. According to an aspect of an exemplary embodiment, in case of a Wi-Fi search, it is determined whether there is a device connectable through Wi-Fi Direct. Further, in case of Bluetooth, it is determined whether there is a device supporting Bluetooth pairing or whether there is a device already paired by Bluetooth. Next, at operation S211, an external device desired to be registered is selected from a Wi-Fi or Bluetooth search list. At operation S212, the smart phone and the external device are connected by Wi-Fi or Bluetooth. That is, an external device desired to be registered to the channel of the TV is selected among the searched devices connectable through Wi-Fi Direct or selected among the devices supporting Bluetooth pairing or already paired by Bluetooth, and then connected to the smart phone. Next, at operation S213, the information about the external device is transmitted to the smart phone. Here, the information about the external device may include the identification information of the external device, information for controlling the external device, etc. At operation S214, the smart phone transmits the received information about the external device to the TV. Lastly, at operation S215, the external device is mapped to the channel currently displayed on the TV.

Thus, the smart phone according to various exemplary embodiments may register the connectable external device searched through Wi-Fi Direct or Bluetooth to the channel of the TV, and therefore a user need not move the smart phone near the external device or manually set up the external device.

FIG. 22 illustrates an example of registering an external device with a built-in wireless communication module to a channel according to an aspect of an exemplary embodiment. As shown in FIG. 22, the smart phone 228 may execute a settings menu or a settings application for Wi-Fi or Bluetooth and determine whether there is a connectable device. In case of a Wi-Fi search, it is determined whether there is a device connectable through Wi-Fi Direct. Further, in case of Bluetooth, it is determined whether there is a device supporting Bluetooth pairing or whether there is a device already paired by Bluetooth. If a robot cleaner 229 is selected among the devices searched by the smart phone 228 through Wi-Fi or Bluetooth, the smart phone 228 and the robot cleaner 229 may be connected through Wi-Fi Direct or Bluetooth. When the smart phone 228 and the robot cleaner 229 are connected, the smart phone 228 may receive information about the robot cleaner 229 from the robot cleaner 229. The information about the robot cleaner 229 may include the identification information of the robot cleaner 229, information for controlling the robot cleaner 229, etc.

Thus, the smart phone according to various exemplary embodiments may allow the external device to be registered to the channel of the TV through wireless communication such as Wi-Fi Direct or Bluetooth. According to an alternative embodiment, not only the smart phone but also smart watches or like wearable devices can register the external device to the channel of the TV through wireless communication such as Wi-Fi Direct or Bluetooth.

Figure 23:
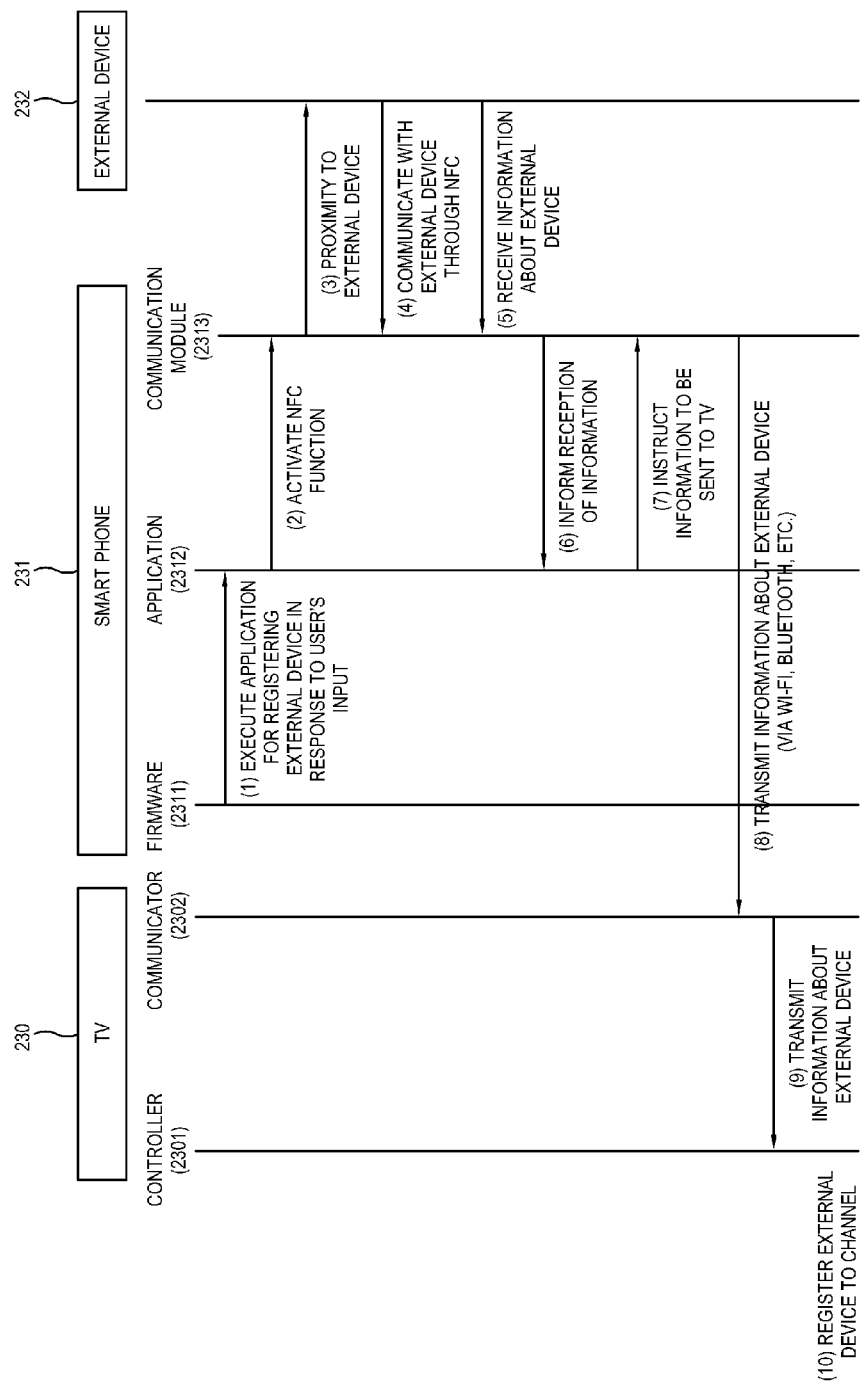
FIG. 23 is a sequence diagram showing an example process to register an external device through a smart phone according to an aspect of an exemplary embodiment.

FIG. 23 is a sequence diagram showing an example process to register an external device through a smart phone according to an aspect of an exemplary embodiment. As shown in FIG. 23, when a smart phone 231 is used to register an external device 232 to a channel of a TV 230, firmware 2311 of the smart phone 231 may execute an application 2312 for registering the external device 232 in response to a user's input (1). When the application 2312 is executed, the NFC function of the smart phone 231 may be activated (2). In this state, if the smart phone 231 is placed in proximity to the external device 232 (3), a communication module 2313 may cause the smart phone 231 to communicate with the external device 232 through NFC (4). If the smart phone 231 and the external device 232 are connected by NFC, the communication module 2313 may receive information about the external device 232 from the external device 232 (5), and inform the application 2312 of the reception of information (6). The application 2312 may instruct the communication module 2313 to transmit the information received from the external device 232 to the TV 230 (7), and the communication module 2313 may transmit the information about the external device 232 to a communicator 2302 of the TV 230 by Wi-Fi, Bluetooth or like communication method (8). The communicator 2302 of the TV 230 may transmit the received information of the external device 232 to a controller 2301 of the TV 230 (9), and the controller 2301 may register the external device 232 to the channel of the TV 230 based on the received information of the external device 232 (10).

Thus, the smart phone according to various exemplary embodiments may execute the application for registering the external device to thereby simultaneously perform both the activation of NFC and the registration of the external device. That is, the application for registering the external device may be executed without the need to separately execute the application for communicating with the external device, thereby performing the communication settings and the registration of the external device concurrently.

Figure 24:
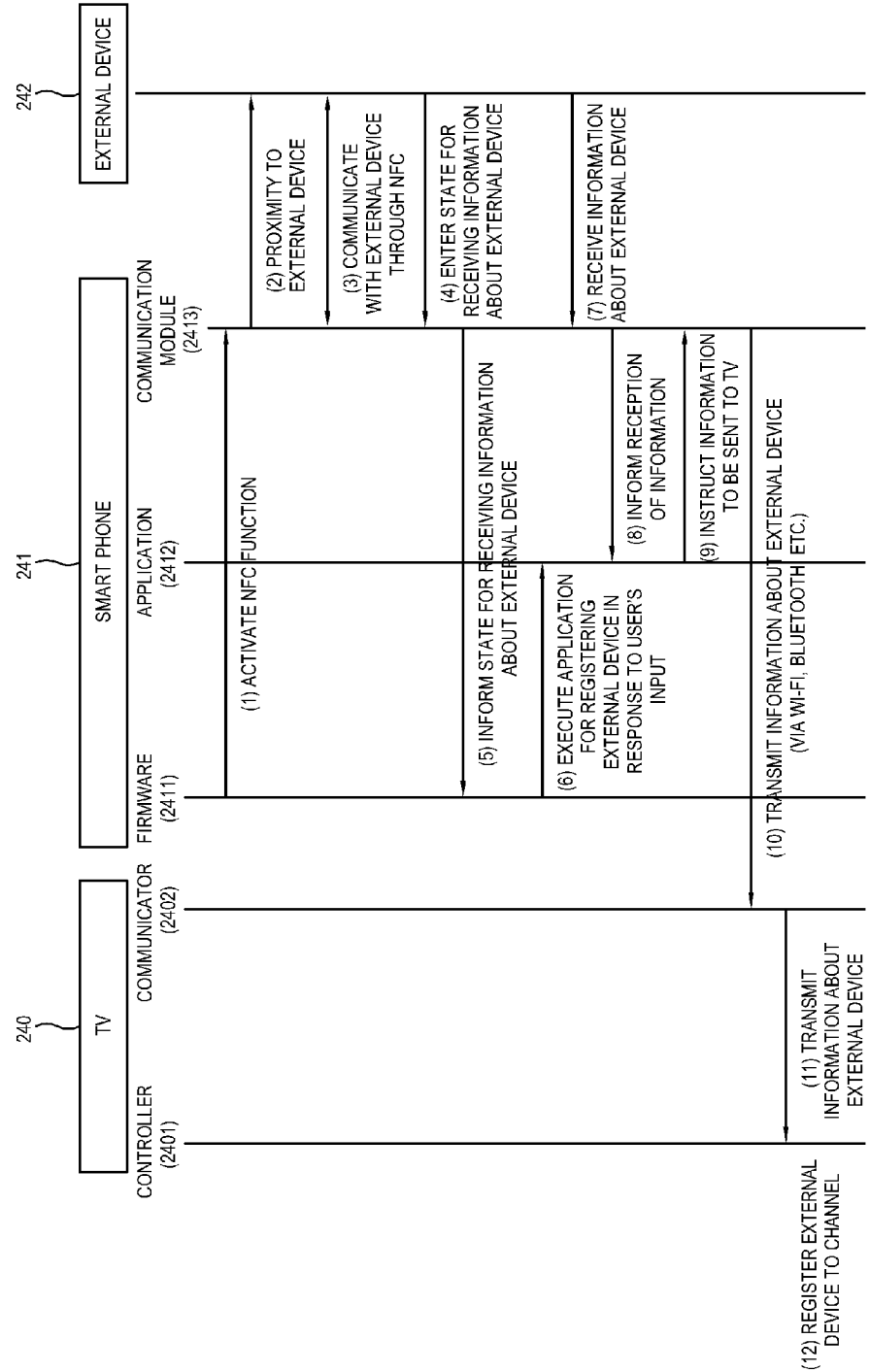
FIG. 24 is a sequence diagram showing another example process to register an external device through a smart phone according to an aspect of an exemplary embodiment.

FIG. 24 is a sequence diagram showing another example process to register an external device through a smart phone according to an aspect of an exemplary embodiment. As shown in FIG. 24, when a smart phone 241 is used to register an external device 242 to a channel of a TV 240, firmware 2411 of the smart phone 241 may activate an NFC function (1). For instance, the smart phone 241 may activate the NFC function based on a user's settings, or may activate the NFC function by executing a separate application for communication settings (1). Alternatively, the NFC function may be always activated based on default system settings for the smart phone 241.

If the NFC function is activated, the smart phone 241 may be placed in proximity to the external device 242 (2), so that a communication module 2413 of the smart phone 241 may enable the smart phone 241 to communicate with the external device 242 through NFC (3). When the smart phone 241 and the external device 242 are connected by NFC, the external device 242 may notify the communication module 2413 that the smart phone 241 is to enter a state capable of receiving information about the external device 242 (4), and the communication module 2413 may inform the firmware 2411 of entering a state capable of receiving information about the external device 242 (5).

At this time, if an application 2412 for registering an external device is executed in response to a user's input (6), the communication module 2413 may receive information about the external device 242 from the external device 242 (7), and inform the application 2412 of receiving the information (8). The application 2412 may then instruct the communication module 2413 to transmit the received information of the external device 242 to the TV 240 (9), and the communication module 2413 may transmit the information about the external device 242 to a communicator 2402 of the TV 240 by Wi-Fi, Bluetooth or like communication method (10). The communicator 2402 of the TV 240 may transmit the received information about the external device 242 to a controller 2401 (11), and the controller 2401 may register the external device 242 to the channel of the TV 240 based on the received information of the external device 242 (12).

Thus, according to various exemplary embodiments, the smart phone may activate the NFC function by the application for the communication settings or by a user's settings, and execute the application for registering the external device in the state that the NFC function is activated, thereby performing the function of registering the external device. That is, the process for communicating with the external device and the process for registering the external device may be performed independently from each other.

Figure 25:
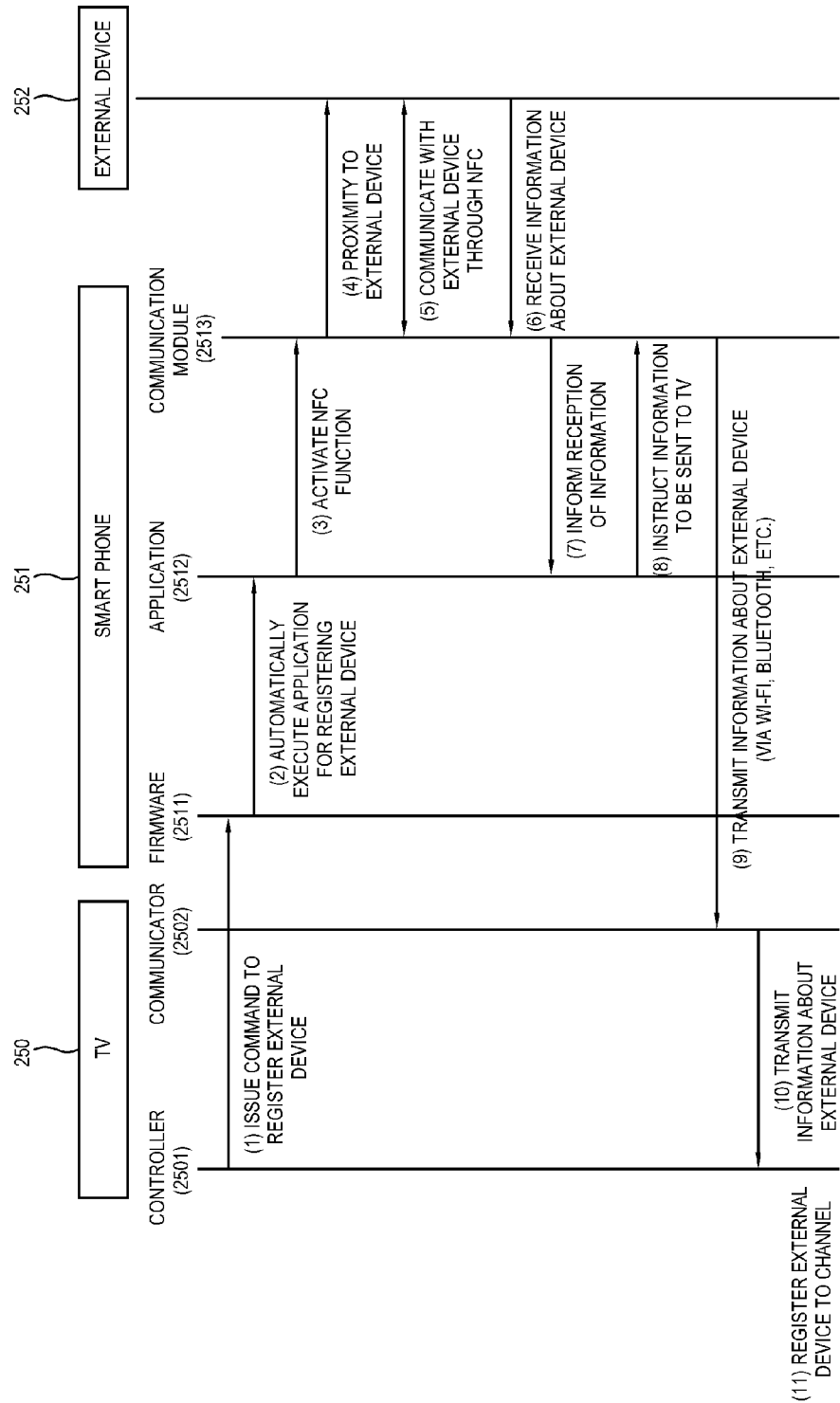
FIG. 25 is a sequence diagram showing still another example process to register an external device through a smart phone according to an aspect of an exemplary embodiment.

FIG. 25 is a sequence diagram showing still another example process to register an external device through a smart phone according to an aspect of an exemplary embodiment. As shown in FIG. 25, when a smart phone 251 is used to register an external device 252 to a channel of a TV 250, a controller 2501 of the TV 250 may issue a command for registering the external device 252 to firmware 2511 of the smart phone 251 (1). For instance, the TV 250 may allow a user to select a menu screen for registering the external device, and the user may select an option for registering the external device 252 through the smart phone 251 on the menu screen. Therefore, the TV 250 may transmit a command for registering the external device 252 to the smart phone 251.

The firmware 2511 of the smart phone 251, which receives the command for registering the external device 252, may automatically execute an application 2512 for registering the external device (2). When the application 2512 is executed, the NFC function of the smart phone 251 may be activated (3). If the smart phone 251 comes near the external device 252 (4), a communication module 2513 may initiate communication between the smart phone 251 and the external device 252 by NFC (5). If the smart phone 251 and the external device 252 are connected by NFC, the communication module 2513 may receive information about the external device 252 from the external device 252 (6), and inform the application 2512 of the reception of the information (7).

The application 2512 may instruct the communication module 2513 to transmit the information received from the external device 252 to the TV 250 (8), and the communication module 2513 may transmit the information of the external device 252 to the communicator 2502 of the TV 250 by Wi-Fi, Bluetooth or like communication method (9). The communicator 2502 of the TV 250 may transmit the received information of the external device 252 to the controller 2501 (10), and the controller 2501 may register the external device 252 to the channel of the TV 250 based on the received information of the external device 252 (11).

Thus, according to various exemplary embodiments, the smart phone may execute the application for registering the external device in response to the command from the TV and register the external device to the channel of the TV. That is, the TV may determine whether to register the external device, and issue the command to the smart phone in accordance with determinations so that the smart phone can perform the processes of registering the external device based on the command issued by the TV.

Figure 26:
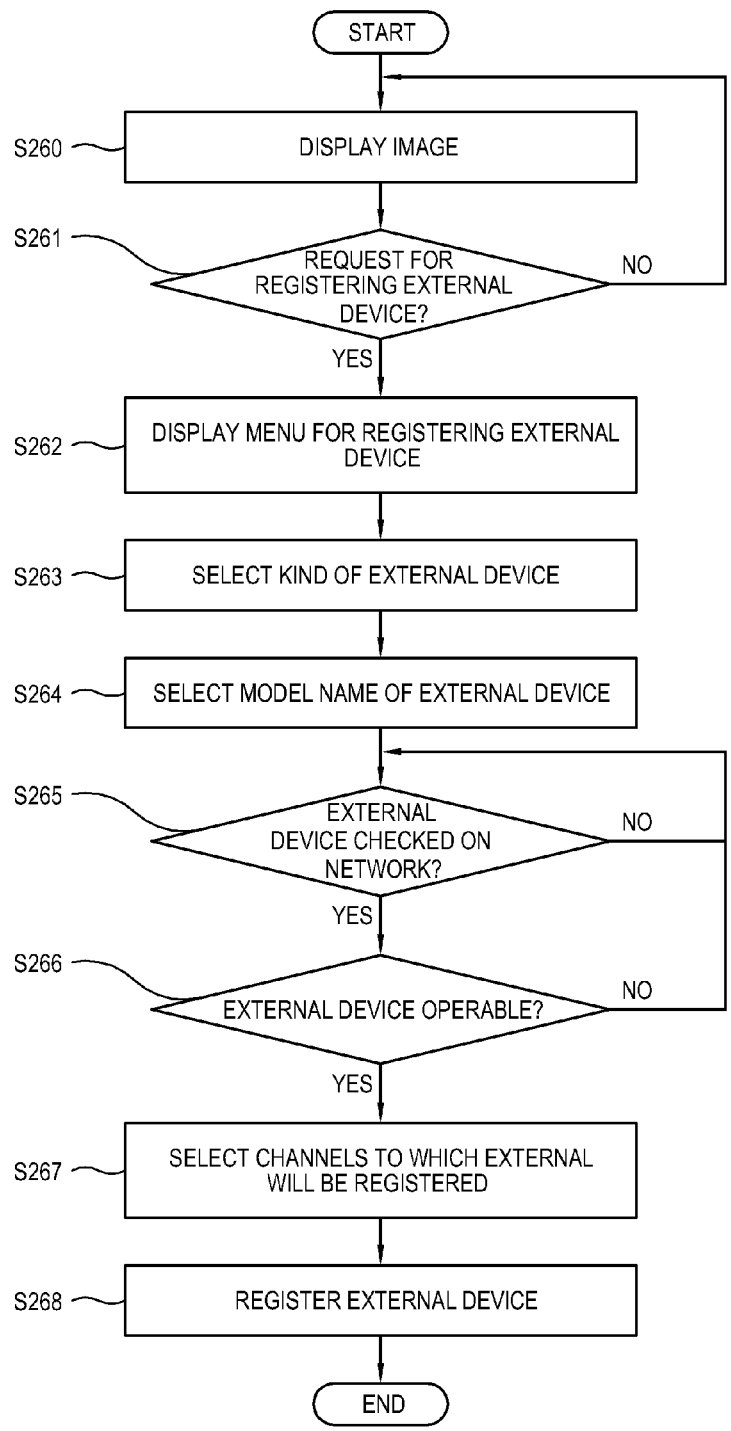
FIG. 26 illustrates a flowchart of registering an external device to a channel through a user's manual input according to an aspect of an exemplary embodiment.

FIG. 26 illustrates a flowchart of registering an external device to a channel through a user's manual input according to an aspect of an exemplary embodiment. As shown in FIG. 26, at operation S260, an image of a broadcasting channel is displayed. At operation S261, it is determined whether there is a request for registering the external device. If there is a request for registering the external device, then at operation S262, a menu for registering the external device is displayed. At operation S263, a user selects the kind of external device. When the kind of external device is selected, at operation S264, a user selects a model name of the external device. When the model name of the external device is selected by a user, at operation S265 the external device selected on a network is checked. Next, at operation S266 it is determined whether the external device checked on the network is operable. If the external device is operable, at operation S267, a channel to which the external device will be registered is selected. Lastly, at operation S268 the external device is registered to the selected channel. According to an aspect of an exemplary embodiment, the external device is automatically registered to the channel currently displaying an image, without requiring the user to select a channel to which the external device will be registered.

Figure 27:
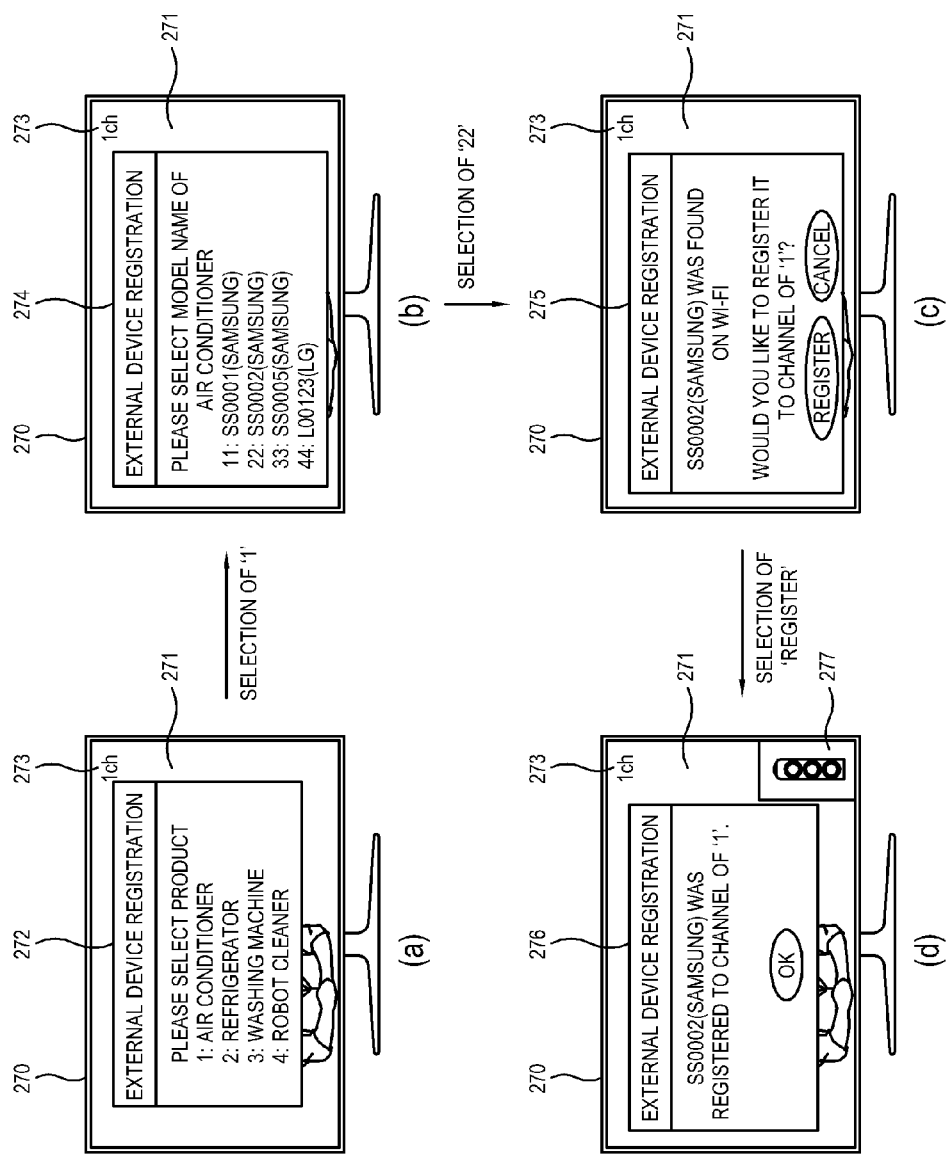
FIG. 27 illustrates an example of screens to register an external device to a channel through a user's manual input according to an aspect of an exemplary embodiment.

FIG. 27 illustrates an example of screens to register an external device to a channel through a user's manual input according to an aspect of an exemplary embodiment. As shown in FIG. 27, a display apparatus 270 may display (a) an image 271 corresponding to channel 1 (273), and a menu screen 272 for registering an external device in accordance with a user's input. At this time, an application for registering the external device may be executed and displayed instead of the menu screen 272. The menu screen 272 may show the types of products or devices to be selectable by a user. If a user selects "1" on the menu screen 272, a menu screen 274 of (b) may show model names of air conditioners available for selection by a user. If the user selects "22" on the menu screen 274, a menu screen 275 of (c) may show that a product of "SS0002 (Samsung)" selected by the user is available for registration through Wi-Fi Direct and ask the user whether to register the selected product to the current channel of 1 (273). If the user selects "Register," a menu screen 276 of (d) may show that the product of "SS0002 (Samsung)" is registered to channel 1 (273), and an icon 277 corresponding to the product of "SS0002 (Samsung)" may be displayed at a predetermined area of the screen.

Thus, the display apparatus according to various exemplary embodiments may register the external device selected by a user's manual input through the menu screen for registering the external device.

Figure 28:
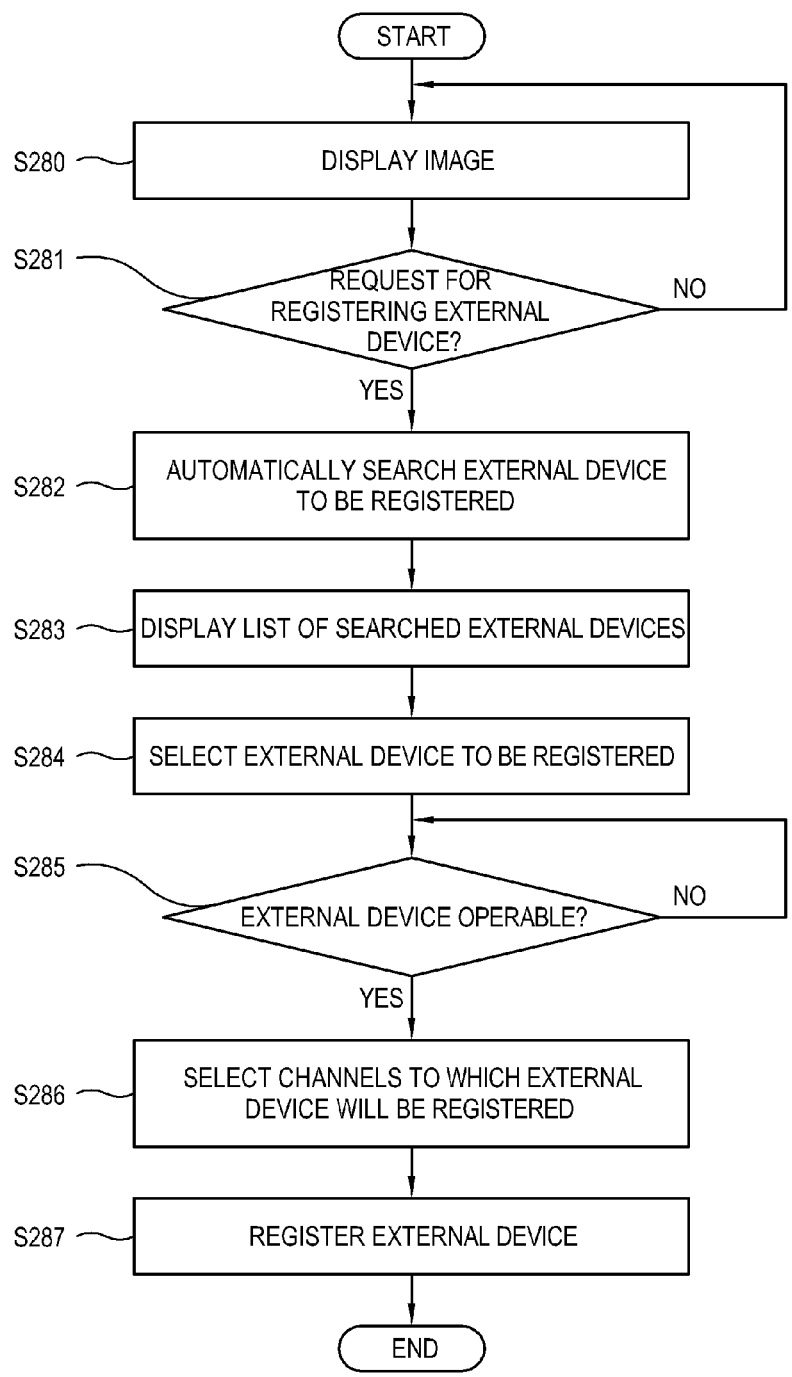
FIG. 28 is a flowchart of registering an external device automatically searched by a user's request to a channel according to an aspect of an exemplary embodiment.

FIG. 28 is a flowchart of registering an external device automatically searched by a user's request to a channel according to an aspect of an exemplary embodiment. As shown in FIG. 28, at operation S280, a broadcasting image is displayed. At operation S281, it is determined whether there is a request for registering an external device. If there is a request for registering the external device, then at operation S282, the external devices to be registered are automatically searched for. At operation S283, a list of searched external devices is displayed. Next, at operation S284, if a user selects an external device to be registered, then at operation S285, it is determined whether the selected external device is operable. At operation S286, a channel to which the external device will be registered is selected. Lastly, at operation S287, the external device is registered to the selected channel. At this time, the external device may be automatically registered to the channel currently displaying an image, without requiring the user to select a channel for registration with the external device.

Figure 29:
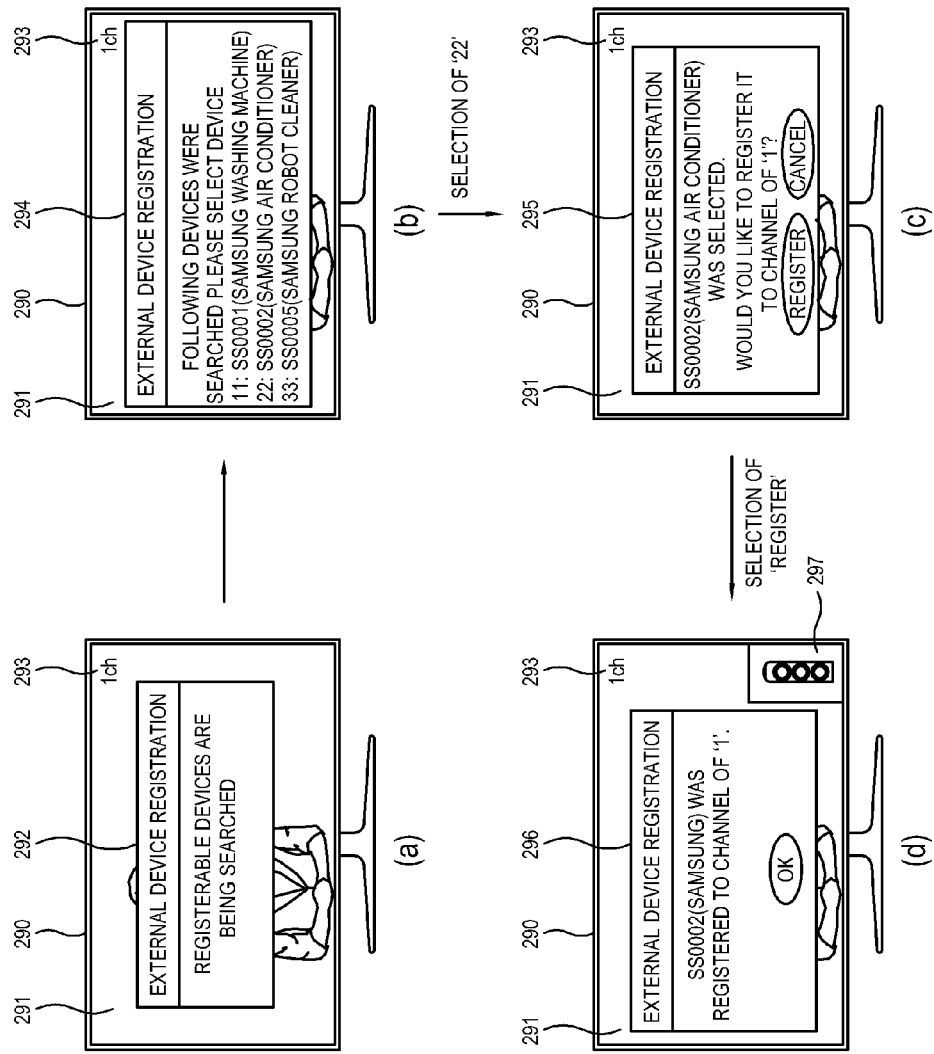
FIG. 29 illustrates an example of screens to register an external device automatically searched by a user's request to a channel according to an aspect of an exemplary embodiment.

FIG. 29 illustrates an example of screens to register an external device automatically searched by a user's request to a channel according to an aspect of an exemplary embodiment. As shown in FIG. 29, a display apparatus 290 may show (a) an image 291 corresponding to channel 1 (293), and a menu screen 292 for registering an external device in accordance with a user's input. At this time, an application for registering the external device may be executed and displayed instead of the menu screen 292. The menu screen 292 may show that the devices available for registration are being searched. At this time, the display apparatus 290 may perform an automatic search without the user initiating the search. When the automatic search is completed, a menu screen 294 of (b) may show a list of searched devices to receive a user's selection. If a user selects "22" on the menu screen 294, a menu screen 295 of (c) may show that a product of "SS0002 (Samsung)" is selected by a user, and ask the user to confirm registration of the selected product to the current channel of 1 (393). If the user selects "Register," a menu screen 296 of (d) may show that the product of "SS0002 (Samsung)" is registered to channel 1 (293), and an icon 297 corresponding to the product of "SS0002 (Samsung)" may be displayed at a predetermined area of the screen.

Thus, the display apparatus 290 according to various exemplary embodiments may automatically search for and display the registerable external devices on the menu screen for registering the external device, so that a user can select an external device among the automatically searched external devices and register the selected external device to the channel. Therefore, it is convenient for a user to register the external device to the channel because the user only needs to select the device among the automatically searched devices without having to determine and select from the types of products, the model names, etc., one by one.

Figure 30:
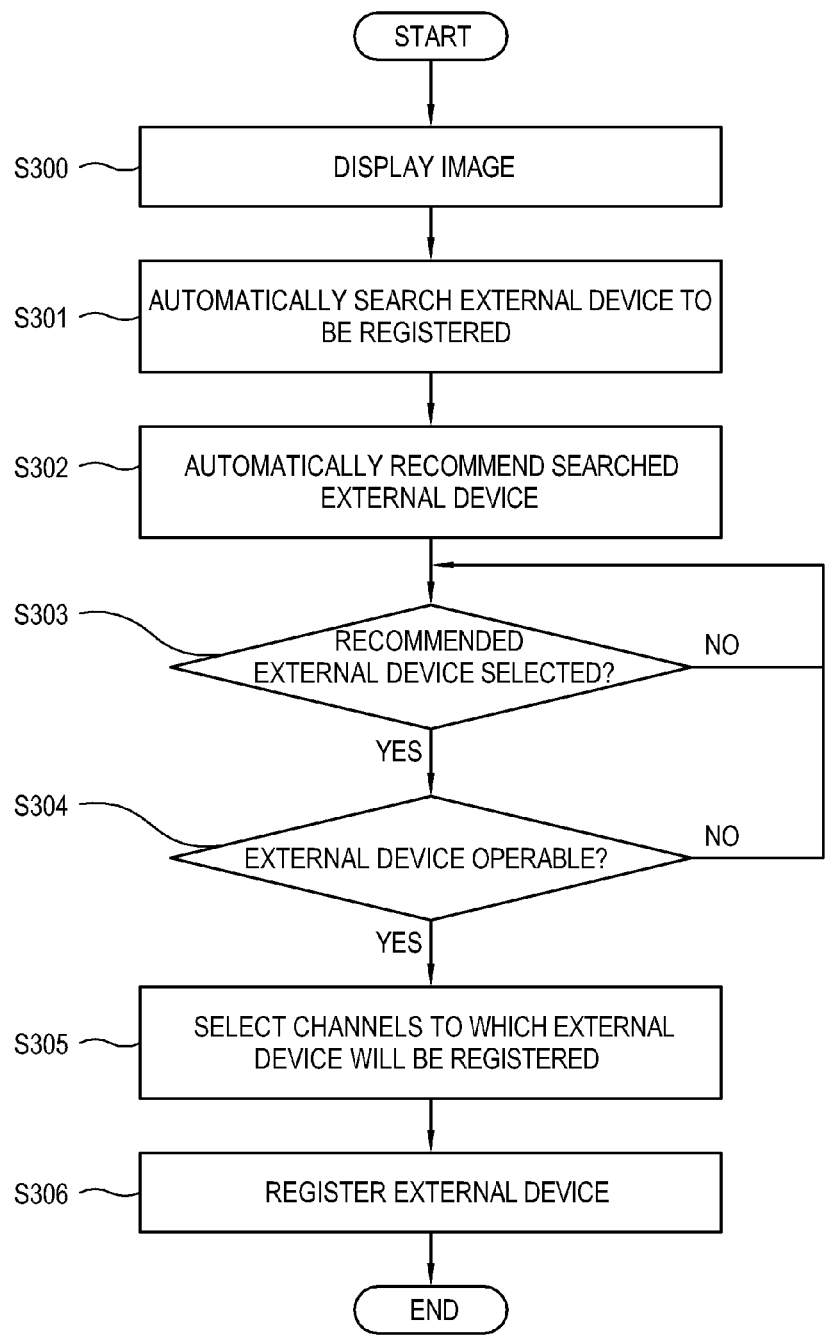
FIG. 30 is a flowchart of registering an external device provided by automatic recommendation to a channel according to an aspect of an exemplary embodiment.

FIG. 30 is a flowchart of registering an external device provided by automatic recommendation to a channel according to an aspect of an exemplary embodiment. As shown in FIG. 30, at operation S300, an image is displayed corresponding to a broadcasting channel. At operation S301, a registerable external device is automatically searched at predetermined time intervals. At operation S302, the external device is automatically recommended in accordance with the searched results. At operation S303, a user is asked whether to select the automatically recommended external device. If the user selects the automatically recommended external device, then at operation S304 it is determined whether the selected external device is operable. If the selected external device is operable, then at operation S305 a channel to which the external device will be registered is selected. Lastly, at operation S306 the external device is registered to the selected channel. At this time, the external device may be automatically registered to the channel currently displaying an image, without selecting the channel to which the external device will be registered.

Figure 31:
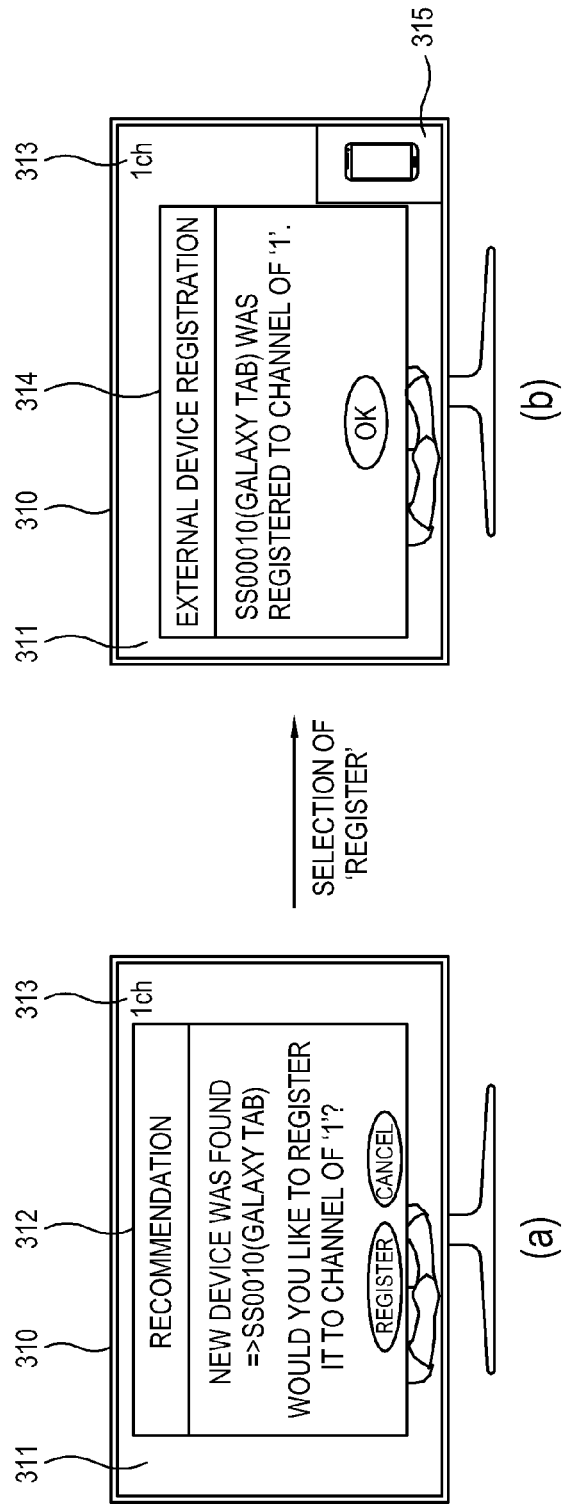
FIG. 31 illustrates an example of screens to register an external device provided by automatic recommendation to a channel according to an aspect of an exemplary embodiment.

FIG. 31 illustrates an example of screens to register an external device provided by automatic recommendation to a channel according to an aspect of an exemplary embodiment. As shown in FIG. 31, a display apparatus 310 may display (a) an image 311 corresponding to channel 1 (313), and a menu screen 312 for automatically searching for a registerable external device at predetermined time intervals. The menu screen 312 may recommend the automatically searched "SS0010 (Galaxy Tab)," and ask a user whether to register the recommended "SS0010 (Galaxy Tab)" to the current channel of 1 (313). If a user selects "Register," a menu screen 314 of (b) may show that the product of "SS0010 (Galaxy Tab)" is now registered to channel 1 (293), and an icon 315 corresponding to the product of "SS0010 (Galaxy Tab)" may be displayed at a predetermined area of the screen.

Thus, the display apparatus 310 according to various exemplary embodiments may automatically search for and recommend the registerable external device even without the user making an explicit request, and it is therefore convenient for the user to register the external device by only selecting the recommended external device.

Figure 32:
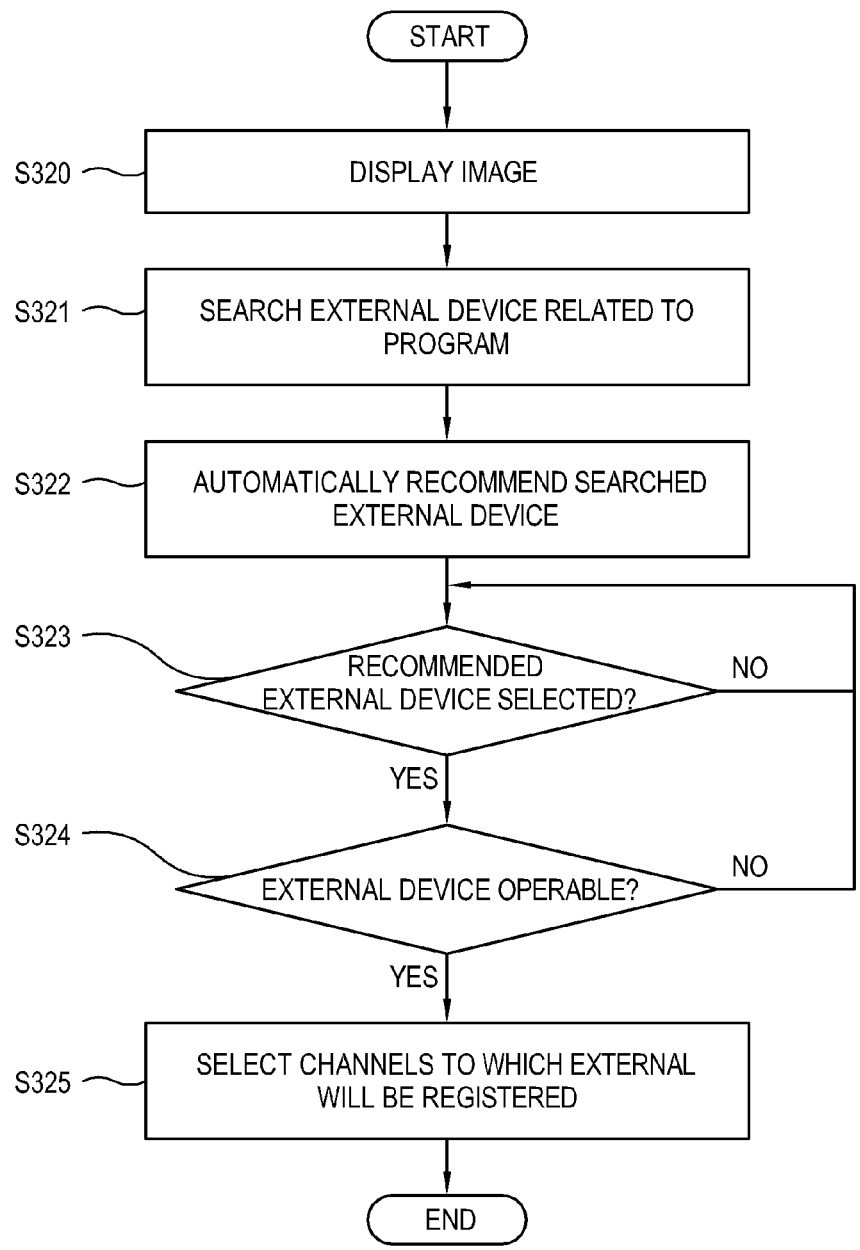
FIG. 32 is a flowchart of registering an external device automatically recommended in connection with a broadcast program to a channel according to an aspect of an exemplary embodiment.

FIG. 32 is a flowchart of registering an external device automatically recommended in connection with a broadcast program to a channel according to an aspect of an exemplary embodiment. As shown in FIG. 32, at operation S320, an image is displayed corresponding to a broadcasting channel. At operation S321, an external device related to a program of the displayed image is searched for. For example, if the user is watching a television program related to personal fitness, then the display apparatus may search for external devices that are related to health or exercise. At operation S322, an external device is automatically recommended in accordance with the search result. At operation S323, a user is asked whether to select the automatically recommended external device. If the user selects the automatically recommended external device, then at operation S324 it is determined whether the selected external device is operable. If the selected external device is operable, then at operation S325, the external device is registered to the channel associated with the program of the currently displayed image.

FIG. 33 illustrates an example of screens to register an external device automatically recommended in connection with a broadcast program to a channel according to an aspect of an exemplary embodiment. As shown in FIG. 33, the display apparatus 330 may display (a) an image 331 of channel (332), and automatically search for an external device that is related to a broadcast program corresponding to the image 331 of channel 5 (332). At this time, the display apparatus 330 may determine that the program of the image 331 includes media content related to cooking, and automatically search for an external device that is related to cooking. As a result of the automatic search, as shown in (b), a menu screen 333 may be shown for recommending a "refrigerator," and a user may be asked whether to register the "refrigerator" with regard to the program of the currently displayed image 331. If the user selects "Register," the "refrigerator" may be registered to the program of the currently displayed image 331, and thus (c) an icon 334 corresponding to the "refrigerator" may be displayed at a predetermined area of the screen.

Thus, according to various exemplary embodiments, the display apparatus 330 may automatically search for an external device that is related to the displayed content of the broadcast program and recommend the searched external device to a user, so that the user access functions related to the broadcast program being watched, even when unprompted by the user.

Figure 34:
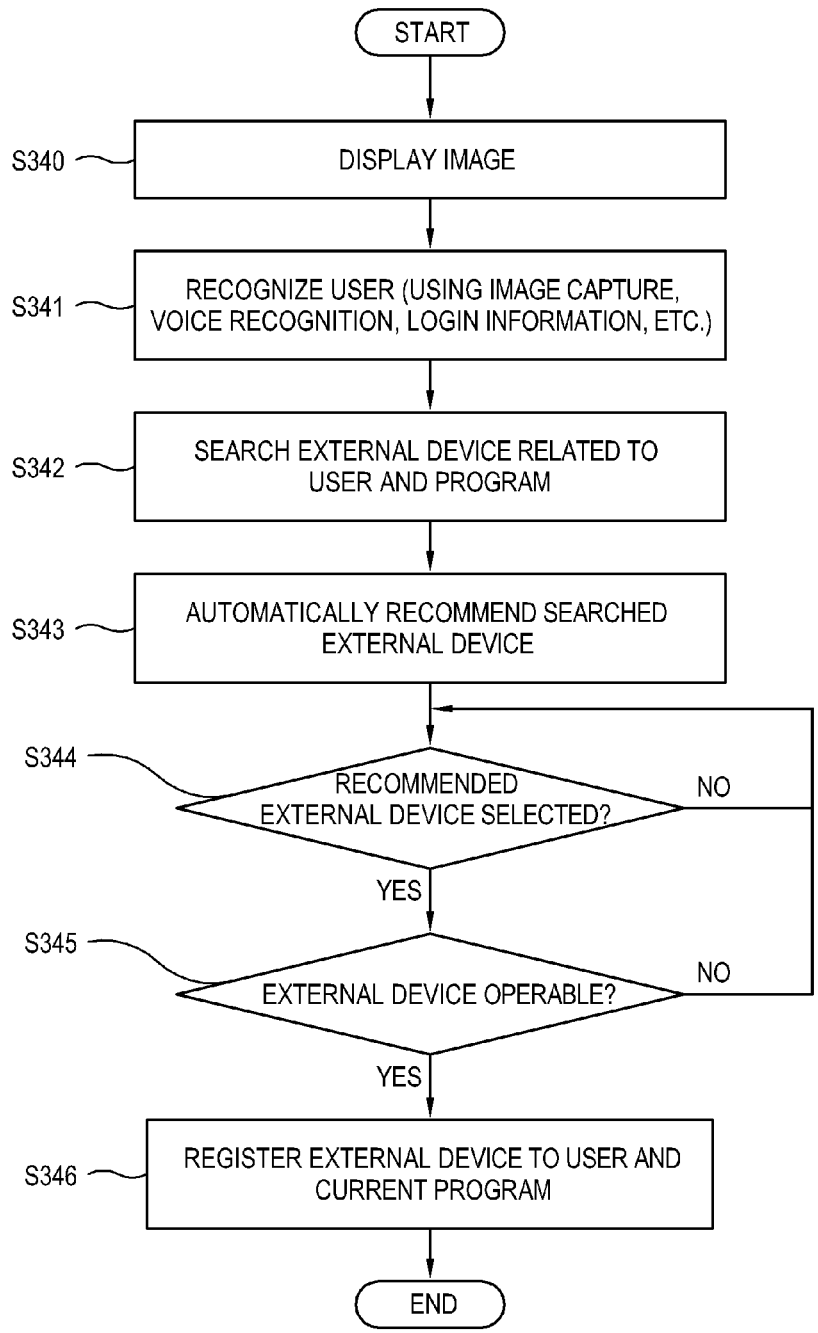
FIG. 34 is a flowchart of registering an external device, automatically recommended in connection with a user and a broadcast program, to a channel according to an aspect of an exemplary embodiment.

FIG. 34 is a flowchart of registering an external device, automatically recommended in connection with a user and a broadcast program, to a channel according to an exemplary embodiment. As shown in FIG. 34, at operation S340, an image is displayed corresponding to a broadcasting channel. At operation S341, a user is recognized based on image capture using a camera, voice recognition, and/or user login information. When the user recognition is completed, at operation S342 the external device related to the recognized user and a program of the displayed image is searched. At operation S343, the external device is automatically recommended in accordance with the search result. At operation S344, a user is asked whether to select the automatically recommended external device. If the user selects the automatically recommended external device, then at operation S345 it is further determined whether the selected external device is operable. If the selected external device is operable, then at operation S346 the external device is registered with regard to the recognized user and the program of the currently displayed image.

Figure 35:
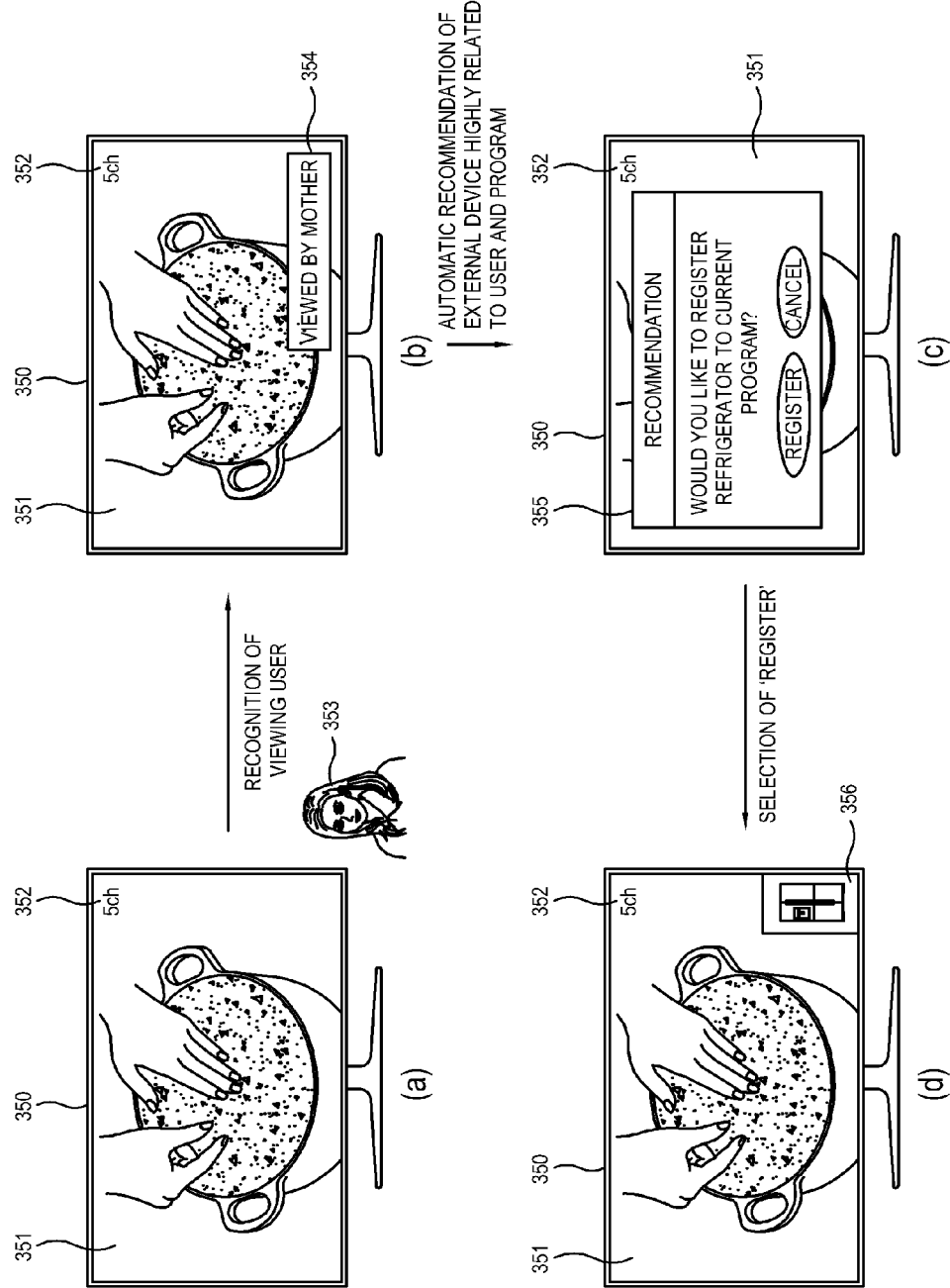
FIG. 35 illustrates an example of screens to register an external device, automatically recommended in connection with a user and a broadcast program, to a channel according to an aspect of an exemplary embodiment.

FIG. 35 illustrates an example of screens to register an external device, automatically recommended in connection with a user and a broadcast program, to a channel according to an aspect of an exemplary embodiment. As shown in FIG. 35, the display apparatus 350 may display (a) an image 351 corresponding to channel 5 (352), and recognize a user 353 who is viewing the image 351. At this time, an image captured by a camera, a result of recognizing the user's voice, login information of the user, etc. may be used to recognize the user 353, but not limited thereto. Other methods may be used to recognize the identity of the user. One or more users may be pre-registered with the display apparatus 350 to improve accuracy of the user recognition. If the user 353 who is viewing the image 351 is recognized as "Mother," (b) the result of user recognition may be displayed as text 354. According to an aspect of an exemplary embodiment, the user recognition result may be displayed as an image. Alternatively, the recognition result may be simply referenced internally without being displayed as any text or image. The display apparatus 350 may automatically search for an external device related to the user 353 and the program of the displayed image 351 in accordance with the recognition of the user 353. At this time, the display apparatus 350 may determine that the broadcast program of the image 351 includes content related to cooking, and automatically search for an external device that is related to cooking. As a result of the automatic search, (c) the display apparatus 350 may show the menu screen 355 for recommending a "refrigerator," and the user 353 may be asked whether to register the "refrigerator" with regard to the program of the currently displayed image 351. If the user 353 selects "Register," the "refrigerator" may be registered to the user 353 and the program of the currently displayed image 351, and thus (d) an icon 356 corresponding to the "refrigerator" may be displayed at a predetermined area of the screen.

Thus, the display apparatus according to various exemplary embodiments may recommend an external device that is related to a user and content of the broadcast program being displayed, thereby providing a user experience more customized for the user.

Figure 36:
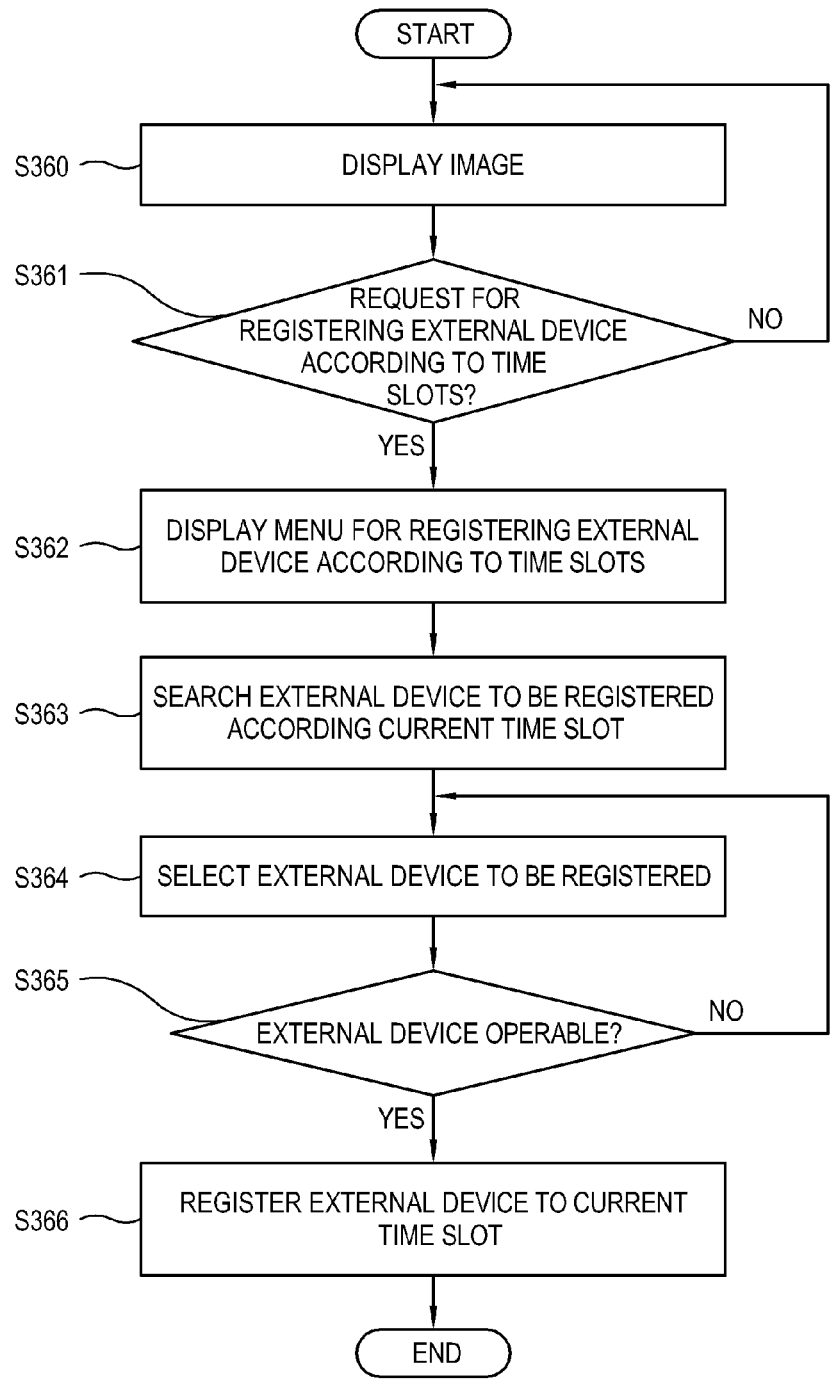
FIG. 36 is a flowchart of registering an external device to a channel in a predetermined time slot according to an aspect of an exemplary embodiment.

FIG. 36 is a flowchart of registering an external device to a channel in a predetermined time slot according to an aspect of an exemplary embodiment. As shown in FIG. 36, at operation S360, an image is displayed corresponding to a broadcasting channel. At operation S361, it is determined whether there is a request for registering an external device according to time slots. If the external device is requested according to the time slots, then at operation S362 a menu for registering the external device according to the time slots is displayed. At operation S363, an external device to be registered to the current time slot is searched for. In accordance with the search results, at operation S364, the external device to be registered is selected. If a user selects the external device to be registered, then at operation S365, it is determined whether the selected external device is operable. If the external device is operable, then at operation S366, the external device is registered to the current time slot. At this time, the current time slot is determined as a predetermined time section including the present time. Alternatively, the external device may be registered with a time slot customized by a user.

Figure 37:
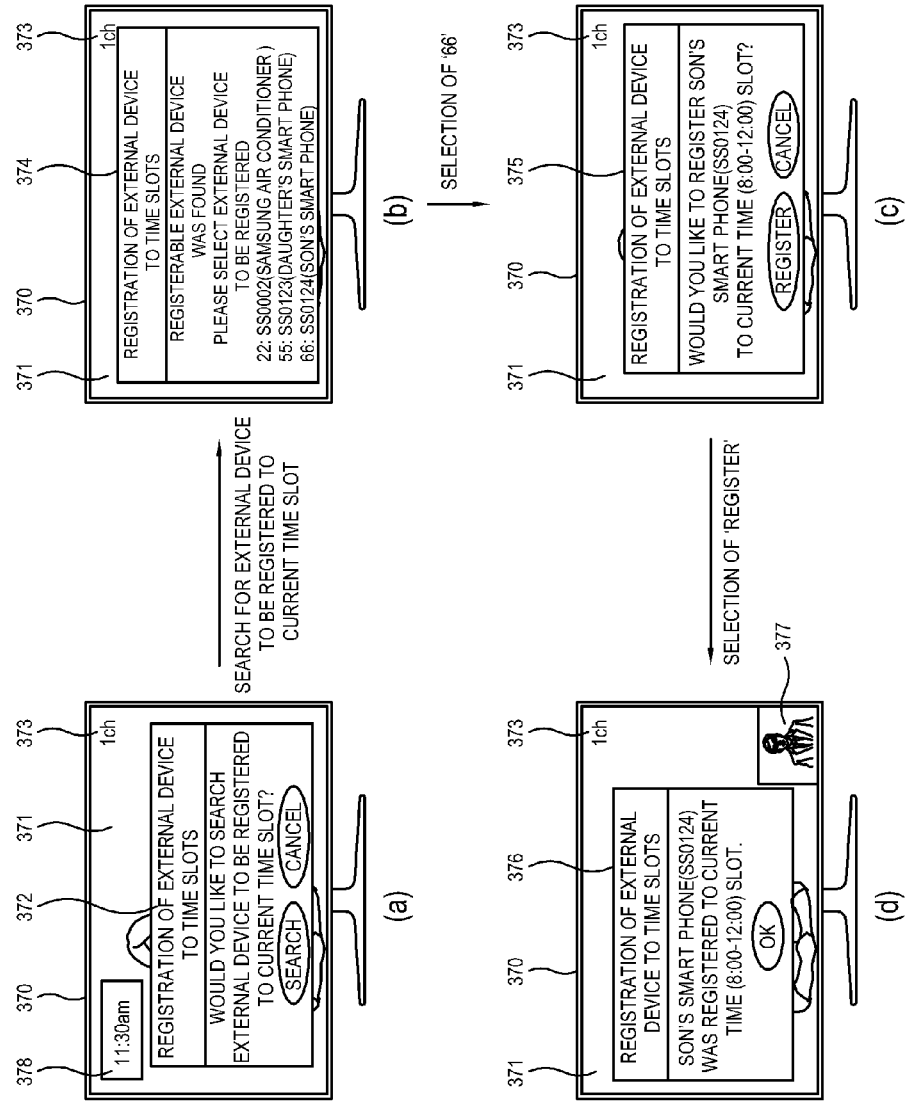
FIG. 37 illustrates an example of screens to register an external device to a channel in a predetermined time slot according to an aspect of an exemplary embodiment.

FIG. 37 illustrates an example of screens to register an external device to a channel in a predetermined time slot according to an aspect of an exemplary embodiment. As shown in FIG. 37, a display apparatus 370 may display (a) an image 371 corresponding to channel 1 (373), and a menu screen 372 for registering an external device according to time slots in response to a user's request, thereby asking the user whether to search for an external device to be registered to the current time slot. At this time, the current time slot may be determined as a predetermined time section including, for example, the current time of 11:30 am (378), at which the image 371 is being displayed. Alternatively, the external device may be registered with a time slot customized by a user.

If the search is requested by the user, the display apparatus 370 may search for an external device to be registered to the current time slot, and display a menu screen 374 of (b) showing a list of searched devices. If the user selects a menu item "66" on the menu screen 374, a menu screen 375 of (c) may ask the user whether to register the selected device of "SS0124 (Son's smart phone)" to the current time slot. If the user selects "Register," the menu screen 376 of (d) may show that the device of "SS0124 (Son's smart phone)" is registered to the current time slot, and an icon 377 corresponding to the device of "SS0124 (Son's smart phone)" may be displayed at a predetermined area of the screen. Once registered to a specific time slot, that particular external device may be controlled by the display apparatus 371 only during that time slot.

Thus, the display apparatus according to various exemplary embodiments may register an external device to the channel in a predetermined time slot, so that a user may use features of an external device during a desired time slot. Further, the display apparatus may provide an efficient way of communicating with the other party by registering that party only with a desired time slot designated for the communication.

Figure 38:
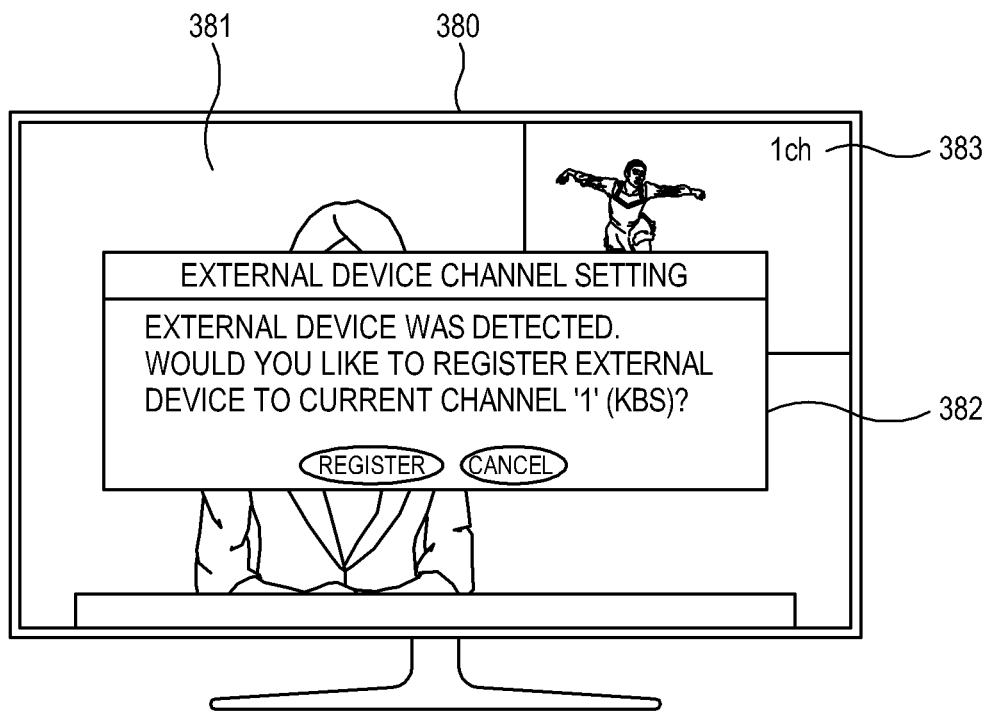
FIG. 38 illustrates an example of a user setting UI for registering an external device to a current channel according to an aspect of an exemplary embodiment.

FIG. 38 illustrates an example of a user setting UI for registering an external device to a current channel according to an aspect of an exemplary embodiment. As shown in FIG. 38, a display apparatus 380 may display an image 381 corresponding to channel 1 (383), and a UI 383 for selecting whether to register an external device, discovered by a remote controller, a smart phone, or the like through NFC, Wi-Fi, etc., to the currently displayed channel 1 (383). The external device can be registered to the current channel 1 (383) by the user selecting "Register" on the displayed UI 382. Thus, the UI for registering the external device to the currently displayed channel allows a user to easily register the external device to the current channel with only minimal user interaction.

FIG. 39 illustrates an example of a user setting UI for registering an external device to a broadcast channel or unallocated channel according to an aspect of an exemplary embodiment. As shown in FIG. 39, a display apparatus 390 may display an image 391 corresponding to channel 1 (393), and a UI 392 for selecting a channel to which an external device will be registered. The external device may be discovered by a remote controller, a smart phone, or the like through NFC, Wi-Fi, etc. By selecting a channel among multiple channels, such as "1:KBS," "2:MBC," "4:SBS," and "6:JTBC," to which the broadcast signals are allocated, or selecting a channel among unallocated channels, such as "3:Unallocated" and "5:Unallocated" on the displayed UI 392, it is possible to register the external device to a desired channel. Thus, the UI for selecting the channel to which the external device will be registered may offer a user an easy way to register the external device to a broadcast channel or an unallocated channel through only minimal user interaction.

Figure 40:
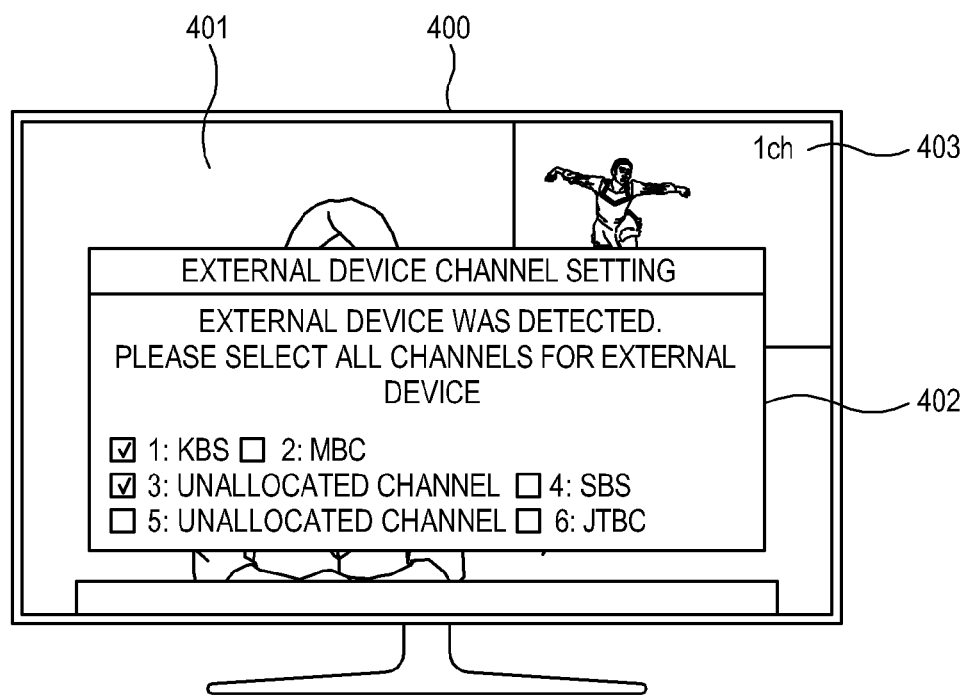
FIG. 40 illustrates an example of a user setting UI for registering an external device to at least one broadcast channel or unallocated channel according to an aspect of an exemplary embodiment.

FIG. 40 illustrates an example of a user setting UI for registering an external device to at least one broadcast channel or unallocated channel according to an aspect of an exemplary embodiment. As shown in FIG. 40, a display apparatus 400 may display an image 401 corresponding to channel 1 (403), and a UI 402 for selecting a plurality of channels to which an external device discovered by a remote controller, a smart phone, etc. through NFC, Wi-Fi, etc. will be registered. By selecting a plurality of channels among channels, such as "1:KBS," "2:MBC," "4:SBS," "6:JTBC" to which the broadcast signals are allocated, and unallocated channels, such as "3:Unallocated" and "5:Unallocated," on the displayed UI 402, it is possible to register the external device to the plurality of channels. Thus, the UI for selecting the plurality of channels to which the external device will be registered may allow a user to easily register the external device to the plurality of channels through simple settings.

Figure 41:
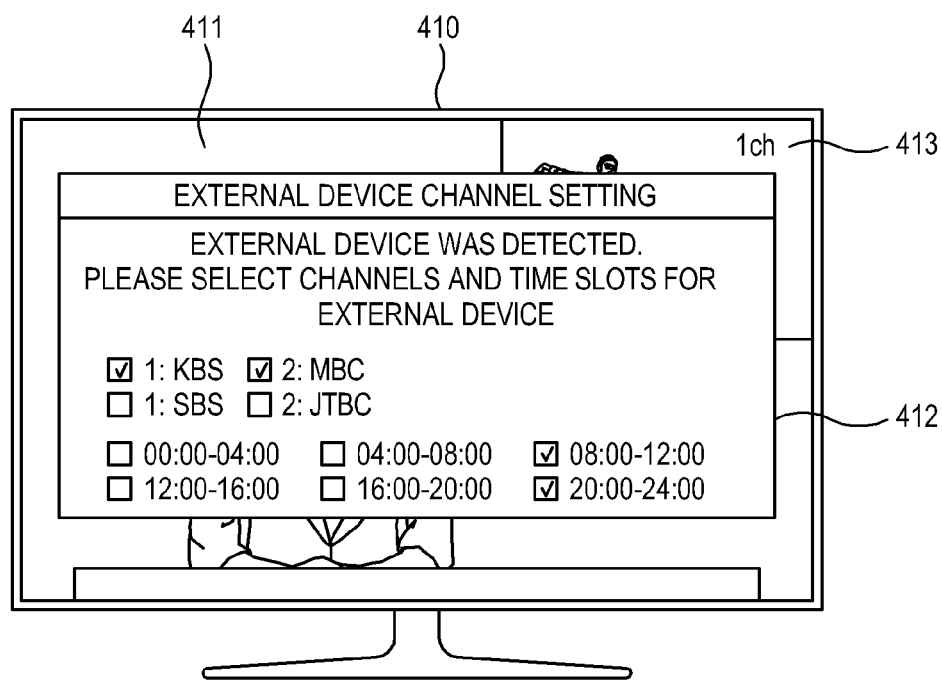
FIG. 41 illustrates an example of a user setting UI for registering an external device to a broadcast channel in a predetermined time slot according to an aspect of an exemplary embodiment.

FIG. 41 illustrates an example of a user setting UI for registering an external device to a broadcast channel in a predetermined time slot according to an aspect of an exemplary embodiment. As shown in FIG. 41, a display apparatus 410 may display an image 411 corresponding to channel 1 (413), and a UI 412 for selecting a plurality of channels and a time slot to which an external device discovered by a remote controller, a smart phone, etc. through NFC, Wi-Fi, etc. will be registered. By selecting desired channels among channels, such as "1:KBS," "2:MBC," "4:SBS," and "6:JTBC," and desired time slots among a plurality of time slots on the displayed UI 412, it is possible to register the external device to the plurality of channels in the desired time slot.

Thus, the UI for selecting the plurality of channels and time slots to which the external device will be registered may allow a user to easily register the external device to the plurality of channels in the desired time slots through simple settings.

FIG. 42 illustrates an example of a UI having additional information for controlling an external device according to an aspect of an exemplary embodiment. As shown in FIG. 42, a display apparatus 420 may display an image 421 corresponding to channel 1 (424), a washing machine icon 422, and a UI 423 including a user guide containing additional information for controlling the washing machine when the washing machine icon 422 is selected using a remote controller or other input devices. For instance, the UI 423 for controlling the washing machine may include "power," "washing," "rinsing," "spin-dry," "stop," "hot water," and like buttons. Through the displayed UI 423, the user may control the operations of the washing machine. In order to select the washing machine icon 422 and control the washing machine through the UI 423 including the user guide, a default button provided on the remote controller or a separate button for controlling the washing machine may be used.

FIG. 43 illustrates an example of a UI having additional information for controlling an external device according to an exemplary embodiment. As shown in FIG. 43, if a robot cleaner is mapped to channel 1 (434), a robot cleaner icon 432 is displayed together with an image 431 corresponding to channel 1 (434). When the robot cleaner icon 432 is selected, a UI 433 with a user guide may be displayed with the additional information for controlling the robot cleaner. At this time, the UI 433 for controlling the robot cleaner may include buttons for "forward," "backward," "leftward," "rightward," "turn," "step," "power," etc. corresponding to the functions of the robot cleaner. Thus, it is possible to control the operations of the robot cleaner through the displayed UI 433. Thus, the UI with the additional information for controlling the external device may vary depending on the type of external device.

Figure 44:
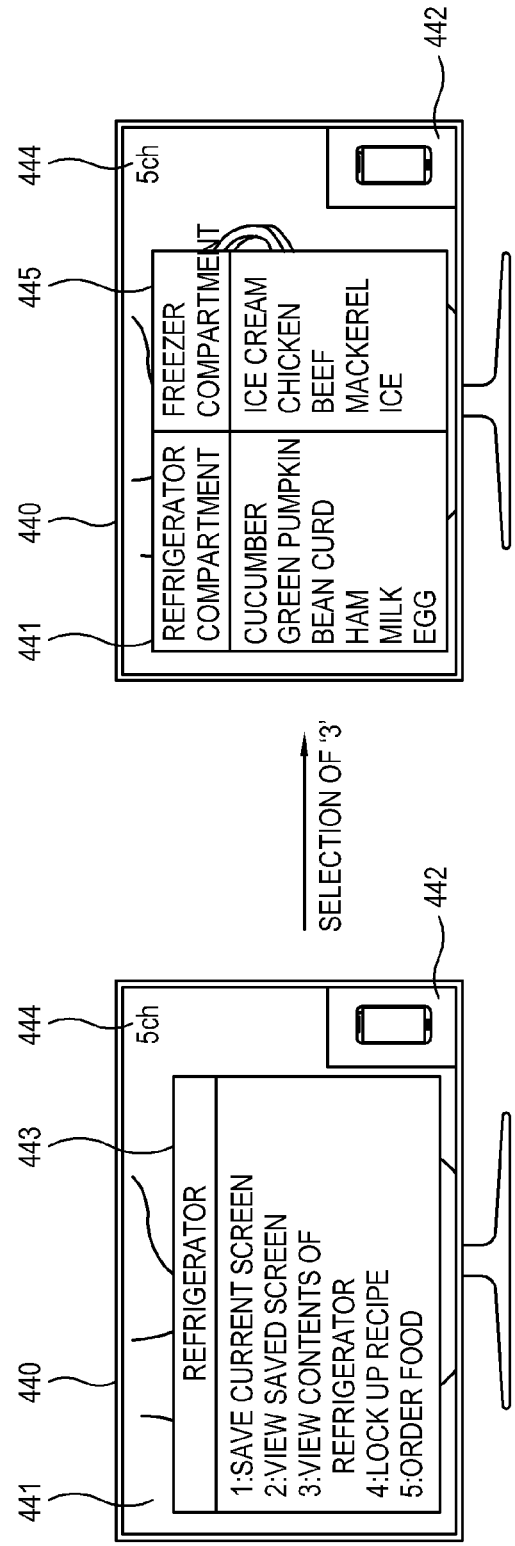
FIG. 44 illustrates an example of a UI having additional information for controlling an external device according to an aspect of an exemplary embodiment.

FIG. 44 illustrates an example of a UI having additional information for controlling an external device according to an aspect of an exemplary embodiment. As shown in FIG. 44, if a refrigerator is mapped to a broadcast program related to cooking on channel 5 (444), a refrigerator icon 442 may be displayed together with the image 441 corresponding to channel 5 (444), and a UI 443 with additional information for controlling the refrigerator may be displayed when the refrigerator icon 442 is selected. At this time, the UI 443 for controlling the refrigerator may include menu items such as "1: Save current screen," "2: View saved screen," "3: View contents of refrigerator," "4: Look up recipe" and "5: Order food." At this time, if a user selects menu number 3 on the displayed UI 443, a function corresponding to "3: View contents of refrigerator" may be performed and contents 445 stored inside the refrigerator may be shown on a screen.

Figure 45:
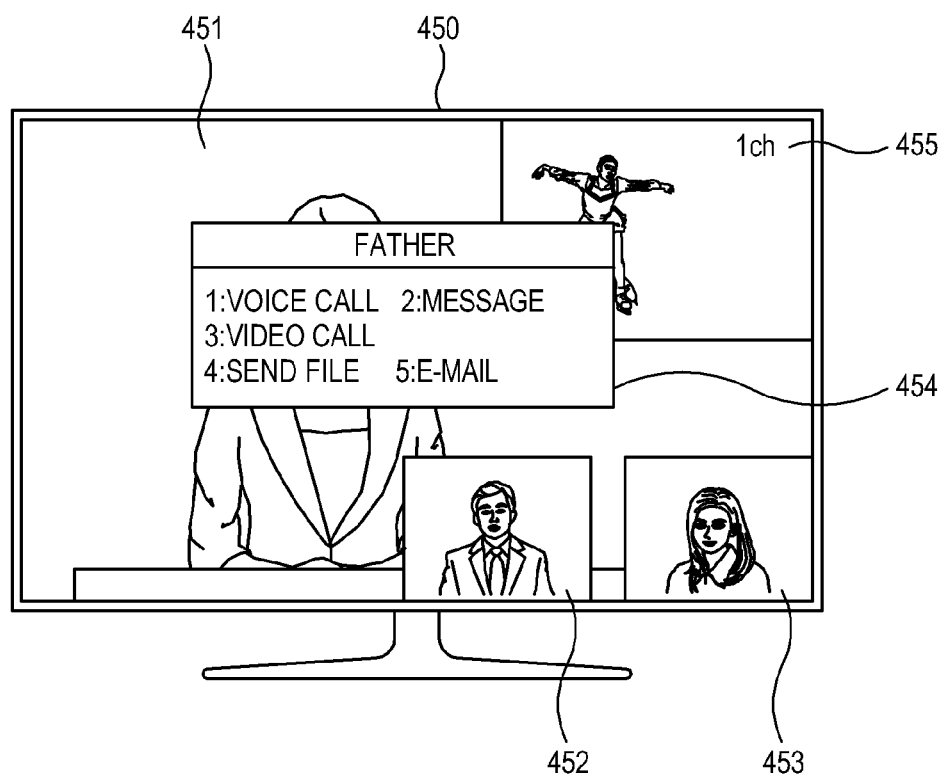
FIG. 45 illustrates an example of a UI having additional information for communication with a user of an external device according to an aspect of an exemplary embodiment.

FIG. 45 illustrates an example of a UI having additional information for communication with a user of an external device according to an aspect of an exemplary embodiment. As shown in FIG. 45, if users, such as a father and a mother, are mapped to channel 1 (455), a father icon 452 and a mother icon 453 may be displayed together with an image 451 corresponding to channel 1 (455). For instance, a UI 454 may be displayed with additional information for communication with a father when the father icon 452 is selected. At this time, the UI 454 for the communication may display "1: Voice call," "2: Message," "3: Video call," "4: Send file," "5: E-mail," and like menu items.

Figure 46:
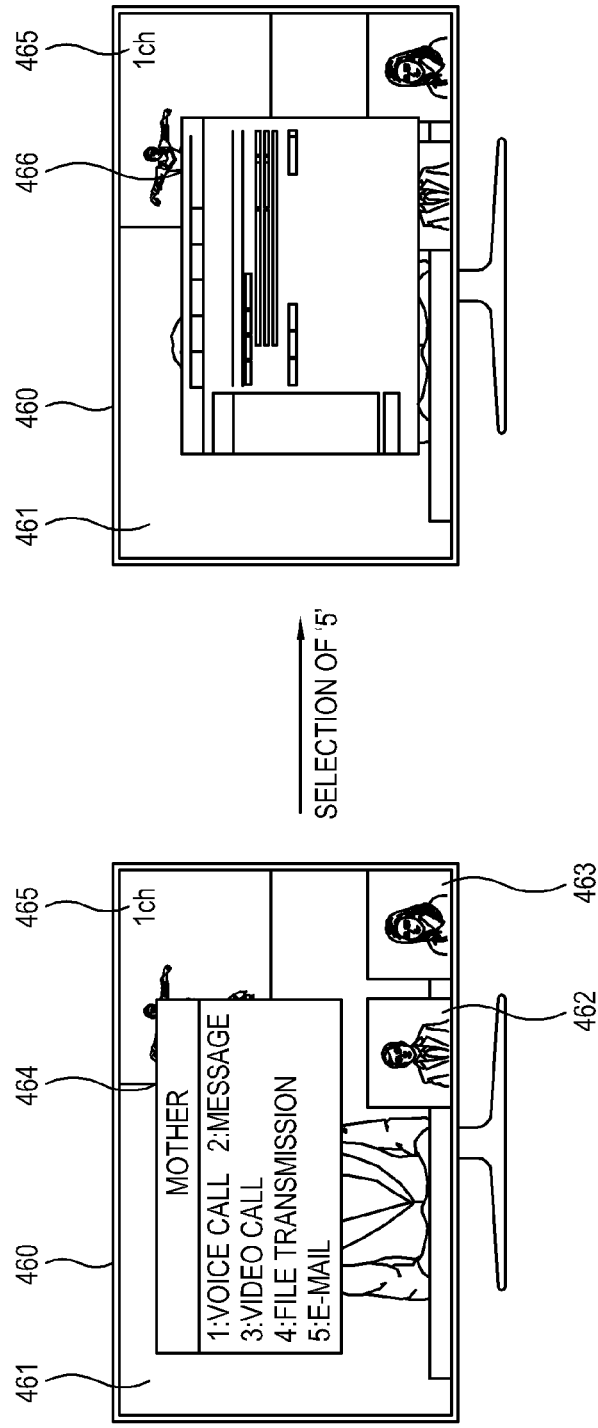
FIG. 46 illustrates an example of a UI having additional information for communication with a user of an external device according to an aspect of an exemplary embodiment.

FIG. 46 illustrates an example of a UI having additional information for communication with a user of an external device according to an aspect of an exemplary embodiment. As shown in FIG. 46, if contacts, such as a father and a mother, are mapped to channel 1 (465), a father icon 462 and a mother icon 463 may be displayed together with an image 461 corresponding to channel 1 (465). For instance, a UI 464 may be displayed with additional information for communication with a mother when the mother icon 463 is selected. At this time, the UI 464 for the communication may display, "1: Voice call," "2: Message," "3: Video call," "4: Send file," "5: E-mail," and like menu items. If "5: E-mail" is selected on the UI 464, a function of "E-mail" may be performed and thus a corresponding sub screen 466 for writing an E-mail is displayed.

Thus, the display apparatus 460 according to various exemplary embodiments may enable a user to communicate via, for example, a video call, a video call, instant messaging, texting, file transmission, E-mail transmission, etc. with the other parties registered to the channel through the UI 464.

Figure 47:
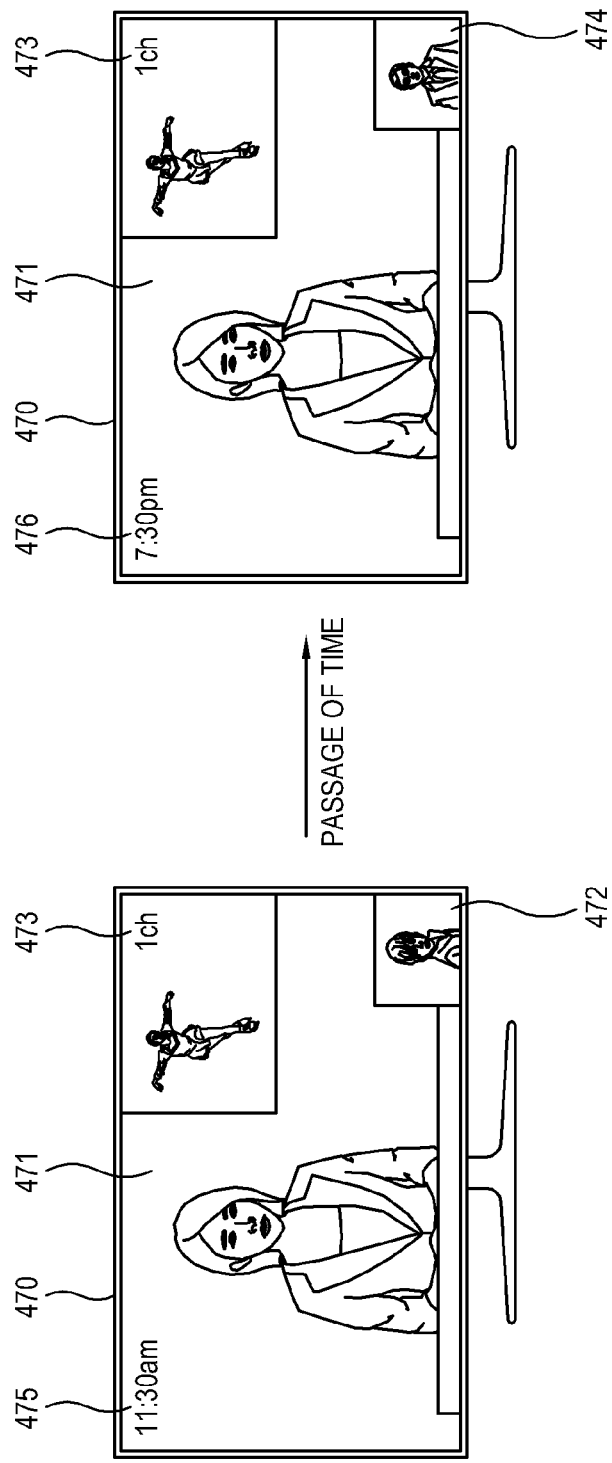
FIG. 47 illustrates an example of screens where different external devices are mapped depending on time slots according to an aspect of an exemplary embodiment.

FIG. 47 illustrates an example of screens where different external devices are mapped depending on time slots according to an exemplary embodiment. As shown in FIG. 47, a display apparatus 470 may display an image 471 corresponding to channel 1 (473), and different contacts mapped to channel 1 (473) according to different time slots. For instance, if the current time is "11:30 am" 475, the display apparatus 470 may display a son's icon 472 together with the image 471 corresponding to channel 1 (473). Thereafter, if the current time is "7:30 pm" 476, the display apparatus 470 may now display a father icon 474 together with the image 471 corresponding to channel 1 (473).

Thus, the display apparatus 470 according to this exemplary embodiment allows a user to set multiple external devices or multiple contacts to be mapped to one channel according to different time slots, so that the user can control different external devices according to different time slots or communicate with different parties according to different time slots while viewing a broadcast.

As described above, a display apparatus according to exemplary embodiments has an advantage of easily registering an external device to a broadcast channel by a remote controller or electronic device.

Further, a display apparatus according to various exemplary embodiments may display a UI for controlling an external device concurrently with a broadcast image, thereby facilitating easy control of the external device.

An aspect of an exemplary embodiment provides a display apparatus and a control method thereof, in which an external device is registered to a channel to which a broadcast signal is assigned.

Another aspect may provide a display apparatus and a control method thereof, in which an operation for controlling the external device is performed while a broadcast is displayed.

Although a few exemplary embodiments have been shown and described, it will be appreciated by those skilled in the art that changes may be made to these exemplary embodiments without departing from the principles and spirit of the, the scope of which is defined in the appended claims and their equivalents.

What is claimed is:

1. A display apparatus comprising:
a signal receiver configured to receive a broadcast signal;
a signal processor configured to process the received broadcast signal;
a display configured to display images based on the processed broadcast signal;
a user input receiver configured to receive a user input;
a storage; and
a controller configured to:
control the storage to store first information about a first external device that is mapped to a first channel, in accordance with the user input, among a plurality of channels to which the broadcast signal is allocated, and store second second external device that is mapped to a second channel among the plurality of channels to which the broadcast signal is allocated,
in response to the first channel being selected, control the display to display a first image based on a broadcast signal of the first channel and to simultaneously display the first information about the first external device mapped to the first channel, wherein the first external device is controlled using the first channel to which it is specifically mapped, and
in response to the displayed first information about the first external device selected, control the display to display a user interface (UI) for controlling the first external device on the first image.

2. The display apparatus according to claim 1, wherein the controller is further configured to control the display to display a user interface (UI) comprising at least one item for controlling the first external device corresponding to the first channel.

3. The display apparatus according to claim 2, wherein the controller is further configured to control the first external device based on the user input received via the displayed UI.

4. The display apparatus according to claim 1, further comprising a remote controller configured to receive the user input,
wherein the user input receiver receives the user input through the remote controller.

5. The display apparatus according to claim 4, wherein the remote controller is further configured to receive the first information about the first external device from the first external device, and
wherein the controller is further configured to control the storage to store the first information about the first external device received by the remote controller.

6. The display apparatus according to claim 4, wherein the remote controller is further configured to receive the first information about the first external device from the first external device through at least one communication method among near field communication (NFC), Wi-Fi, and Bluetooth.

7. The display apparatus according to claim 4, wherein the controller is further configured to send to the remote controller a control signal for controlling the first external device corresponding to the first channel based on the user input, and
    wherein the remote controller is further configured to output the control signal to the particular the first external device.

8. The display apparatus according to claim 4, wherein the controller is further configured to send to the first external device a control signal for controlling the first external device corresponding to the first channel based on the user input.

9. The display apparatus according to claim 4, wherein the controller is further configured to control the remote controller to generate a control signal for controlling the first external device corresponding to the first channel based on the user input, and
    wherein the remote controller is further configured to output the generated control signal to the first external device.

10. The display apparatus according to claim 1, further comprising an electronic device configured to receive the user input,
    wherein the user input receiver receives the user input through the electronic device.

11. The display apparatus according to claim 10, wherein the electronic device is further configured to receive the first information about the first external device from the first external device through at least one wireless communication method among near field communication (NFC), Wi-Fi, Bluetooth, and transmission control protocol (TCP)/Internet protocol (IP), and
    wherein the controller is further configured to control the storage to store the first information about the first external device received by the electronic device.

12. The display apparatus according to claim 2, wherein the controller is configured to control the display to display additional information for controlling the first external device based on the user input using the displayed UI.

13. The display apparatus according to claim 1, wherein the controller is further configured to display a user interface (UI) for user settings to map the first external device to one of an unallocated channel to which the broadcast signal is not allocated and an allocated channel to which the broadcast signal is not allocated, among a plurality, and map the first external device to the one of the unallocated channel and the allocated channel in accordance with an additional user input via the displayed UI.

14. The display apparatus according to claim 1, wherein the controller is further configured to map the first external device to the first channel based on characteristics of the first channel and the first external device.

15. The display apparatus according to claim 14, wherein the characteristics of the first channel comprise at least one among a characteristic of content provided via the channel, user preference information associated with the first channel, and a user's viewing history information associated with the first channel.

16. The display apparatus according to claim 14, wherein the characteristics of the first external device comprise at least one among a type of the first external device, usage pattern associated with the first external device, and a user's history of using the first external device.

17. The display apparatus according to claim 1, wherein the first information about the first external device comprises information about a user of the first external device.

18. The display apparatus according to claim 17, wherein the controller is further configured to display a user interface (UI) for communication with the user of the first external device corresponding to the first channel based on the first information about the user of the first external device corresponding to the first channel.

19. A method of controlling a display apparatus, the method comprising:
    receiving a broadcast signal;
    storing first information about a first external device that is mapped to a first channel, in accordance with the user input, among a plurality of channels to which the broadcast signal is allocated, and storing second information about a second external device that is mapped to a second channel among the plurality of channels to which the broadcast signal is allocated;
    in response to the first channel being selected, displaying a first image based on a broadcast signal of the first channel and simultaneously displaying the first information about the first external device mapped to the first channel, wherein the first external device is controlled using the first channel to which it is specifically mapped, and
    in response to the displayed first information about the first external device selected, displaying a user interface (UI) for controlling the first external device on the first image.

20. The display apparatus according to claim 1, wherein, in response to the first channel being changed to the second channel different from the first channel, the controller controls the display to display a second image based on the broadcast signal of the second channel and to simultaneously display the second information about the second external device specially mapped to the second channel, and controls the second external device via the second channel.

\* \* \* \* \*